(12) United States Patent
Morisita et al.

(10) Patent No.: US 8,997,503 B2
(45) Date of Patent: Apr. 7, 2015

(54) VEHICLE AIR-CONDITIONING SYSTEM AND OPERATION CONTROL METHOD THEREFOR

(75) Inventors: Masatosi Morisita, Aichi (JP); Hideki Suetake, Aichi (JP); Toshihisa Kondo, Aichi (JP); Akira Katayama, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 438 days.

(21) Appl. No.: 13/502,456

(22) PCT Filed: Jan. 15, 2010

(86) PCT No.: PCT/JP2010/050400
§ 371 (c)(1),
(2), (4) Date: Apr. 17, 2012

(87) PCT Pub. No.: WO2011/086683
PCT Pub. Date: Jul. 21, 2011

(65) Prior Publication Data
US 2012/0205088 A1  Aug. 16, 2012

(51) Int. Cl.
*F25B 7/00* (2006.01)
*B60H 1/00* (2006.01)
(Continued)

(52) U.S. Cl.
CPC ............ *B60H 1/00921* (2013.01); *B60H 1/143* (2013.01); *B60H 1/20* (2013.01);
(Continued)

(58) Field of Classification Search
CPC ........... B60H 1/00392; B60H 1/00921; B60H 1/143; B60H 1/20; B60L 1/003; B60L 1/02; Y02T 10/642; Y02T 10/7005; Y02T 10/705

USPC ............... 165/202, 43, 42; 62/239, 323.3, 79, 62/117, 159, 324.1
See application file for complete search history.

(56) References Cited

U.S. PATENT DOCUMENTS 5,749,235 A   5/1998  Ueda
6,079,218 A   6/2000  Ueda
(Continued)

FOREIGN PATENT DOCUMENTS

EP   0736402 A2   10/1996
EP   1504934 A2   2/2005
(Continued)

OTHER PUBLICATIONS

Japanese Decision to Grant Patent mailed May 21, 2013, issued in corresponding Japanese Patent Application No. 2008-285475; w/English translation (6 pages).
(Continued)

*Primary Examiner* — Cheryl J Tyler
*Assistant Examiner* — Ana Vazquez
(74) *Attorney, Agent, or Firm* — Westerman, Hattori, Daniels & Adrian, LLP

(57) ABSTRACT

A vehicle air-conditioning system includes an HVAC unit that blows air whose temperature is adjusted by a refrigerant evaporator and a second refrigerant condenser. The system includes a heat pump cycle in which a refrigerant compressor, a refrigerant circuit changeover section, a first refrigerant condenser, a first expansion valve, and the refrigerant evaporator are sequentially connected. The system includes a second expansion valve and a refrigerant heat exchanger connected in parallel with the first expansion valve and the refrigerant evaporator. The second refrigerant condenser is connected in parallel with the first refrigerant condenser. The system includes a coolant cycle in which a coolant circulating pump, a ventilation-exhaust-heat recovery unit, a motor/battery, an electric heater, and the refrigerant heat exchanger are sequentially connected, and the ventilation-exhaust-heat recovery unit, motor/battery, and electric heater can be selectively used as a heat source.

19 Claims, 27 Drawing Sheets

(51) Int. Cl.
*B60H 1/14* (2006.01)
*B60H 1/20* (2006.01)
*B60L 1/00* (2006.01)
*B60L 1/02* (2006.01)
*B60L 3/00* (2006.01)
*B60L 11/18* (2006.01)

(52) U.S. Cl.
CPC *B60L 1/003* (2013.01); *B60L 1/02* (2013.01); *B60L 3/0046* (2013.01); *B60L 3/0061* (2013.01); *B60L 11/1803* (2013.01); *B60L 11/1874* (2013.01); *B60L 11/1875* (2013.01); *B60H 1/00392* (2013.01); *B60L 2240/34* (2013.01); *B60L 2240/36* (2013.01); *B60L 2240/425* (2013.01); *B60L 2240/545* (2013.01); *B60L 2270/46* (2013.01); *Y02T 10/642* (2013.01); *Y02T 10/7005* (2013.01); *Y02T 10/705* (2013.01)

(56) References Cited

U.S. PATENT DOCUMENTS

| | | | | |
|---|---|---|---|---|
| 7,287,581 | B2 * | 10/2007 | Ziehr et al. | 165/202 |
| 2003/0052647 | A1 * | 3/2003 | Yoshida et al. | 320/125 |
| 2009/0113913 | A1 * | 5/2009 | Esaki | 62/239 |
| 2009/0176150 | A1 * | 7/2009 | Yanaka | 429/120 |
| 2012/0302149 | A1 * | 11/2012 | Zhu et al. | 454/75 |

FOREIGN PATENT DOCUMENTS

| | | | |
|---|---|---|---|
| EP | 1961593 | A1 | 8/2008 |
| JP | 5-270252 | A | 10/1993 |
| JP | 7-9844 | A | 1/1995 |
| JP | 7-329544 | A | 12/1995 |
| JP | 8-276716 | A | 10/1996 |
| JP | 11-245655 | A | 9/1999 |
| JP | 2003-127648 | A | 5/2003 |
| JP | 3477868 | B2 | 12/2003 |
| JP | 2006-290254 | A | 10/2006 |
| JP | 2006290254 | A * | 10/2006 |
| JP | 2006-321389 | A | 11/2006 |
| JP | 2008-308080 | A | 12/2008 |
| JP | 2009-274517 | A | 11/2009 |

OTHER PUBLICATIONS

Extended European Search Report dated Apr. 16, 2014, issued in European Patent Application No. 10843042.2 (7 pages).
International Search Report of PCT/JP2010/050400, mailing date Feb. 23, 2010.
Written Opinion of PCT/JP2010/050400, mailing date Feb. 23, 2010.
Japanese Office Action dated Sep. 11, 2012, issued in corresponding Japanese Patent Application No. 2008-285475, with English translation (9 pages).

* cited by examiner

FIG. 8

| OPERATION MODE | COOLING | | | BLOWING MODE | | | MOTOR/BATTERY COOLING | | |
|---|---|---|---|---|---|---|---|---|---|
| PATTERN | 1 | 2 | 3 | 1 | 2 | 3 | 1 | 2 | 3 |
| EVA | O | O | O | × | × | × | × | × | × |
| LTR | × | O | × | × | O | × | × | O | × |
| HEX | O | × | × | O | × | × | O | × | × |
| SUBCOND | × | × | × | × | × | × | × | × | × |
| VENTILATION EXHAUST HEAT | × | × | × | × | × | × | × | × | × |
| MOTOR | O | × | × | O | O | × | O | O | × |
| PTC | × | × | O | × | × | × | × | × | × |

| OPERATION MODE | DEHUMIDIFYING AND HEATING | | | | | HEATING | | | | |
|---|---|---|---|---|---|---|---|---|---|---|
| PATTERN | 1 | 2 | 3 | 4 | 5 | 1 | 2 | 3 | 4 | 5 |
| EVA | O | O | O | O | O | × | × | × | × | × |
| LTR | × | × | × | × | × | × | × | × | × | × |
| HEX | O | O | O | O | O | O | O | O | O | O |
| SUBCOND | O | O | O | O | O | O | O | O | O | O |
| VENTILATION EXHAUST HEAT | O | O | × | × | × | O | O | × | × | × |
| MOTOR | O | O | O | O | × | O | O | O | O | × |
| PTC | O | × | O | × | O | O | × | O | × | O |

VEHICLE AIR-CONDITIONING SYSTEM AND OPERATION CONTROL METHOD THEREFOR

TECHNICAL FIELD

The present invention relates to a vehicle air-conditioning system and an operation control method therefor, suitable for use in electric vehicles.

BACKGROUND ART

In vehicle air-conditioning systems installed in electric vehicles, since an internal combustion engine is not installed in the vehicles, heating cannot be performed by using coolant or combustion exhaust heat. Thus, in general, a heat pump cycle using an electric compressor is adopted for an electric-vehicle air-conditioning system. The biggest challenge of the heat pump cycle is that heating becomes difficult or the heating capacity becomes insufficient when the outside-air temperature is low or at the operation starting time (heating start-up time), which is well known.

Thus, various improvements have been conventionally proposed. As a heat source for heating, it is conceivable not only to use exhaust heat from a drive motor that includes an inverter and exhaust heat from a battery but also to use an electric heater or a combustion heater together with such exhaust heat because, with such exhaust heat alone, the capacity is insufficient or it takes time to use the exhaust heat (for example, see PTLs 1 and 2).

CITATION LIST

Patent Literature

{PTL 1} Japanese Unexamined Patent Application, Publication No. Hei 07-329544
{PTL 2} Publication of Japanese Patent No. 3477868

SUMMARY OF INVENTION

Technical Problem

However, in the case of electric vehicles, using battery power in the air-conditioning system directly affects the distance that the vehicle can travel on a single battery charge. For this reason, it is desirable from an efficiency standpoint that use of the electric heater as a heat source for heating is limited to cases in which another heat source cannot be used, for example, when the outside-air temperature is low or at heating start-up time, and is minimized. Furthermore, the combustion heater has many problems from usability and economic standpoints because the combustion heater heats coolant (heating medium) etc. by using fuel combustion heat, and thus, it is necessary to additionally install a new combustion device and incidental equipment.

From the above-described circumstances, there has been a demand to provide an efficient vehicle air-conditioning system that is capable of performing heating by stably ensuring the required capacity even when the outside-air temperature is low or at heating start-up time and is also capable of reducing the use of the electric heater as much as possible by ensuring a new heat source, and to provide an operation control method capable of automatically operating the vehicle air-conditioning system with high efficiency.

The present invention has been made in view of such circumstances, and an object thereof is to provide a highly-efficient vehicle air-conditioning system capable of stably ensuring the required cooling and heating capacities and an automatic operation control method capable of efficiently performing cooling control, blowing-mode control, motor/battery cooling control, heating control, and dehumidifying and heating control, by using the air-conditioning system.

Solution to Problem

In order to solve the above-described problems, the vehicle air-conditioning system and the operation control method therefor of the present invention employ the following solutions.

Specifically, according to a first aspect, the present invention provides a vehicle air-conditioning system including: an HVAC unit that blows, into a vehicle interior, air whose temperature has been adjusted by a refrigerant evaporator and a second refrigerant condenser that are provided in a blowing path of a blower; a heat pump cycle in which a refrigerant compressor, a refrigerant circuit changeover section that changes a refrigerant circulating direction, a first refrigerant condenser that condenses refrigerant by performing heat exchange with outside air, a first expansion valve, and the refrigerant evaporator are connected in this order; a second expansion valve and a refrigerant/coolant heat exchanger are connected in parallel with the first expansion valve and the refrigerant evaporator; and the second refrigerant condenser is connected in parallel with the first refrigerant condenser via the refrigerant circuit changeover section; and a coolant cycle in which a coolant circulating pump, a ventilation-exhaust-heat recovery unit that recovers heat from exhaust air from the vehicle interior, a motor/battery, an electric heater, and the refrigerant/coolant heat exchanger are sequentially connected; and the ventilation-exhaust-heat recovery unit, the motor/battery, and the electric heater can be selectively used as a heat source.

According to the first aspect of the present invention, the ventilation-exhaust-heat recovery unit, which recovers heat from the exhaust air from the vehicle interior, is provided in the coolant cycle, and the exhaust heat recovered by the ventilation-exhaust-heat recovery unit can be selectively used as a heat source, in addition to the exhaust heat of the motor/battery and the heat of the electric heater; therefore, during the heat-pump heating and the dehumidifying and heating performed by the heat pump cycle, the exhaust heat recovered from the exhaust air from the vehicle interior can be efficiently used as a heat source for heating. Therefore, at a low outside-air temperature or at heating start-up time, it is possible to ensure the required capacity by using the heat of the electric heater to perform stable heating or dehumidifying and heating. Furthermore, when exhaust heat from the motor/battery can be used, or when the vehicle interior temperature reaches a target temperature and exhaust heat from the ventilation-exhaust-heat recovery unit can be used, the exhaust heat is preferentially used to reduce the use of the electric heater as much as possible, thus enabling efficient operation with reduced power consumption and to contribute to extended vehicle travel distance. Note that, in the present invention, the motor/battery is intended to mean a drive motor and/or its electricity-source battery, and the motor includes or does not include an inverter. The same applies below.

Furthermore, in the above-described vehicle air-conditioning system of the above-described first aspect, the coolant cycle may include a first bypass circuit for bypassing the ventilation-exhaust-heat recovery unit and the motor/battery and a second bypass circuit for bypassing the ventilation-exhaust-heat recovery unit.

According to the above-described first aspect, since the first bypass circuit and the second bypass circuit are provided, the coolant can be selectively made to flow into the first bypass circuit or the second bypass circuit according to the heat-source selection and can be efficiently heated and circulated by bypassing the ventilation-exhaust-heat recovery unit and the motor/battery or the ventilation-exhaust-heat recovery unit. Therefore, it is possible to reduce power consumption at the coolant circulating pump and the electric heater.

Furthermore, in one of the above-described vehicle air-conditioning systems of the above-described first aspect, the coolant cycle may include a motor/battery cooling circuit that circulates coolant to a radiator to perform air cooling of the motor/battery.

According to the above-described first aspect, since the motor/battery cooling circuit for performing air cooling by using the radiator is provided in the coolant cycle, it is possible to use both the refrigerant cooling of the motor/battery performed via the coolant cycle by using the cooling function of the heat pump cycle and the air cooling of the motor/battery performed via the radiator, as needed. Therefore, while monitoring the coolant inlet temperature of the motor/battery, the motor/battery can be efficiently and reliably cooled through refrigerant cooling or air cooling.

Furthermore, in one of the above-described vehicle air-conditioning systems of the above-described first aspect, through a cycle change in each of the heat pump cycle and the coolant cycle, it may be possible to select any operation mode from cooling control, blowing-mode control that includes refrigerant cooling of the motor/battery, motor/battery cooling control that performs refrigerant cooling of the motor/battery, heating control, and dehumidifying and heating control.

According to the above-described first aspect, the heat pump cycle includes the refrigerant compressor; the refrigerant circuit changeover section; the first refrigerant condenser; the first expansion valve; the refrigerant evaporator; the second expansion valve and the refrigerant/coolant heat exchanger, which are connected in parallel with the first expansion valve and the refrigerant evaporator; and the second refrigerant condenser, which is connected in parallel with the first refrigerant condenser via the refrigerant circuit changeover section. The coolant cycle includes the coolant circulating pump, the ventilation-exhaust-heat recovery unit, the motor/battery, the electric heater, and the refrigerant/coolant heat exchanger. Therefore, through a cycle change in each of the heat pump cycle and the coolant cycle, it is possible to select any operation mode from the cooling control that is performed by making the refrigerant evaporator, provided in the HVAC unit, of the heat pump cycle function; the blowing-mode control that includes refrigerant cooling of the motor/battery, in which, while the blower of the HVAC unit is being operated, the refrigerant/coolant heat exchanger of the heat pump cycle is made to function to cool the coolant, thus cooling the motor/battery by means of the refrigerant; the motor/battery cooling control in which the refrigerant/coolant heat exchanger of the heat pump cycle is made to function to cool the coolant, thus cooling the motor/battery by means of the refrigerant; the heating control that is performed when coolant heated by the ventilation-exhaust-heat recovery unit, the motor/battery, and the electric heater, or the like of the coolant cycle is used as a heat source, and the second refrigerant condenser, provided in the HVAC unit, of the heat pump cycle is made to function; and the dehumidifying and heating control that is performed when the coolant heated in a similar manner is used as a heat source, and the second refrigerant condenser and the refrigerant evaporator, provided in the HVAC unit, of the heat pump cycle and the second refrigerant condenser are made to function. Therefore, in addition to efficient operations of cooling, heating, and dehumidifying and heating, it is possible to perform various operations, such as a blowing operation that includes the refrigerant cooling of the motor/battery and a refrigerant cooling operation of the motor/battery, to make wide use of the air-conditioning system.

Furthermore, in the above-described vehicle air-conditioning system of the above-described first aspect, at the refrigerant/coolant heat exchanger, the coolant cycle may recover heat selectively from the ventilation-exhaust-heat recovery unit, the motor/battery, and the electric heater, from the ventilation-exhaust-heat recovery unit and the motor/battery, from the motor/battery and the electric heater, from the motor/battery, or from the electric heater; and the heat pump cycle may be operated in any operation mode of heating control and dehumidifying and heating control, by using the heat recovered at the refrigerant/coolant heat exchanger as a heat source.

According to the above-described first aspect, it is possible for the coolant cycle to select one of the following five heat-source types, which are obtained by combining three heat sources, that is, the ventilation-exhaust-heat recovery unit, the motor/battery, and the electric heater, connected in this cycle: the ventilation-exhaust-heat recovery unit, the motor/battery, and the electric heater; the ventilation-exhaust-heat recovery unit and the motor/battery; the motor/battery and the electric heater; the motor/battery; and the electric heater, to recover the heat thereof at the refrigerant/coolant heat exchanger, and to use it as a heat source for heating, in the heat pump cycle. In this way, since ventilation exhaust heat is used, the heat source used for heating can be further diversified, and therefore, it is possible to reduce the use of the electric heater accordingly and to reduce power consumption in the air-conditioning system.

Furthermore, in the above-described vehicle air-conditioning system of the above-described first aspect, the heat pump cycle may be operated in a cooling control mode by circulating the refrigerant from the refrigerant compressor to the first refrigerant condenser, the first expansion valve, and the refrigerant evaporator, in this order, and, at the same time, may be capable of cooling the motor/battery via the coolant cycle by concurrently circulating the refrigerant to the second expansion valve and the refrigerant/coolant heat exchanger, which are connected in parallel with the first expansion valve and the refrigerant evaporator.

According to the above-described first aspect, since the second expansion valve and the refrigerant/coolant heat exchanger are connected in parallel with the first expansion valve and the refrigerant evaporator, it is possible to make the refrigerant flow into the refrigerant evaporator, provided in the HVAC unit, to perform the cooling control mode operation and also to make it flow concurrently into the refrigerant/coolant heat exchanger, which is connected in parallel with the refrigerant evaporator, thus performing refrigerant cooling of the motor/battery via the coolant cycle. Therefore, under a high-temperature environment, while cooling the vehicle interior, it is possible to forcibly cool the motor/battery by means of the refrigerant and to efficiently operate the drive motor.

Furthermore, in the above-described vehicle air-conditioning system of the above-described first aspect, only the blower may be driven to operate the HVAC unit in the blowing-mode control, and, at the same time, the heat pump cycle may perform the cooling operation by circulating the refrigerant from the refrigerant compressor to the first refrigerant condenser, the second expansion valve, and the refrigerant/coolant heat exchanger, in this order, thus making it possible to cool the motor/battery via the coolant cycle.

According to the above-described first aspect, while the blowing operation is being performed in the HVAC unit, it is possible to operate the heat pump cycle to cause the refrigerant to flow only into the second expansion valve and the refrigerant/coolant heat exchanger, thus cooling the coolant. Thus, it is possible to perform refrigerant cooling of the motor/battery via the coolant cycle, and therefore, to forcibly cool the motor/battery by means of the refrigerant while obtaining only a blowing effect, even in a case where cooling or heating is not required in the vehicle interior, thus efficiently operating the drive motor.

Furthermore, in the above-described vehicle air-conditioning system of the above-described first aspect, the heat pump cycle may be operated in a motor/battery cooling control mode by circulating the refrigerant from the refrigerant compressor to the first refrigerant condenser, the second expansion valve, and the refrigerant/coolant heat exchanger, in this order, thus making it possible to cool the motor/battery via the coolant cycle.

According to the above-described first aspect, while the function of the HVAC unit, that is, the air-conditioning function that includes blowing air into the vehicle interior, is being completely stopped, the heat pump cycle is operated to cause the refrigerant to flow only into the second expansion valve and the refrigerant/coolant heat exchanger, thus making it possible to cool the coolant. Thus, it is possible to forcibly cool the motor/battery by means of the refrigerant via the coolant cycle. Therefore, even in the state in which the air-conditioning function for the vehicle interior is stopped, it is possible to forcibly cool the motor/battery by means of the refrigerant to efficiently operate the drive motor.

Furthermore, according to a second aspect, the present invention provides a vehicle-air-conditioning-system operation control method for automatically operating one of the above-described vehicle air-conditioning systems, the method including the steps of: at the start of operation, reading predetermined setting values of temperature and pressure, detected values obtained from sensors provided at predetermined positions for detecting temperature and pressure, and control panel settings; if the blower has been turned off, performing motor/battery cooling control for performing refrigerant cooling of the motor/battery; if the blower has been turned on, determining whether an air-conditioning switch has been turned on or off; if the air-conditioning switch has been turned off, when a temperature adjusting dial is set at maximum cooling, performing blowing-mode control that includes refrigerant cooling of the motor/battery, and, when the temperature adjusting dial is not set at the maximum cooling, performing heating control; if the air-conditioning switch has been turned on, when the temperature adjusting dial is set at the maximum cooling, performing cooling control, and, when the temperature adjusting dial is not set at the maximum cooling, further determining whether it is necessary to prevent the evaporator from frosting; if it is necessary to prevent the evaporator from frosting, performing the heating control; and if it is not necessary to prevent the evaporator from frosting, performing dehumidifying and heating control.

According to the second aspect of the present invention, at the start of operation, the predetermined setting values, such as an evaporator frost temperature Taef, an air-cooling switching temperature Tcmi1 of the motor/battery, a refrigerant-cooling switching temperature Tcmi2 of the motor/battery, a coolant inlet required temperature Tcni1 of the refrigerant/coolant heat exchanger, an air-side required outlet temperature Taso1 of the second refrigerant condenser, and an inlet required refrigerant pressure Prsi1 of the second refrigerant condenser; the detected values obtained from the sensors detecting, for example, a coolant inlet temperature Tcmi of the motor/battery, a coolant outlet temperature Tcmo of the motor/battery, a coolant inlet temperature Tcni of the refrigerant/coolant heat exchanger, a coolant outlet temperature Tcno of the refrigerant/coolant heat exchanger, a coolant outlet temperature Tcho of the ventilation-exhaust-heat recovery unit, an outside air temperature Taot, an air-side required outlet temperature Taso of the second refrigerant condenser, and an inlet required refrigerant pressure Prsi1 of the second refrigerant condenser; and the settings of the control panel, such as a blowing switch, an air-conditioning switch, and a temperature adjusting dial, are read. Based on this data, the vehicle air-conditioning system is automatically operated through one of motor/battery cooling control that performs refrigerant cooling of the motor/battery; blowing-mode control that includes refrigerant cooling of the motor/battery; heating control; cooling control; and dehumidifying and heating control. Thus, in an electric vehicle, it is possible to realize a comfortable air-conditioning operation by efficiently using the exhaust heat and an efficient cooling operation of the motor/battery.

Furthermore, according to the second aspect, the present invention may provide a vehicle-air-conditioning-system operation control method for performing a cooling-control operation in one of the above-described vehicle air-conditioning systems, the method including the steps of: during cooling control, determining whether the relationship between a coolant inlet temperature Tcmi of the motor/battery in the coolant cycle and a predetermined air-cooling switching temperature Tcmi1 satisfies Tcmi>Tcmi1; and if Tcmi is lower than Tcmi1, circulating, in the heat pump cycle, the refrigerant from the refrigerant compressor to the first refrigerant condenser, the first expansion valve, and the refrigerant evaporator, in this order, thus performing a cooling operation without cooling the motor/battery.

According to the above-described second aspect, during the cooling control, it is determined whether the coolant inlet temperature Tcmi of the motor/battery is equal to or higher than the predetermined air-cooling switching temperature Tcmi1. If Tcmi is lower than Tcmi1, the refrigerant condensed in the first refrigerant condenser is made to flow into the refrigerant evaporator, provided in the HVAC unit, and the cooling operation is performed without cooling the motor/battery. Thus, the cooling operation can be performed while determining the need for cooling the motor/battery according to the coolant inlet temperature of the motor/battery.

Furthermore, the above-described vehicle-air-conditioning-system operation control method of the above-described second aspect may further include the steps of: if the coolant inlet temperature Tcmi is equal to or higher than the air-cooling switching temperature Tcmi1, further determining whether the relationship between the coolant inlet temperature Tcmi and a predetermined refrigerant-cooling switching temperature Tcmi2 satisfies Tcmi>Tcmi2; if Tcmi is equal to or higher than Tcmi2, circulating, in the heat pump cycle, the refrigerant from the refrigerant compressor to the first refrigerant condenser, the first expansion valve, and the refrigerant evaporator, in this order, thus performing the cooling operation, and also concurrently circulating the refrigerant to the second expansion valve and the refrigerant/coolant heat exchanger to perform a cooling operation of the coolant, thus performing refrigerant cooling of the motor/battery via the coolant cycle; and if the coolant inlet temperature Tcmi is lower than Tcmi2, performing air cooling of the motor/battery as well as the cooling operation.

According to the above-described second aspect, if the coolant inlet temperature Tcmi is equal to or higher than the air-cooling switching temperature Tcmi1, it is determined whether the coolant inlet temperature Tcmi is equal to or higher than the predetermined refrigerant-cooling switching temperature Tcmi2. If Tcmi is equal to or higher than Tcmi2, the refrigerant condensed in the first refrigerant condenser is made to flow into the refrigerant evaporator, provided in the HVAC unit, and into the refrigerant/coolant heat exchanger, in parallel, thus performing the cooling operation and also refrigerant cooling of the motor/battery via the coolant cycle. Furthermore, if the coolant inlet temperature Tcmi is lower than Tcmi2, the refrigerant is made to flow only into the refrigerant evaporator without being made to flow into the refrigerant/coolant heat exchanger, thereby performing air cooling of the motor/battery. Thus, while the cooling operation is being performed, the motor/battery can be appropriately cooled according to the coolant inlet temperature of the motor/battery.

Furthermore, according to the second aspect, the present invention may provide a vehicle-air-conditioning-system operation control method for performing a blowing-mode control operation in one of the above-described vehicle air-conditioning systems, the method including the steps of: during blowing-mode control, determining whether the relationship between a coolant inlet temperature Tcmi of the motor/battery in the coolant cycle and a predetermined air-cooling switching temperature Tcmi1 satisfies Tcmi>Tcmi1; and if Tcmi is lower than Tcmi1, regarding cooling of the motor/battery as being unnecessary, and operating only the blower, thus performing a blowing operation.

According to the above-described second aspect, during the blowing-mode control, it is determined whether the coolant inlet temperature Tcmi of the motor/battery is equal to or higher than the predetermined air-cooling switching temperature Tcmi1. If Tcmi is lower than Tcmi1, cooling of the motor/battery is regarded as being unnecessary, and only the blower of the HVAC unit is operated to perform the blowing operation. Thus, the blowing operation can be performed while determining the need for cooling the motor/battery according to the coolant inlet temperature of the motor/battery.

Furthermore, the above-described vehicle-air-conditioning-system operation control method of the above-described second aspect may further include the steps of: if the coolant inlet temperature Tcmi is equal to or higher than the air-cooling switching temperature Tcmi1, further determining whether the relationship between the coolant inlet temperature Tcmi and a predetermined refrigerant-cooling switching temperature Tcmi2 satisfies Tcmi>Tcmi2; if Tcmi is equal to or higher than Tcmi2, operating the blower, thus performing the blowing operation, and also circulating, in the heat pump cycle, the refrigerant from the refrigerant compressor to the first refrigerant condenser, the second expansion valve, and the refrigerant/coolant heat exchanger, in this order, to perform a cooling operation of the coolant, thus performing refrigerant cooling of the motor/battery via the coolant cycle; and if the coolant inlet temperature Tcmi is lower than Tcmi2, performing air cooling of the motor/battery as well as the blowing operation.

According to the above-described second aspect, if the coolant inlet temperature Tcmi is equal to or higher than the air-cooling switching temperature Tcmi1, it is determined whether the coolant inlet temperature Tcmi is equal to or higher than the predetermined refrigerant-cooling switching temperature Tcmi2. If Tcmi is equal to or higher than Tcmi2, the heat pump cycle makes the refrigerant condensed in the first refrigerant condenser flow into the second expansion valve and the refrigerant/coolant heat exchanger to perform the blowing operation and the refrigerant cooling of the motor/battery via the coolant cycle. Furthermore, if the coolant inlet temperature Tcmi is lower than Tcmi2, the heat pump cycle is stopped, and air cooling of the motor/battery is performed. Thus, while performing the blowing operation, the motor/battery can be appropriately cooled according to the coolant inlet temperature of the motor/battery.

Furthermore, according to the second aspect, the present invention may provide a vehicle-air-conditioning-system operation control method for performing a motor/battery cooling control operation in one of the above-described vehicle air-conditioning systems, the method including the steps of: during motor/battery cooling control, determining whether the relationship between a coolant inlet temperature Tcmi of the motor/battery in the coolant cycle and a predetermined air-cooling switching temperature Tcmi1 satisfies Tcmi>Tcmi1; and if Tcmi is lower than Tcmi1, regarding cooling of the motor/battery as being unnecessary, and canceling a cooling operation of the motor/battery.

According to the above-described second aspect, during the motor/battery cooling control, it is determined whether the coolant inlet temperature Tcmi of the motor/battery is equal to or higher than the predetermined air-cooling switching temperature Tcmi1. If Tcmi is lower than Tcmi1, cooling of the motor/battery is regarded as being unnecessary, and the cooling operation of the motor/battery is not performed. Thus, the cooling operation of the motor/battery can be canceled while determining the need for cooling the motor/battery according to the coolant inlet temperature of the motor/battery.

Furthermore, the above-described vehicle-air-conditioning-system operation control method of the above-described second aspect may further include the steps of: if the coolant inlet temperature Tcmi is equal to or higher than the air-cooling switching temperature Tcmi1, further determining whether the relationship between the coolant inlet temperature Tcmi and a predetermined refrigerant-cooling switching temperature Tcmi2 satisfies Tcmi>Tcmi2; if Tcmi is equal to or higher than Tcmi2, circulating, in the heat pump cycle, the refrigerant from the refrigerant compressor to the first refrigerant condenser, the second expansion valve, and the refrigerant/coolant heat exchanger, in this order, to perform a cooling operation of the coolant, thus performing refrigerant cooling of the motor/battery via the coolant cycle; and if the coolant inlet temperature Tcmi is lower than Tcmi2, performing air cooling of the motor/battery.

According to the above-described second aspect, if the coolant inlet temperature Tcmi is equal to or higher than the air-cooling switching temperature Tcmi1, it is determined whether the coolant inlet temperature Tcmi is equal to or higher than the predetermined refrigerant-cooling switching temperature Tcmi2. If Tcmi is equal to or higher than Tcmi2, the heat pump cycle makes the refrigerant condensed in the first refrigerant condenser flow into the second expansion valve and the refrigerant/coolant heat exchanger, to perform the refrigerant cooling of the motor/battery via the coolant cycle. Furthermore, if the coolant inlet temperature Tcmi is lower than Tcmi2, the heat pump cycle is stopped, and air cooling of the motor/battery is performed. Thus, the motor/battery can be appropriately cooled according to the coolant inlet temperature of the motor/battery.

Furthermore, according to the second aspect, the present invention may provide a vehicle-air-conditioning-system operation control method for performing a heating control operation in one of the above-described vehicle air-conditioning systems, the method including the steps of: during heating control, determining whether the relationship between a coolant outlet temperature Tcmo of the motor/battery in the coolant cycle and a coolant outlet temperature Tcno of the refrigerant/coolant heat exchanger satisfies Tcmo>Tcno; and if Tcmo is lower than Tcno, energizing the electric heater, heating coolant in the coolant cycle with the electric heater, and circulating, in the heat pump cycle, the refrigerant from the refrigerant compressor to the second refrigerant condenser, the second expansion valve, and the refrigerant/coolant heat exchanger, in this order, thus performing a heat-pump heating operation by using the coolant as a heat source.

According to the above-described second aspect, during the heating control, it is determined whether the coolant outlet temperature Tcmo of the motor/battery is equal to or higher than the coolant outlet temperature Tcno of the refrigerant/coolant heat exchanger. If Tcmo is lower than Tcno, the electric heater is energized to heat the coolant, and the heat pump cycle makes the refrigerant condensed by the second refrigerant condenser, provided in the HVAC unit, flow into the second expansion valve and the refrigerant/coolant heat exchanger, thus performing the heat-pump heating operation by using the coolant heated by the electric heater as a heat source. Therefore, even at heating start-up time or at a low outside-air temperature (for example, at −10 degrees Celsius), at which it is normally difficult to perform the heat-pump heating because the exhaust heat of the motor/battery cannot be used, it is possible to ensure the required heating capacity by using the coolant heated by the electric heater as a heat source to perform an efficient heating operation.

Furthermore, the above-described vehicle-air-conditioning-system operation control method of the second aspect of the present invention may further include the steps of: if the coolant outlet temperature Tcmo of the motor/battery is equal to or higher than a coolant outlet temperature Tcno of the refrigerant/coolant heat exchanger, determining whether the relationship between the coolant outlet temperature Tcho of the ventilation-exhaust-heat recovery unit and the coolant outlet temperature Tcno of the refrigerant/coolant heat exchanger satisfies Tcho>Tcno; if Tcho is lower than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Taso1 of the second refrigerant condenser satisfies Taso<Taso1; and whether the relationship between an inlet refrigerant pressure Prsi of the second refrigerant condenser and a predetermined inlet required refrigerant pressure Prsi1 of the second refrigerant condenser satisfies Prsi<Prsi1; if each of the coolant inlet temperature Tcni, the air-side outlet temperature Taso, and the inlet refrigerant pressure Prsi does not satisfy the corresponding condition, heating coolant in the coolant cycle with exhaust heat of the motor/battery, and circulating, in the heat pump cycle, the refrigerant from the refrigerant compressor to the second refrigerant condenser, the second expansion valve, and the refrigerant/coolant heat exchanger, in this order, thus performing a heat-pump heating operation by using the coolant as a heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with both the electric heater and the motor/battery, and performing the heat-pump heating operation by using the coolant as a heat source.

According to the second aspect of the present invention, if the coolant outlet temperature Tcmo of the motor/battery is equal to or higher than the coolant outlet temperature Tcno of the refrigerant/coolant heat exchanger, it is determined whether the coolant outlet temperature Tcho of the ventilation-exhaust-heat recovery unit is equal to or higher than the coolant outlet temperature Tcno of the refrigerant/coolant heat exchanger. If Tcho is lower than Tcno, it is further determined whether the coolant inlet temperature Tcni of the refrigerant/coolant heat exchanger is lower than the predetermined coolant inlet required temperature Tcni1 of the refrigerant/coolant heat exchanger; whether the air-side outlet temperature Taso of the second refrigerant condenser is lower than the predetermined air-side required outlet temperature Taso1 of the second refrigerant condenser; and whether the inlet refrigerant pressure Prsi of the second refrigerant condenser is lower than the predetermined inlet required refrigerant pressure Prsi1 of the second refrigerant condenser. If each of the coolant inlet temperature Tcni, the air-side outlet temperature Taso, and the inlet refrigerant pressure Prsi does not satisfy the corresponding condition, the coolant is heated by the exhaust heat of the motor/battery, and the heat pump cycle makes the refrigerant condensed by the second refrigerant condenser, provided in the HVAC unit, flow into the second expansion valve and the refrigerant/coolant heat exchanger to perform the heat-pump heating operation by using this coolant as a heat source. If each of the coolant inlet temperature Tcni, the air-side outlet temperature Taso, and the inlet refrigerant pressure Prsi satisfies the corresponding condition, the electric heater is energized, the coolant is heated by both the electric heater and the motor/battery, and the heat-pump heating operation is performed by using this coolant as a heat source. In this way, if the exhaust heat of the motor/battery can be used, it is further determined whether ventilation exhaust heat can be used. If ventilation exhaust heat cannot be used, it is further determined whether the use of the electric heater is necessary. Only when the electric heater is really necessary, the electric heater is energized to heat the coolant. Thus, in the respective states, it is possible to ensure the required heating capacity to perform an efficient heating operation. At the same time, it is possible to reduce the use of the electric heater as much as possible and to reduce the power consumption of the air-conditioning system, thus contributing to extended vehicle travel distance.

Furthermore, the above-described vehicle-air-conditioning-system operation control method of the above-described second aspect may further include the steps of: if the coolant outlet temperature Tcmo of the motor/battery is equal to or higher than the coolant outlet temperature Tcno of the refrigerant/coolant heat exchanger, determining whether the relationship between a coolant outlet temperature Tcho of the ventilation-exhaust-heat recovery unit and the coolant outlet temperature Tcno of the refrigerant/coolant heat exchanger satisfies Tcho>Tcno; if Tcho is equal to or higher than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Taso1 of the second refrigerant condenser satisfies Taso<Taso1; and whether the relationship between an inlet refrigerant pressure Prsi of the second refrigerant condenser and a predetermined inlet required refrigerant pressure Prsi1 of the second refrigerant condenser satisfies Prsi<Prsi1; if each of the coolant inlet temperature Tcni, the air-side outlet temperature Taso, and the inlet refrigerant pressure Prsi does not satisfy the corresponding condition, heating the coolant in the coolant cycle with exhaust heat of the motor/battery and the ventilation-exhaust-heat recovery unit, and circulating, in the heat pump cycle, the refrigerant from the refrigerant compressor to the second refrigerant condenser, the second expansion valve, and the refrigerant/coolant heat exchanger, in this order, thus performing a heat-pump heating operation by using the coolant as a heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with the electric heater, exhaust heat of the motor/battery, and the ventilation-exhaust-heat recovery unit, and performing the heat-pump heating operation by using the coolant as a heat source.

According to the above-described second aspect, if the coolant outlet temperature Tcmo of the motor/battery is equal to or higher than the coolant outlet temperature Tcno of the refrigerant/coolant heat exchanger, it is determined whether the coolant outlet temperature Tcho of the ventilation-exhaust-heat recovery unit is equal to or higher than the coolant outlet temperature Tcno of the refrigerant/coolant heat exchanger. If Tcho is equal to or higher than Tcno, it is further determined whether the coolant inlet temperature Tcni of the refrigerant/coolant heat exchanger is lower than the predetermined coolant inlet required temperature Tcni1 of the refrigerant/coolant heat exchanger; whether the air-side outlet temperature Taso of the second refrigerant condenser is lower than the predetermined air-side required outlet temperature Taso1 of the second refrigerant condenser; and whether the inlet refrigerant pressure Prsi of the second refrigerant condenser is lower than the predetermined inlet required refrigerant pressure Prsi1 of the second refrigerant condenser. If each of the coolant inlet temperature Tcni, the air-side outlet temperature Taso, and the inlet refrigerant pressure Prsi does not satisfy the corresponding condition, the coolant is heated by the exhaust heat of the motor/battery and the ventilation-exhaust-heat recovery unit. At the same time, the heat pump cycle makes the refrigerant condensed by the second refrigerant condenser, provided in the HVAC unit, flow into the second expansion valve and the refrigerant/coolant heat exchanger to perform the heat-pump heating operation by using this coolant as a heat source. If each of the coolant inlet temperature Tcni, the air-side outlet temperature Taso, and the inlet refrigerant pressure Prsi satisfies the corresponding condition, the electric heater is energized, the coolant is heated by the electric heater, the exhaust heat of the motor/battery, and the ventilation-exhaust-heat recovery unit, and the heat-pump heating operation is performed by using this coolant as a heat source. In this way, if the exhaust heat of the motor/battery can be used, it is determined whether ventilation exhaust heat can be used. If ventilation exhaust heat can be used, it is further determined whether the use of the electric heater is necessary. Only when the electric heater is really necessary, the electric heater is energized to heat the coolant. Thus, in the respective states, it is possible to ensure the required heating capacity to perform an efficient heating operation. At the same time, it is possible to reduce the use of the electric heater as much as possible and to reduce the power consumption of the air-conditioning system, thus contributing to extended vehicle travel distance.

Furthermore, according to the second aspect, the present invention may provide a vehicle-air-conditioning-system operation control method for performing a dehumidifying and heating control operation in one of the above-described vehicle air-conditioning systems, the method including the steps of: during dehumidifying and heating control, determining whether the relationship between a coolant outlet temperature Tcmo of the motor/battery in the coolant cycle and a coolant outlet temperature Tcno of the refrigerant/coolant heat exchanger satisfies Tcmo>Tcno; and if Tcmo is lower than Tcno, energizing the electric heater, heating coolant in the coolant cycle with the electric heater, condensing, in the heat pump cycle, the refrigerant from the refrigerant compressor at the second refrigerant condenser, and concurrently circulating the refrigerant to the first expansion valve and the refrigerant evaporator and to the second expansion valve and the refrigerant/coolant heat exchanger, thus performing a heat-pump dehumidifying and heating operation by using the coolant as a heat source.

According to the above-described second aspect, during the dehumidifying and heating control, it is determined whether the coolant outlet temperature Tcmo of the motor/battery is equal to or higher than the coolant outlet temperature Tcno of the refrigerant/coolant heat exchanger. If Tcmo is lower than Tcno, the electric heater is energized to heat the coolant, and the heat pump cycle makes the refrigerant condensed by the second refrigerant condenser, provided in the HVAC, flow into the refrigerant evaporator, provided in the HVAC, and the refrigerant/coolant heat exchanger, in parallel, thus performing the heat-pump dehumidifying and heating operation by using the coolant heated by the electric heater as a heat source. Therefore, even at heating start-up time or at a low outside-air temperature (for example, at −10 degrees Celsius), at which it is normally difficult to perform heat-pump dehumidifying and heating because the exhaust heat of the motor/battery cannot be used, it is possible to ensure the required heating capacity by using the coolant heated by the electric heater as a heat source to perform an efficient dehumidifying and heating operation.

Furthermore, the above-described vehicle-air-conditioning-system operation control method of the above-described second aspect may further include the steps of: if the coolant outlet temperature Tcmo of the motor/battery is equal to or higher than a coolant outlet temperature Tcno of the refrigerant/coolant heat exchanger, determining whether the relationship between the coolant outlet temperature Tcho of the ventilation-exhaust-heat recovery unit and the coolant outlet temperature Tcno of the refrigerant/coolant heat exchanger satisfies Tcho>Tcno; if Tcho is lower than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Taso1 of the second refrigerant condenser satisfies Taso<Taso1; and whether the relationship between an inlet refrigerant pressure Prsi of the second refrigerant condenser and a predetermined inlet required refrigerant pressure Prsi1 of the second refrigerant condenser satisfies Prsi<Prsi1; if each of the coolant inlet temperature Tcni, the air-side outlet temperature Taso, and the inlet refrigerant pressure Prsi does not satisfy the corresponding condition, heating coolant in the coolant cycle with exhaust heat of the motor/battery, and condensing, in the heat pump cycle, the refrigerant from the refrigerant compressor at the second refrigerant condenser, and concurrently circulating the refrigerant to the first expansion valve and the refrigerant evaporator and to the second expansion valve and the refrigerant/coolant heat exchanger, thus performing a heat-pump dehumidifying and heating operation by using the coolant as a heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with the electric heater and the motor/battery, and performing the heat-pump dehumidifying and heating operation by using the coolant as a heat source.

According to the above-described second aspect, if the coolant outlet temperature Tcmo of the motor/battery is equal to or higher than the coolant outlet temperature Tcno of the refrigerant/coolant heat exchanger, it is determined whether the coolant outlet temperature Tcho of the ventilation-exhaust-heat recovery unit is equal to or higher than the coolant outlet temperature Tcno of the refrigerant/coolant heat exchanger. If Tcho is lower than Tcno, it is further determined whether the coolant inlet temperature Tcni of the refrigerant/coolant heat exchanger is lower than the predetermined coolant inlet required temperature Tcni1 of the refrigerant/coolant heat exchanger; whether the air-side outlet temperature Taso of the second refrigerant condenser is lower than the predetermined air-side required outlet temperature Taso1 of the second refrigerant condenser; and whether the inlet refrigerant pressure Prsi of the second refrigerant condenser is lower than the predetermined inlet required refrigerant pressure Prsi1 of the second refrigerant condenser. If each of the coolant inlet temperature Tcni, the air-side outlet temperature Taso, and the inlet refrigerant pressure Prsi does not satisfy the corresponding condition, the coolant is heated by the exhaust heat of the motor/battery, and the heat pump cycle makes the refrigerant condensed by the second refrigerant condenser, provided in the HVAC unit, flow into the refrigerant evaporator, provided in the HVAC, and the refrigerant/coolant heat exchanger, in parallel, and the heat-pump dehumidifying and heating operation is performed by using this coolant as a heat source. If each of the coolant inlet temperature Tcni, the air-side outlet temperature Taso, and the inlet refrigerant pressure Prsi satisfies the corresponding condition, the electric heater is energized, the coolant is heated by both the electric heater and the motor/battery, and the heat-pump dehumidifying and heating operation is performed by using this coolant as a heat source. In this way, if the exhaust heat of the motor/battery can be used, it is determined whether ventilation exhaust heat can be used. If ventilation exhaust heat cannot be used, it is further determined whether the use of the electric heater is necessary. Only when the electric heater is really necessary, the electric heater is energized to heat the coolant. Thus, in the respective states, it is possible to ensure the required heating capacity to perform an efficient heating operation. At the same time, it is possible to reduce the use of the electric heater as much as possible and to reduce the power consumption of the air-conditioning system, thus contributing to extended vehicle travel distance.

Furthermore, the above-described vehicle-air-conditioning-system operation control method of the above-described second aspect may further include the steps of: if the coolant outlet temperature Tcmo of the motor/battery is equal to or higher than the coolant outlet temperature Tcno of the refrigerant/coolant heat exchanger, determining whether the relationship between a coolant outlet temperature Tcho of the ventilation-exhaust-heat recovery unit and the coolant outlet temperature Tcno of the refrigerant/coolant heat exchanger satisfies Tcho>Tcno; if Tcho is equal to or higher than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Taso1 of the second refrigerant condenser satisfies Taso<Taso1; and whether the relationship between an inlet refrigerant pressure Prsi of the second refrigerant condenser and a predetermined inlet required refrigerant pressure Prsi1 of the second refrigerant condenser satisfies Prsi<Prsi1; if each of the coolant inlet temperature Tcni, the air-side outlet temperature Taso, and the inlet refrigerant pressure Prsi does not satisfy the corresponding condition, heating the coolant in the coolant cycle with exhaust heat of the motor/battery and the ventilation-exhaust-heat recovery unit, and condensing, in the heat pump cycle, the refrigerant from the refrigerant compressor at the second refrigerant condenser, and concurrently circulating the refrigerant to the first expansion valve and the refrigerant evaporator and to the second expansion valve and the refrigerant/coolant heat exchanger, thus performing a heat-pump dehumidifying and heating operation by using the coolant as a heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with the electric heater, exhaust heat of the motor/battery, and the ventilation-exhaust-heat recovery unit, and performing the heat-pump dehumidifying and heating operation by using the coolant as a heat source.

According to the above-described second aspect, if the coolant outlet temperature Tcmo of the motor/battery is equal to or higher than the coolant outlet temperature Tcno of the refrigerant/coolant heat exchanger, it is determined whether the coolant outlet temperature Tcho of the ventilation-exhaust-heat recovery unit is equal to or higher than the coolant outlet temperature Tcno of the refrigerant/coolant heat exchanger. If Tcho is equal to or higher than Tcno, it is further determined whether the coolant inlet temperature Tcni of the refrigerant/coolant heat exchanger is lower than the predetermined coolant inlet required temperature Tcni1 of the refrigerant/coolant heat exchanger; whether the air-side outlet temperature Taso of the second refrigerant condenser is lower than the predetermined air-side required outlet temperature Taso1 of the second refrigerant condenser; and whether the inlet refrigerant pressure Prsi of the second refrigerant condenser is lower than the predetermined inlet required refrigerant pressure Prsi1 of the second refrigerant condenser. If each of the coolant inlet temperature Tcni, the air-side outlet temperature Taso, and the inlet refrigerant pressure Prsi does not satisfy the corresponding condition, the coolant is heated by the exhaust heat of the motor/battery and the ventilation-exhaust-heat recovery unit, and the heat pump cycle makes the refrigerant condensed by the second refrigerant condenser, provided in the HVAC unit, flow into the refrigerant evaporator, provided in the HVAC, and the refrigerant/coolant heat exchanger, to perform the heat-pump dehumidifying and heating operation by using this coolant as a heat source. If each of the coolant inlet temperature Tcni, the air-side outlet temperature Taso, and the inlet refrigerant pressure Prsi satisfies the corresponding condition, the electric heater is energized, the coolant is heated by the electric heater, the exhaust heat of the motor/battery, and the ventilation-exhaust-heat recovery unit, and the heat-pump dehumidifying and heating operation is performed by using this coolant as a heat source. In this way, if the exhaust heat of the motor/battery can be used, it is determined whether ventilation exhaust heat can be used. If ventilation exhaust heat can be used, it is further determined whether the use of the electric heater is necessary. Only when the electric heater is really necessary, the electric heater is energized to heat the coolant. Thus, in the respective states, it is possible to ensure the required heating capacity to perform an efficient dehumidifying and heating operation. At the same time, it is possible to reduce the use of the electric heater as much as possible and to reduce the power consumption of the air-conditioning system, thus contributing to extended vehicle travel distance.

Advantageous Effects of Invention

According to the vehicle air-conditioning system of the present invention, during the heat-pump heating and the dehumidifying and heating, performed by the heat pump cycle, the exhaust heat recovered from the exhaust air from the vehicle interior can be efficiently used as a heat source for heating. Therefore, at a low outside-air temperature or at heating start-up time, it is possible to ensure the required capacity by using the heat of the electric heater to perform stable heating or dehumidifying and heating. Furthermore, when exhaust heat from the motor/battery can be used, or when the vehicle interior temperature reaches a target temperature and exhaust heat from the ventilation-exhaust-heat recovery unit can be used, the exhaust heat is preferentially used to reduce the use of the electric heater as much as possible, thus enabling efficient operation with reduced power consumption and to contribute to extended vehicle travel distance.

Furthermore, according to the vehicle-air-conditioning-system operation control method of the present invention, based on the predetermined setting values of temperature and pressure, the detected values obtained from sensors provided at predetermined positions for detecting temperature or pressure, and settings of the control panel, it is possible to automatically operate the above-described vehicle air-conditioning system through one of the motor/battery cooling control, which performs refrigerant cooling of the motor/battery; the blowing-mode control, which includes refrigerant cooling of the motor/battery; the heating control; the cooling control; and the dehumidifying and heating control. Therefore, in an electric vehicle, it is possible to realize a comfortable air-conditioning operation by efficiently using exhaust heat and an efficient cooling operation for the motor/battery.

BRIEF DESCRIPTION OF DRAWINGS

FIG. 8 is a diagram showing a list of operation-mode patterns shown in FIGS. 3 to 7.

DESCRIPTION OF EMBODIMENTS

Figure 1:
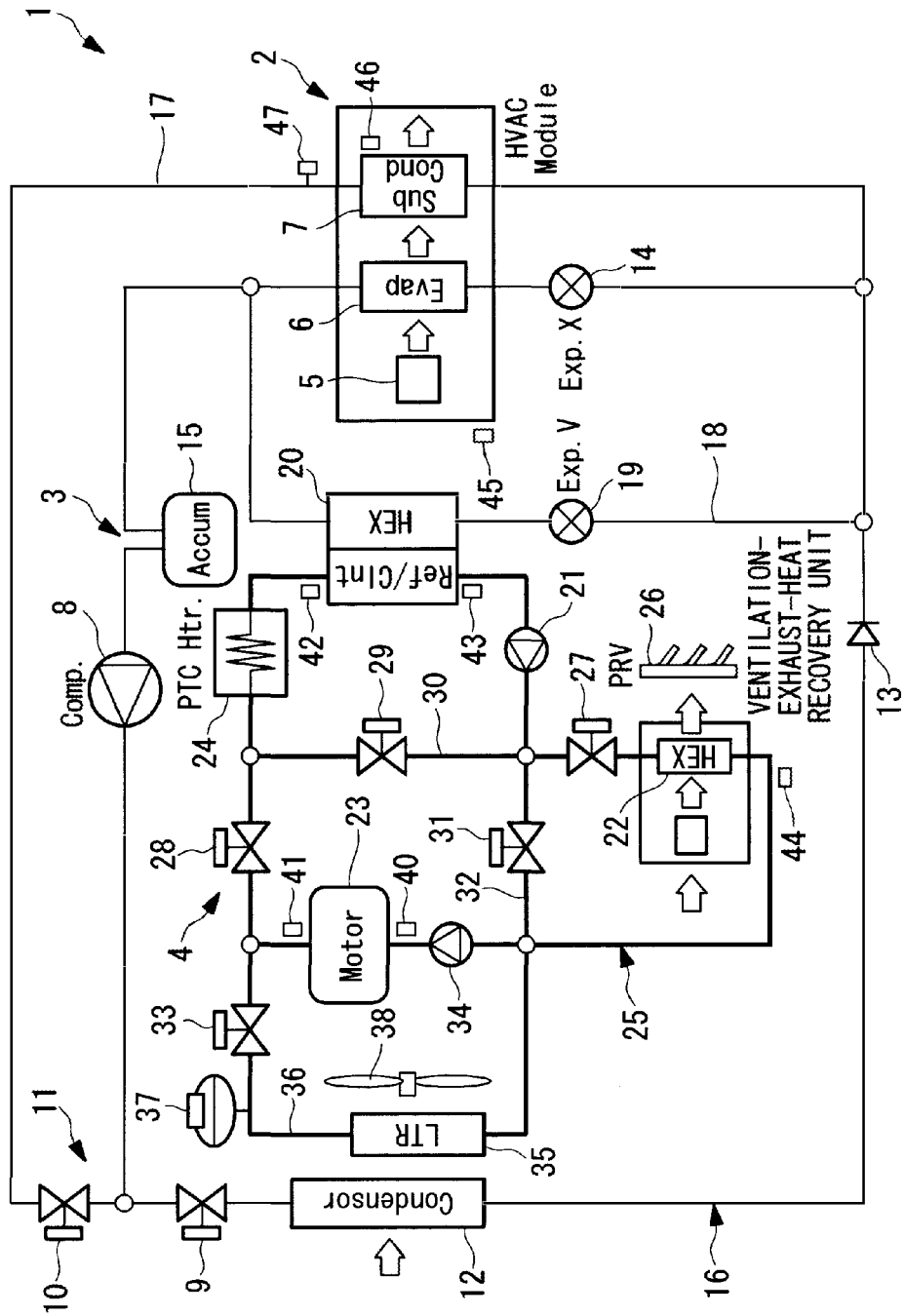
FIG. 1 is a diagram of the system configuration of a vehicle air-conditioning system according to a first embodiment of the present invention.

Embodiments of the present invention will be described below with reference to the drawings.
First Embodiment
A first embodiment of the present invention will be described below with reference to FIGS. 1 to 27.
FIG. 1 is a diagram showing the system configuration of a vehicle air-conditioning system 1 according to the first embodiment of the present invention. The vehicle air-conditioning system 1 is composed of an HVAC (heating ventilation and air conditioning) unit 2, a heat pump cycle 3, and a coolant cycle 4.

The HVAC unit 2 includes a blower for blowing air (blower) 5, a refrigerant evaporator 6 that constitutes the heat pump cycle 3, and a second refrigerant condenser 7 that is also called a sub-condenser, the refrigerant evaporator 6 and the second refrigerant condenser 7 being sequentially provided in a blowing path of the blower 5 from the upstream side to the downstream side. The HVAC unit 2 is installed in an instrument panel of a vehicle to blow, into a vehicle interior, air whose temperature has been adjusted by the refrigerant evaporator 6 and the second refrigerant condenser 7, thus performing air conditioning of the vehicle interior.

The heat pump cycle 3 has a closed-cycle refrigerant circuit 16 in which a refrigerant compressor 8 having an electric motor for compressing refrigerant; a refrigerant circuit changeover section 11 that is composed of a first solenoid valve 9 and a second solenoid valve 10 provided in refrigerant pipes branched at a discharge side of the refrigerant compressor 8 and that changes the refrigerant circulating direction; a first refrigerant condenser 12 performing heat exchange between the refrigerant and outside air and a check valve 13 that are sequentially provided in the refrigerant pipe at the first solenoid valve 9 side; the refrigerant evaporator 6 provided in the refrigerant pipe at the downstream side of the check valve 13 via a first expansion valve (EEV; electronic expansion valve) 14; and an accumulator 15 provided in the intake-side refrigerant pipe at the downstream side of the refrigerant evaporator 6 are connected in this order.

Furthermore, the heat pump cycle 3 includes the second refrigerant condenser 7 connected in a refrigerant pipe 17 that extends from the second solenoid valve 10 to an inlet side of the first expansion valve 14, in parallel with the first refrigerant condenser 12 and the check valve 13; and a second expansion valve (EEV; electronic expansion valve) 19 and a refrigerant/coolant heat exchanger 20 connected in a refrigerant pipe 18, in parallel with the first expansion valve 14 and the refrigerant evaporator 6. Note that the refrigerant/coolant heat exchanger 20 performs heat exchange between the refrigerant circulating in the heat pump cycle 3 and coolant circulating in the coolant cycle 4.

The coolant cycle 4 has a closed-cycle coolant circuit 25 in which the refrigerant/coolant heat exchanger 20, a coolant circulating pump 21, a ventilation-exhaust-heat recovery unit 22 that recovers heat from air discharged from the vehicle interior to the outside, a drive motor and/or its power battery 23 (hereinafter, simply referred to as "motor/battery", and the motor includes or does not include an inverter for driving the motor), and an electric heater (PTC) 24, such as a PTC heater, are sequentially connected. In the coolant circuit 25, the electric heater 24 is provided at the upstream side of the refrigerant/coolant heat exchanger 20, and the ventilation-exhaust-heat recovery unit 22 is provided at the downstream side of the refrigerant/coolant heat exchanger 20. Note that a pressure relief valve (PRV) 26 is provided in a vehicle-interior-air discharging path where the ventilation-exhaust-heat recovery unit 22 is provided.

Furthermore, in the coolant cycle 4, a third solenoid valve 27 is provided at an inlet side of the ventilation-exhaust-heat recovery unit 22, a fourth solenoid valve 28 is provided at an outlet side of the motor/battery 23, a first bypass circuit 30 having a fifth solenoid valve 29 is connected to bypass the ventilation-exhaust-heat recovery unit 22 and the motor/battery 23, and a second bypass circuit 32 having a sixth solenoid valve 31 is connected to bypass the ventilation-exhaust-heat recovery unit 22.

Furthermore, in the coolant cycle 4, a motor/battery cooling circuit 36 having a radiator 35 for performing air cooling of the coolant is provided between the outlet side and the inlet side of the motor/battery 23 via a seventh solenoid valve 33 and a second coolant-circulating pump 34. Note that a reserve tank 37 is connected to the motor/battery cooling circuit 36, and a cooling fan 38 that makes outside air flow is provided facing the radiator 35. Furthermore, the radiator 35, the cooling fan 38, and the first refrigerant condenser 12 may be replaced with a condenser radiator fan module (CRFM), which is realized by integrating them.

Since the vehicle air-conditioning system 1 of this embodiment is configured as described above, the refrigerant compressed at the refrigerant compressor 8 of the heat pump cycle 3 is introduced from the first solenoid valve 9 of the refrigerant circuit changeover section 11 to the first refrigerant condenser 12, where it is condensed, is then made to flow into the refrigerant evaporator 6, provided in the HVAC unit 2, via the check valve 13 and the first expansion valve 14, and is heat-exchanged with air blown from the blower 5 to cool the air, and this cooled air is blown out to the vehicle interior, thus making it possible to use it for cooling the vehicle interior. At the same time, the refrigerant is guided to the refrigerant/coolant heat exchanger 20 via the second expansion valve 19 to cool the coolant in the coolant cycle 4 with this refrigerant, and the coolant is circulated to the motor/battery 23 by the coolant circulating pump 21, thus making it possible to perform refrigerant cooling of the motor/battery 23 while performing cooling of the vehicle interior.

Furthermore, while operating the heat pump cycle 3 as described above, the refrigerant condensed in the first refrigerant condenser 12 is guided only to the refrigerant/coolant heat exchanger 20 via the second expansion valve 19 to cool the coolant in the coolant cycle 4, thus making it possible to cool the motor/battery 23 by means of the refrigerant in a state in which cooling of the vehicle interior is being stopped or in a blowing-mode state in which only the blower 5 is being operated. Note that the motor/battery 23 can be subjected to air cooling by circulating the coolant to the motor/battery cooling circuit 36 via the seventh solenoid valve 33 and the second coolant-circulating pump 34 to make the radiator 35 function, in a state in which the heat pump cycle 3 is being stopped.

On the other hand, the refrigerant compressed in the refrigerant compressor 8 of the heat pump cycle 3 is guided to the second refrigerant condenser 7, provided in the HVAC unit 2, via the second solenoid valve 10 of the refrigerant circuit changeover section 11 and the refrigerant pipe 17 and is heat-exchanged with air blown from the blower 5 to heat the air, and this air is blown out to the vehicle interior, thus making it possible to use it for heating the vehicle interior. In this case, the refrigerant from which heat has been released and which has been condensed at the second refrigerant condenser 7 is introduced to the refrigerant/coolant heat exchanger 20 via the second expansion valve 19, absorbs heat from the coolant in the coolant cycle 4 to be evaporated, and is then sucked into the refrigerant compressor 8 via the accumulator 15.

Similarly, in the heat pump cycle 3, the refrigerant condensed in the second refrigerant condenser 7 can be made to flow both into the first expansion valve 14 and the refrigerant evaporator 6 and into the second expansion valve 19 and the refrigerant/coolant heat exchanger 20, in parallel. Thus, while heat is being absorbed from the coolant in the coolant cycle 4, air blown from the blower 5 is first subjected to cooling and dehumidifying at the refrigerant evaporator 6 in the HVAC unit 2 and is then heated at the second refrigerant condenser 7, thus making it possible to perform dehumidifying and heating.

During the above-described heating and the above-described dehumidifying and heating, in the heat pump cycle 3, the refrigerant is evaporated by absorbing heat from the coolant at the refrigerant/coolant heat exchanger 20, thereby performing the heating and the dehumidifying and heating by using the coolant as a heat source. While circulating in the coolant cycle 25 via the coolant circulating pump 21, this coolant selects one of the following five heat-source types obtained by combining three heat sources, that is, the motor/battery 23, the electric heater 24, and the ventilation-exhaust-heat recovery unit 22, and recovers the heat thereof at the refrigerant/coolant heat exchanger 20 to use it as a heat source for heating, in the heat pump cycle 3.

(A) A combination of the ventilation-exhaust-heat recovery unit 22, the motor/battery 23, and the electric heater 24.

(B) A combination of the ventilation-exhaust-heat recovery unit 22 and the motor/battery 23.

(C) A combination of the motor/battery 23 and the electric heater 24.

(D) The motor/battery 23 only.

(E) The electric heater 24 only.

In this way, since the ventilation exhaust heat of vehicle-interior air recovered by the ventilation-exhaust-heat recovery unit 22 is used, in addition to the exhaust heat of the motor/battery 23 and the heat of the electric heater 24, the heat source used for heating can be diversified.

Among the above-described five heat-source types, when type (A), which includes the ventilation-exhaust-heat recovery unit 22, the motor/battery 23, and the electric heater 24, is used, it is just necessary to circulate the coolant to the ventilation-exhaust-heat recovery unit 22, the motor/battery 23, and the electric heater 24, in this order, with the third solenoid valve 27 and the fourth solenoid valve 28 being open and the fifth solenoid valve 29 and the sixth solenoid valve 31 being closed. When type (C), which includes the motor/battery 23 and the electric heater 24, is used, it is just necessary to circulate the coolant to the motor/battery 23 and the electric heater 24 via the second bypass circuit 32 by bypassing the ventilation-exhaust-heat recovery unit 22, with the sixth solenoid valve 31 and the fourth solenoid valve 28 being open and the fifth solenoid valve 29 and the third solenoid valve 27 being closed. Furthermore, when type (E), which includes only the electric heater 24, is used, it is just necessary to circulate the coolant to the electric heater 24 by bypassing the ventilation-exhaust-heat recovery unit 22 and the motor/battery 23, with the third solenoid valve 27, the fourth solenoid valve 28, and the sixth solenoid valve 31 being closed and the fifth solenoid valve 29 being open. Note that, when types (B) and (D) are used, it is just necessary to turn off the electric heater 24 while the respective solenoid valves are being set in the same open-close states as in (A) and (C), respectively.

Thus, according to this embodiment, during heat-pump heating or dehumidifying and heating, performed by the heat pump cycle 3, exhaust heat recovered via the ventilation-exhaust-heat recovery unit 22 from exhaust air from the vehicle interior can be efficiently used as a heat source for heating. Thus, at a low outside-air temperature or at heating start-up time, it is possible to ensure the required capacity by using the heat of the electric heater 24 to perform stable heating or dehumidifying and heating. Furthermore, when exhaust heat from the motor/battery 23 can be used, or when the vehicle interior temperature reaches a target temperature and exhaust heat from the ventilation-exhaust-heat recovery unit 22 can be used, the exhaust heat is preferentially used to reduce the use of the electric heater 24 as much as possible, thus enabling efficient operation with reduced power consumption. Therefore, this can also contribute to extended vehicle travel distance.

Furthermore, since the first bypass circuit 30 and the second bypass circuit 32 are provided in the coolant cycle 4, the coolant is selectively made to flow into the first bypass circuit 30 or the second bypass circuit 32 according to the heat-source selection and is thus efficiently heated and circulated by bypassing the ventilation-exhaust-heat recovery unit 22 and the motor/battery 23 or the ventilation-exhaust-heat recovery unit 22. Therefore, it is possible to reduce power consumption at the coolant circulating pump 21 and the electric heater (PTC) 24.

Furthermore, since the motor/battery cooling circuit 36 for performing air cooling by using the radiator 35 is provided in the coolant cycle 4, it is possible to use both the refrigerant cooling of the motor/battery 23 performed via the coolant cycle 4 by using the cooling function of the heat pump cycle 3 and the air cooling of the motor/battery 23 performed via the radiator 35, as needed. Thus, while monitoring the coolant inlet temperature of the motor/battery 23, the motor/battery 23 can be efficiently and reliably cooled through refrigerant cooling or air cooling.

Furthermore, according to this embodiment, it is possible to select one from the following operation modes through a cycle change in the heat pump cycle 3 and the coolant cycle 4.

(1) A cooling control operation that is performed when, while the blower 5 of the HVAC unit 2 is being operated, the refrigerant evaporator 6, provided in the HVAC unit 2, of the heat pump cycle 3 is made to function as an evaporator, and the first refrigerant condenser 12 is made to function as a condenser.

(2) A blowing-mode control operation that includes the refrigerant cooling of the motor/battery 23 in which, while the blower 5 of the HVAC unit 2 is being operated, the first refrigerant condenser 12 of the heat pump cycle 3 is made to function as a condenser, and the refrigerant/coolant heat exchanger 20 is made to function as an evaporator, to cool the coolant, thus cooling the motor/battery 23 by means of the refrigerant via the coolant cycle 4.

(3) A motor/battery cooling control operation in which, in a state in which the blower 5 of the HVAC unit 2 is being stopped, the first refrigerant condenser 12 of the heat pump cycle 3 is made to function as a condenser, and the refrigerant/coolant heat exchanger 20 is made to function as an evaporator, to cool the coolant, thus cooling the motor/battery 23 by means of the refrigerant via the coolant cycle 4.

(4) A heating control operation that is performed when, while the blower 5 of the HVAC unit 2 is being operated, the coolant heated by the ventilation-exhaust-heat recovery unit 22, the motor/battery 23, and the electric heater 24 of the coolant cycle 4 is used as a heat source, the second refrigerant condenser 7, provided in the HVAC unit 2, of the heat pump cycle 3 is made to function as a condenser, and the refrigerant/coolant heat exchanger 20 is made to function as an evaporator.

(5) A dehumidifying and heating control operation that is performed when, while the blower 5 of the HVAC unit 2 is being operated, the coolant heated in the same way as in (4) is used as a heat source, the second refrigerant condenser 7, provided in the HVAC unit 2, of the heat pump cycle 3 is made to function as a condenser, and the refrigerant evaporator 6 and the refrigerant/coolant heat exchanger 20 are made to function as evaporators.

Therefore, according to the vehicle air-conditioning system 1 of this embodiment, in addition to efficient operations of cooling, heating, and dehumidifying and heating, it is possible to perform various operations, such as a blowing operation that includes the refrigerant cooling of the motor/battery 23 and a refrigerant cooling operation of the motor/battery 23, to make wide use of the vehicle air-conditioning system 1.

Furthermore, in the coolant cycle 4, it is possible to select one of the above-described five heat-source types (A) to (E) obtained by combining the three heat sources, that is, the ventilation-exhaust-heat recovery unit 22, the motor/battery 23, and the electric heater 24 connected in the cycle and to recover the heat thereof at the refrigerant/coolant heat exchanger 20 to use it as a heat source for heating, in the heat pump cycle 3. In this way, since ventilation exhaust heat of vehicle-interior air recovered by the ventilation-exhaust-heat recovery unit 22 is used, the heat source used for heating can be diversified, and therefore, it is possible to reduce the use of the electric heater 24 accordingly and to reduce power consumption in the air-conditioning system 1.

Furthermore, in this embodiment, in the heat pump cycle 3, the second expansion valve 19 and the refrigerant/coolant heat exchanger 20 are connected in parallel with the first expansion valve 14 and the refrigerant evaporator 6. Therefore, it is possible to make the refrigerant condensed in the first refrigerant condenser 12 flow into the refrigerant evaporator 6, provided in the HVAC unit 2, to perform the cooling control mode operation, and also to make it flow concurrently into the refrigerant/coolant heat exchanger 20, which is connected in parallel with the refrigerant evaporator 6, to cool the coolant, thus cooling the motor/battery 23 by means of the refrigerant via the coolant cycle 4. Therefore, under a high-temperature environment, while cooling the vehicle interior, the motor/battery 23 can be forcibly cooled by means of the refrigerant, to efficiently operate the drive motor.

Similarly, while the blower 5 is being driven to perform the blowing operation with the HVAC unit 2, it is possible to operate the heat pump cycle 3 to cause the refrigerant condensed in the first refrigerant condenser 12 to flow only into the second expansion valve 19 and the refrigerant/coolant heat exchanger 20, thus cooling the coolant. Thus, it is possible to cool the motor/battery 23 by means of the refrigerant through the cooled coolant via the coolant cycle 4, and therefore, to forcibly cool the motor/battery 23 by means of the refrigerant while obtaining only a blowing effect, even in a case where cooling or heating is not required in the vehicle interior, thus efficiently operating the drive motor.

Furthermore, according to this embodiment, while the function of the HVAC unit 2, that is, the air-conditioning function that includes blowing air into the vehicle interior, is being completely stopped, the heat pump cycle 3 is operated, as described above, to cause the refrigerant condensed in the first refrigerant condenser 12 to flow only into the second expansion valve 19 and the refrigerant/coolant heat exchanger 20, thus making it possible to cool the coolant. Thus, it is possible to forcibly cool the motor/battery 23 by means of the refrigerant through the cooled coolant via the coolant cycle 4. Therefore, even in the state in which the air-conditioning function for the vehicle interior is stopped, it is possible to forcibly cool the motor/battery 23 by means of the refrigerant to efficiently operate the drive motor.

Second Embodiment

Next, a second embodiment of the present invention will be described with reference to FIGS. 2 to 27.

This embodiment relates to an operation control method for automatically operating the vehicle air-conditioning system of the above-described first embodiment. FIGS. 2 to 7 show control flows of the operation control method. FIG. 8 shows a diagram of a list of operation mode patterns. FIGS. 9 to 27 show cycle diagrams in which the flows of the refrigerant and the coolant are indicated (by arrows in the figures) in respective operation modes.

Figure 2:
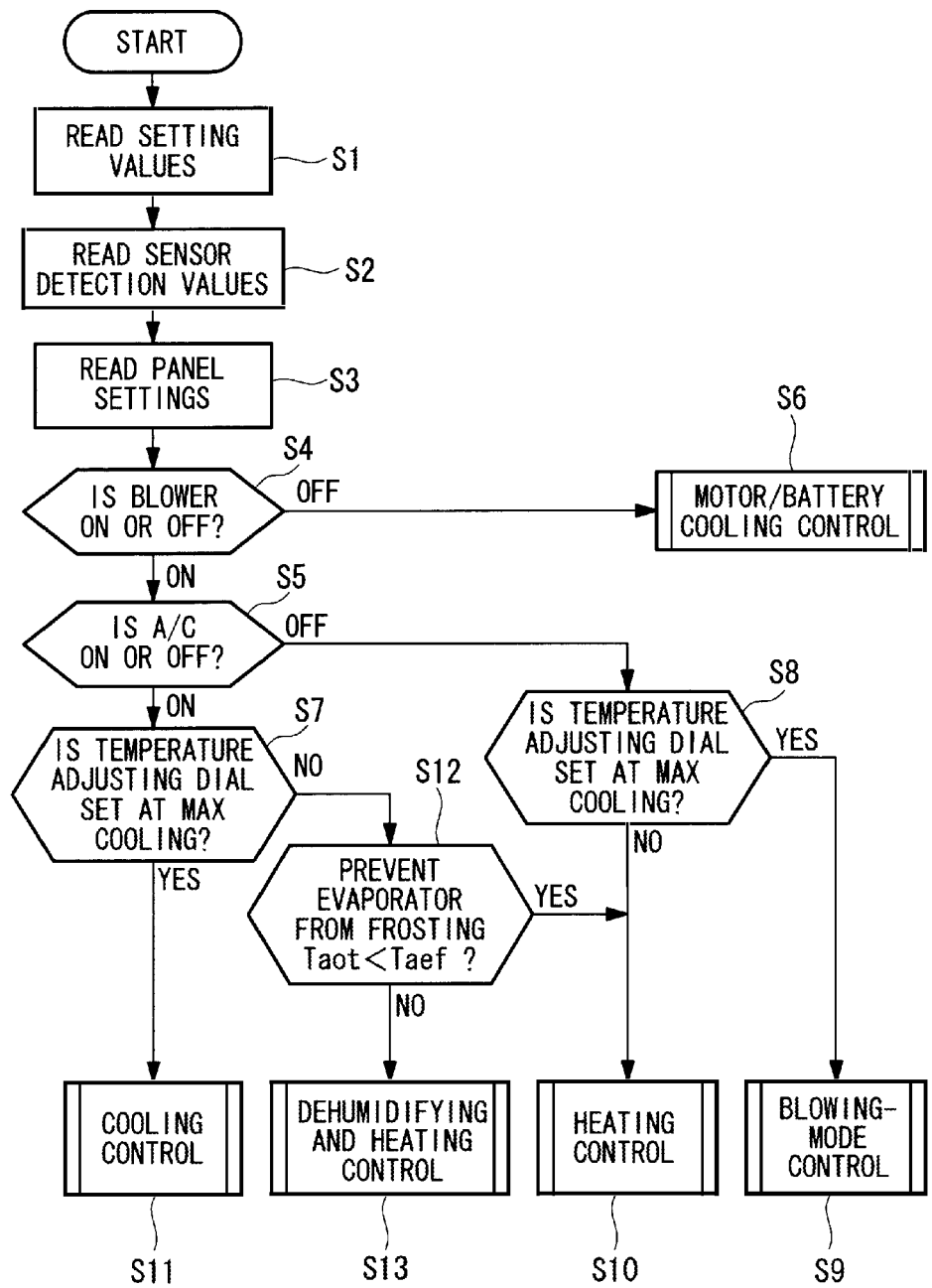
FIG. 2 is a diagram of a control flow for automatically operating the vehicle air-conditioning system shown in FIG. 1.

According to this embodiment, as shown in FIG. 2, when the operation is started (START), in Step S1, predetermined setting values are read, such as a frost temperature Taef of the refrigerant evaporator 6, an air-cooling switching temperature Tcmi1 of the motor/battery 23, a refrigerant-cooling switching temperature Tcmi2 of the motor/battery 23, a coolant inlet required temperature Tcni1 of the refrigerant/coolant heat exchanger 20, an air-side required outlet temperature Taso1 of the second refrigerant condenser 7, and an inlet required refrigerant pressure Prsi1 of the second refrigerant condenser 7.

Then, in Step S2, a coolant inlet temperature Tcmi of the motor/battery 23 is detected by a sensor 40 whose location is shown in FIG. 1, a coolant outlet temperature Tcmo of the motor/battery 23 is detected by a sensor 41, a coolant inlet temperature Tcni of the refrigerant/coolant heat exchanger 20 is detected by a sensor 42, a coolant outlet temperature Tcno of the refrigerant/coolant heat exchanger 20 is detected by a sensor 43, a coolant outlet temperature Tcho of the ventilation-exhaust-heat recovery unit is detected by a sensor 44, an outside air temperature Taot is detected by a sensor 45, an air-side required outlet temperature Taso of the second refrigerant condenser 7 is detected by a sensor 46, and an inlet required refrigerant pressure Prsi1 of the second refrigerant condenser 7 is detected by a sensor 47, and those detected values are read.

Furthermore, in Step S3, panel settings at a blowing switch, an air-conditioning switch, and a temperature adjusting dial that are provided in a control panel (not shown) are read.

In Step S4, based on these pieces of data, it is first determined whether the blowing switch has been turned on or off. If the blowing switch has been turned on, the flow advances to Step S5. If the blowing switch has been turned off, the flow advances to Step S6. In Step S6, the motor/battery cooling control operation is performed, as described later.

On the other hand, in Step S5, it is determined whether the air-conditioning switch has been turned on or off. If the air-conditioning switch has been turned on, the flow advances to Step S7. If the air-conditioning switch has been turned off, the flow advances to Step S8. In Step S8, it is determined whether the temperature adjusting dial has been set at max. cooling (maximum cooling). If "YES", the flow advances to Step S9. In Step S9, the blowing-mode control is performed, as described later. Furthermore, if "NO" in Step S8, the flow advances to Step S10. In Step S10, the heating control operation is performed, as described later.

Furthermore, in Step S7, it is similarly determined whether the temperature adjusting dial has been set at max. cooling (maximum cooling). If "YES", the flow advances to Step S11. In Step S11, the cooling control operation is performed, as described later. If "NO" in Step S7, the flow advances to Step S12, and it is determined whether the relationship between the outside air temperature Taot, detected by the sensor 45, and the predetermined frost temperature Taef of the refrigerant evaporator 6 satisfies Taot<Taef. As a result, if "YES", the flow advances to Step S10, and the heating control operation is performed, as described later. If "NO", the flow advances to Step S13, and the dehumidifying and heating control operation is performed, as described later.

In this way, the vehicle air-conditioning system 1 can be automatically performed through one of the cooling control operation (1), the blowing-mode control operation (2), which includes refrigerant cooling of the motor/battery 23, the motor/battery cooling control operation (3), which performs refrigerant cooling of the motor/battery 23, the heating control operation (4), and the dehumidifying and heating control operation (5). Therefore, in an electric vehicle, it is possible to realize a comfortable air-conditioning operation by efficiently using the exhaust heat of the motor/battery 23 and the ventilation exhaust heat and an efficient cooling operation of the motor/battery 23.

Specific operation control methods for the cooling control operation (1), the blowing-mode control operation (2), the motor/battery cooling control operation (3), the heating control operation (4), and the dehumidifying and heating control operation (5) will be described below with reference to the control flows shown in FIGS. 3 to FIG. 7 and the cycle diagrams shown in FIGS. 9 to 27.

Cooling Control

Figure 3:
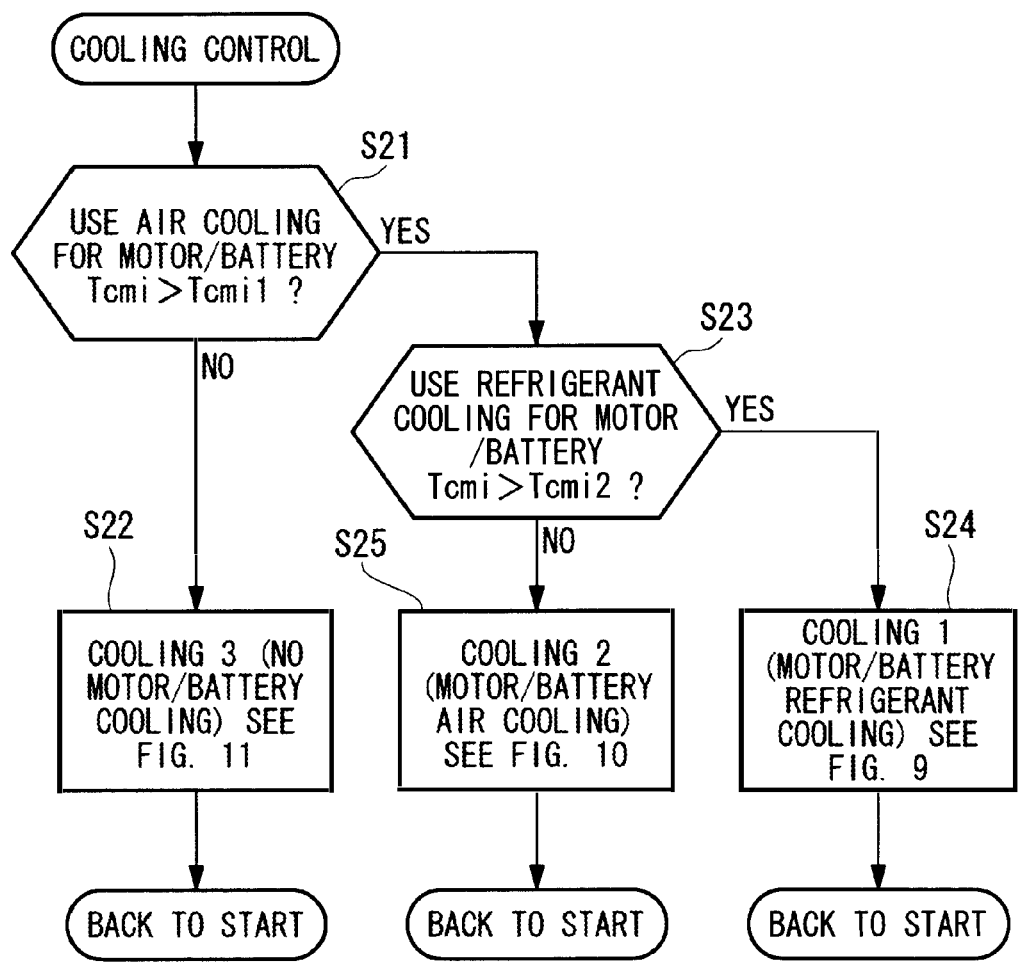
FIG. 3 is a diagram of a control flow for a cooling control operation in the control flow shown in FIG. 2.
Figure 11:
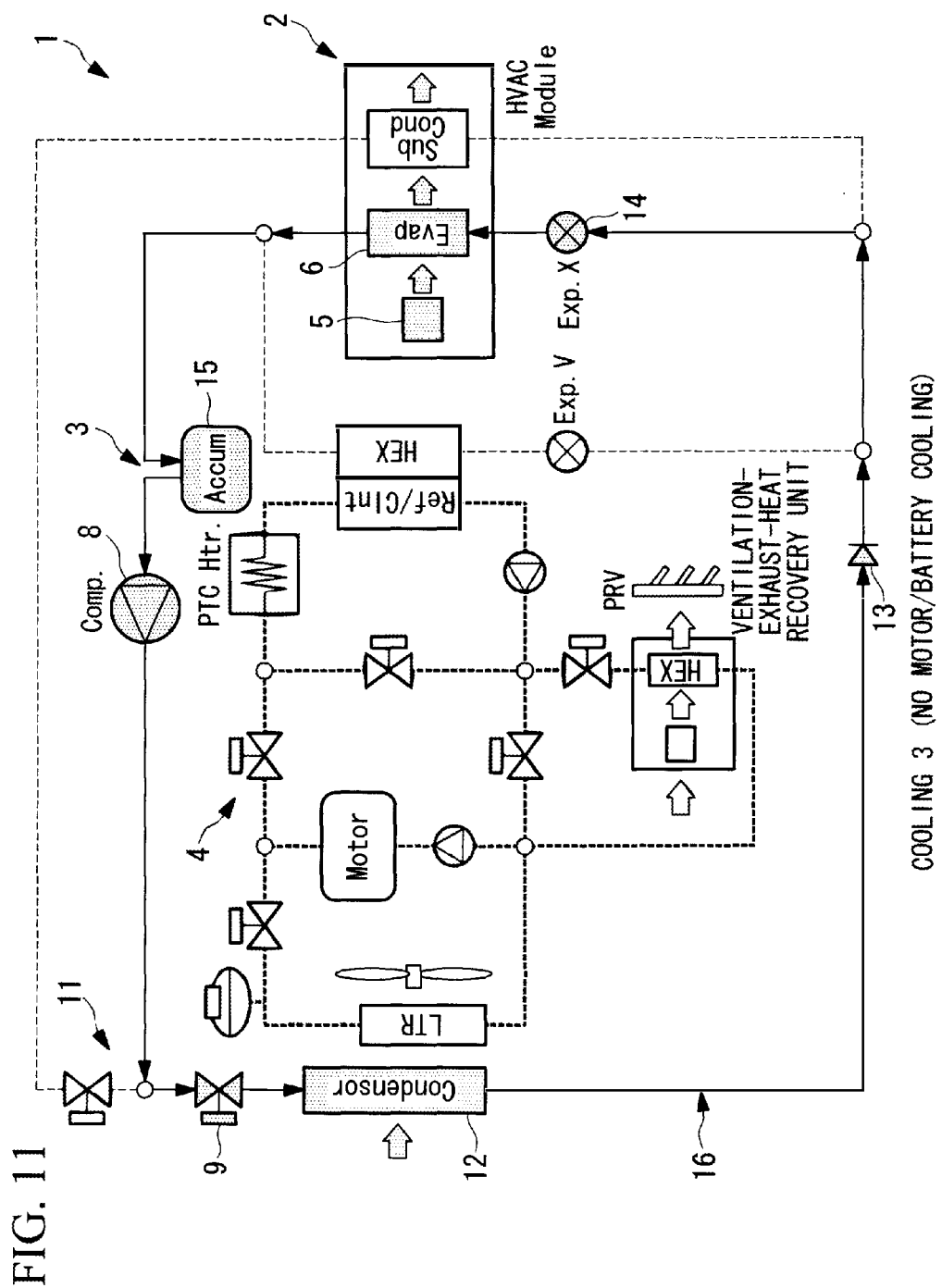
FIG. 11 is a cycle diagram for cooling 3 (no motor/battery cooling) in the cooling control operation shown in FIG. 3.

During the cooling control, as shown in FIG. 3, in Step S21, it is determined whether the motor/battery 23 should use air cooling. This is determined by determining whether the relationship between the coolant inlet temperature Tcmi of the motor/battery 23, detected by the sensor 40, and the predetermined air-cooling switching temperature Tcmi1 satisfies Tcmi>Tcmi1. As a result, if it is determined that Tcmi is lower than Tcmi1 ("NO"), the flow advances to cooling 3 in Step S22. As shown in FIG. 11, in the heat pump cycle 3, the refrigerant discharged from the refrigerant compressor 8 is circulated by the refrigerant circuit changeover section 11 to the first refrigerant condenser 12, the first expansion valve 14, and the refrigerant evaporator 6, in this order, and air from the blower 5 is cooled in the refrigerant evaporator 6, provided in the HVAC unit 2, and is blown out to the vehicle interior, thus making it possible to perform the cooling operation. In this case, cooling of the motor/battery 23 is regarded as being unnecessary, and a cooling operation for the motor/battery 23 is not performed.

Figure 9:
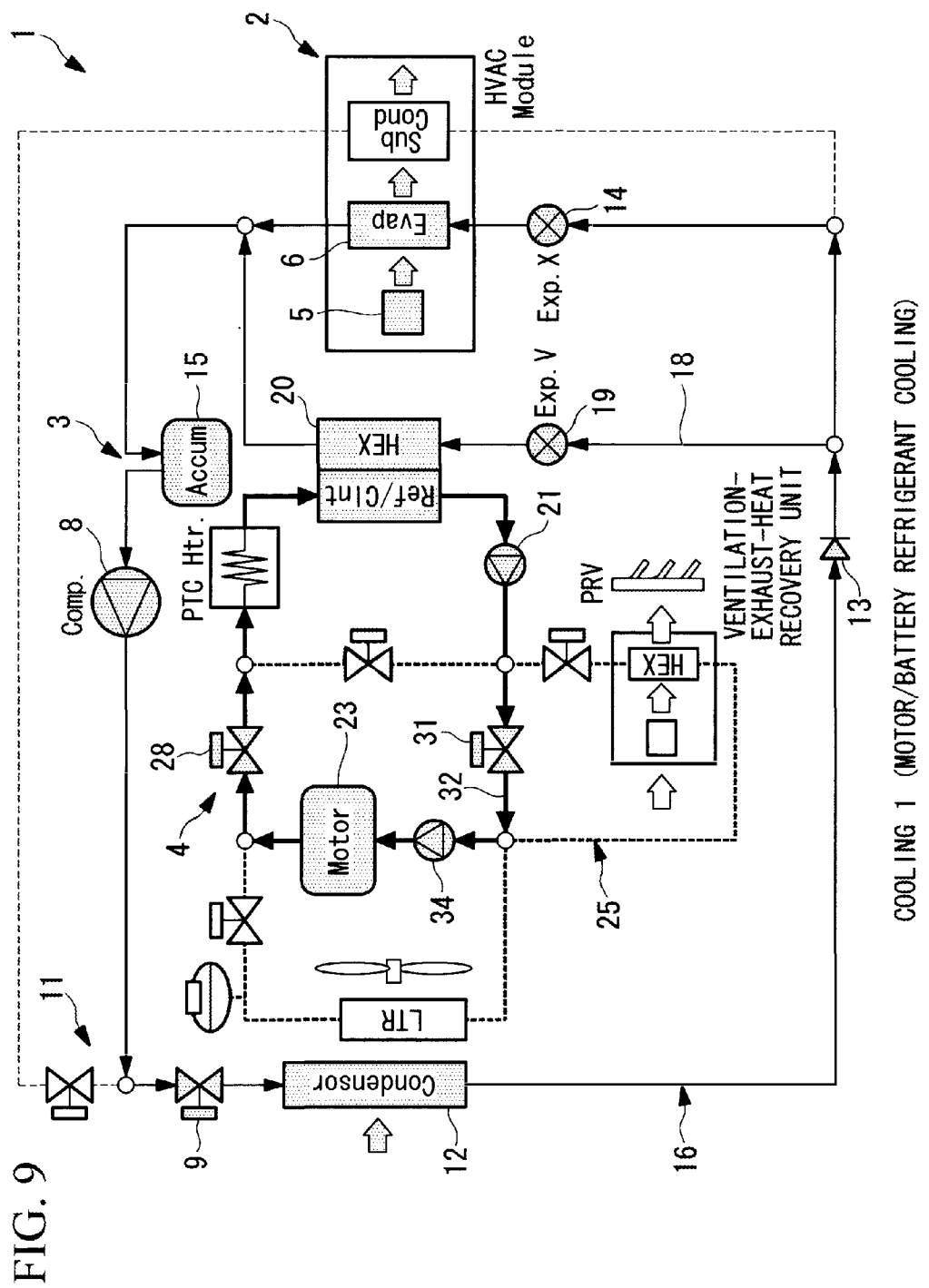
FIG. 9 is a cycle diagram for cooling 1 (motor/battery refrigerant cooling) in the cooling control operation shown in FIG. 3.

On the other hand, if it is determined in Step S21 that Tcmi is equal to or higher than Tcmi1 ("YES"), it is determined in Step S23 whether the motor/battery 23 should use refrigerant cooling. This is determined by determining whether the relationship between the coolant inlet temperature Tcmi, detected by the sensor 40, and the predetermined refrigerant-cooling switching temperature Tcmi2 satisfies Tcmi>Tcmi2. If it is determined that Tcmi is equal to or higher than Tcmi2 ("YES"), the flow advances to cooling 1 in Step S24. As shown in FIG. 9, in the heat pump cycle 3, the refrigerant discharged from the refrigerant compressor 8 is guided to the first refrigerant condenser 12, where it is condensed, and is then circulated to the first expansion valve 14 and the refrigerant evaporator 6 and to the second expansion valve 19 and the refrigerant/coolant heat exchanger 20, in parallel.

Figure 10:
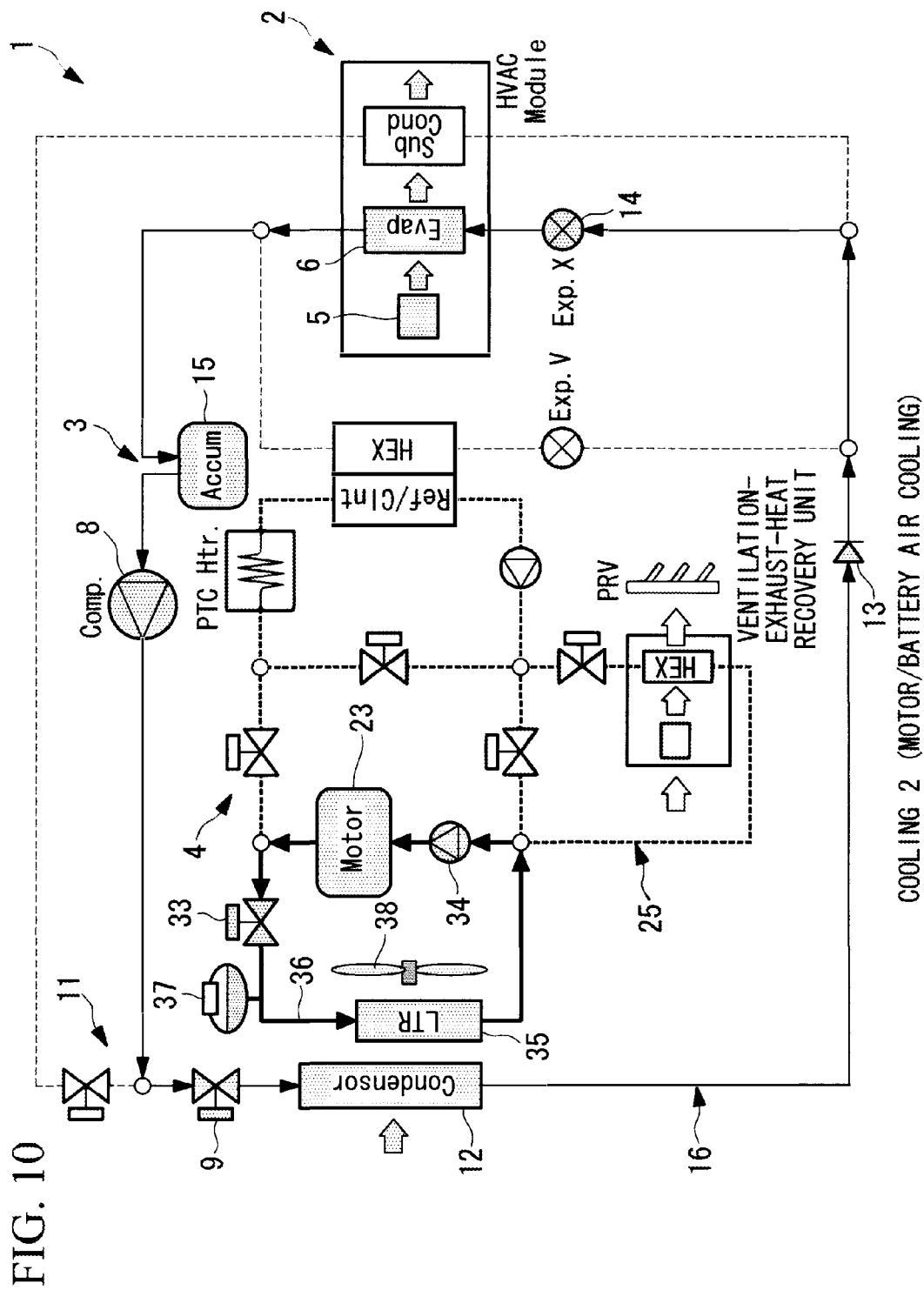
FIG. 10 is a cycle diagram for cooling 2 (motor/battery air cooling) in the cooling control operation shown in FIG. 3.

Thus, it is possible to cool air from the blower 5 in the refrigerant evaporator 6, provided in the HVAC unit 2, and to blow out the air to the vehicle interior, thus performing the cooling operation, and to cool the coolant in the refrigerant/coolant heat exchanger 20, thus performing the refrigerant cooling of the motor/battery 23 through this coolant via the coolant cycle 4. Furthermore, if it is determined in Step S23 that the coolant inlet temperature Tcmi is lower than Tcmi2 ("NO"), the flow advances to cooling 2 in Step S25. As shown in FIG. 10, the refrigerant condensed in the first refrigerant condenser 12 is circulated by the heat pump cycle 3 only to the refrigerant evaporator 6 via the first expansion valve 14, and air from the blower 5 is cooled in the refrigerant evaporator 6, provided in the HVAC unit 2, and is blown out to the vehicle interior, thus making it possible to perform the cooling operation. Furthermore, when the coolant is circulated to the radiator 35 via the motor/battery cooling circuit 36, air cooling of the motor/battery 23 can be performed.

As described above, during the cooling control, it is determined whether the coolant inlet temperature Tcmi of the motor/battery 23 is equal to or higher than the predetermined air-cooling switching temperature Tcmi1. If Tcmi is lower than Tcmi1, the refrigerant condensed in the first refrigerant condenser 12 is made to flow into the refrigerant evaporator 6, provided in the HVAC unit 2, and the cooling operation is performed without cooling the motor/battery 23. Thus, the cooling operation can be performed while determining the need for cooling the motor/battery 23 according to the coolant inlet temperature of the motor/battery 23.

Furthermore, if the coolant inlet temperature Tcmi is equal to or higher than the air-cooling switching temperature Tcmi1, it is determined whether the coolant inlet temperature Tcmi is equal to or higher than the predetermined refrigerant-cooling switching temperature Tcmi2. If Tcmi is equal to or higher than Tcmi2, the refrigerant condensed in the first refrigerant condenser 12 is made to flow into the refrigerant evaporator 6, provided in the HVAC unit 2, and into the refrigerant/coolant heat exchanger 20, in parallel, thus performing the cooling operation and also refrigerant cooling of the motor/battery 23 via the coolant cycle 4. Furthermore, if the coolant inlet temperature Tcmi is lower than Tcmi2, the refrigerant is made to flow only into the refrigerant evaporator 6 without being made to flow into the refrigerant/coolant heat exchanger 20, thereby performing air cooling of the motor/battery 23. Thus, while the cooling operation is being performed, the motor/battery 23 can be appropriately cooled according to the coolant inlet temperature of the motor/battery 23.

Blowing-Mode Control

Figure 4:
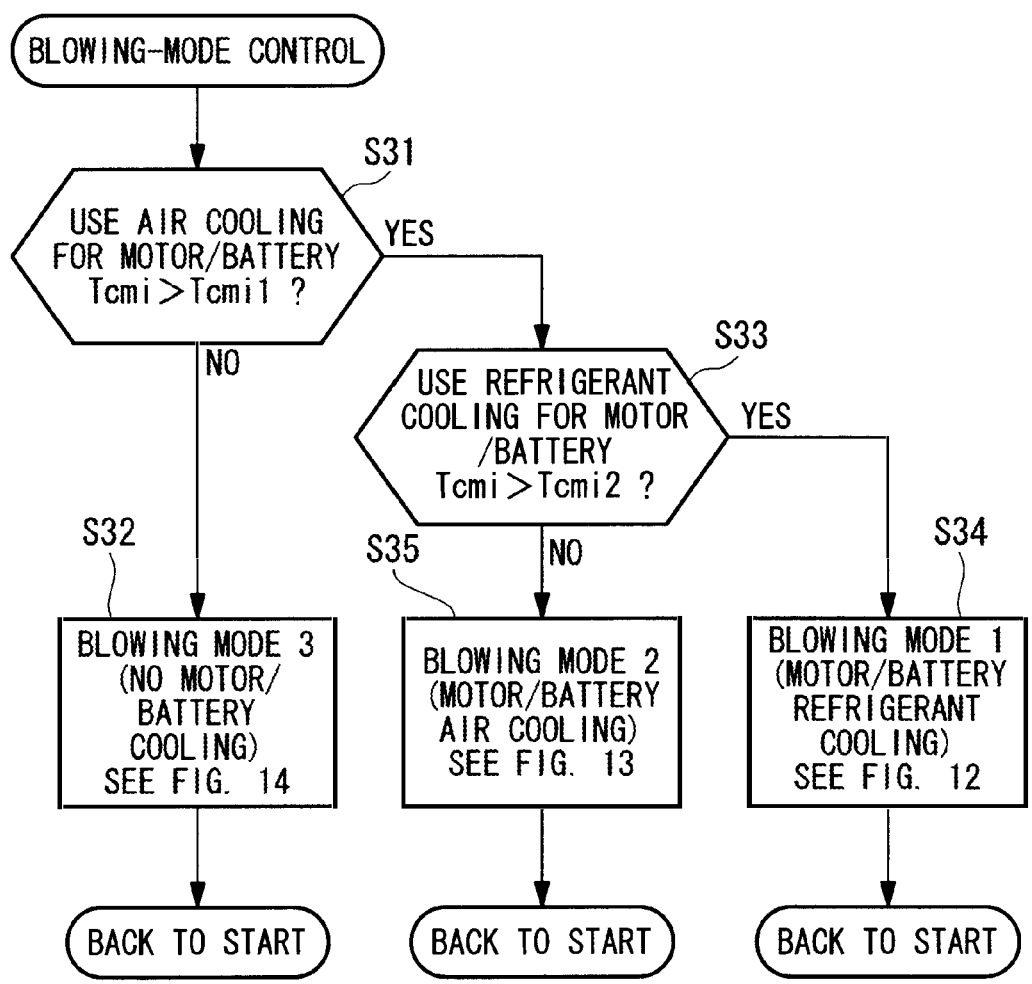
FIG. 4 is a diagram of a control flow for a blowing-mode control operation in the control flow shown in FIG. 2.
Figure 14:
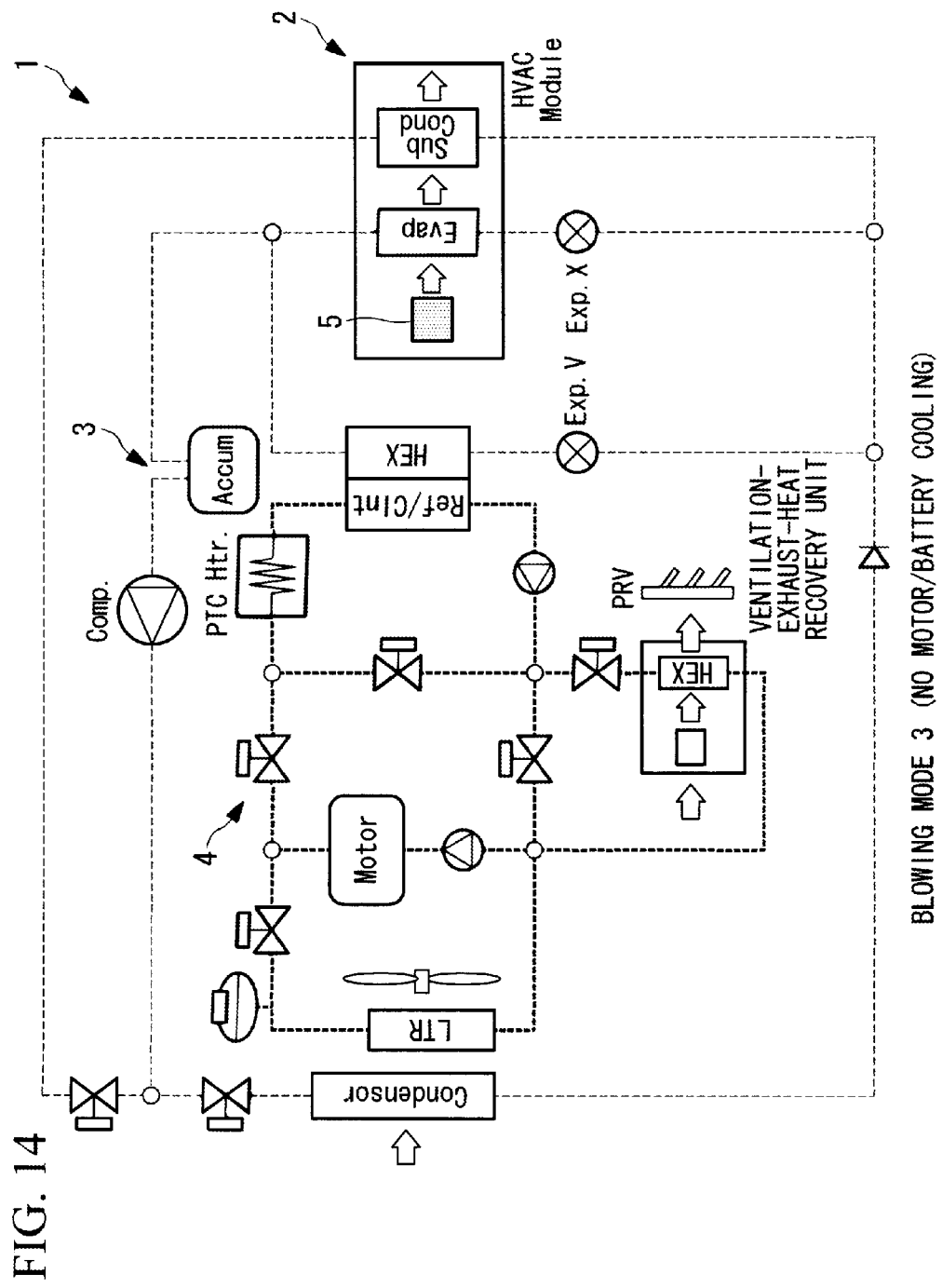
FIG. 14 is a cycle diagram for a blowing mode 3 (no motor/battery cooling) in the blowing-mode control operation shown in FIG. 4.

During the blowing-mode control, as shown in FIG. 4, in Step S31, it is determined whether the motor/battery 23 should use air cooling. This is determined by determining whether the relationship between the coolant inlet temperature Tcmi of the motor/battery 23, detected by the sensor 40, and the predetermined air-cooling switching temperature Tcmi1 satisfies Tcmi>Tcmi1. As a result, if it is determined that Tcmi is lower than Tcmi1 ("NO"), the flow advances to a blowing mode 3 in Step S32. As shown in FIG. 14, only the blower 5 of the HVAC unit 2 is operated, thus performing the blowing operation. In this case, cooling of the motor/battery 23 is regarded as being unnecessary, and a cooling operation for the motor/battery 23 is not performed.

Figure 12:
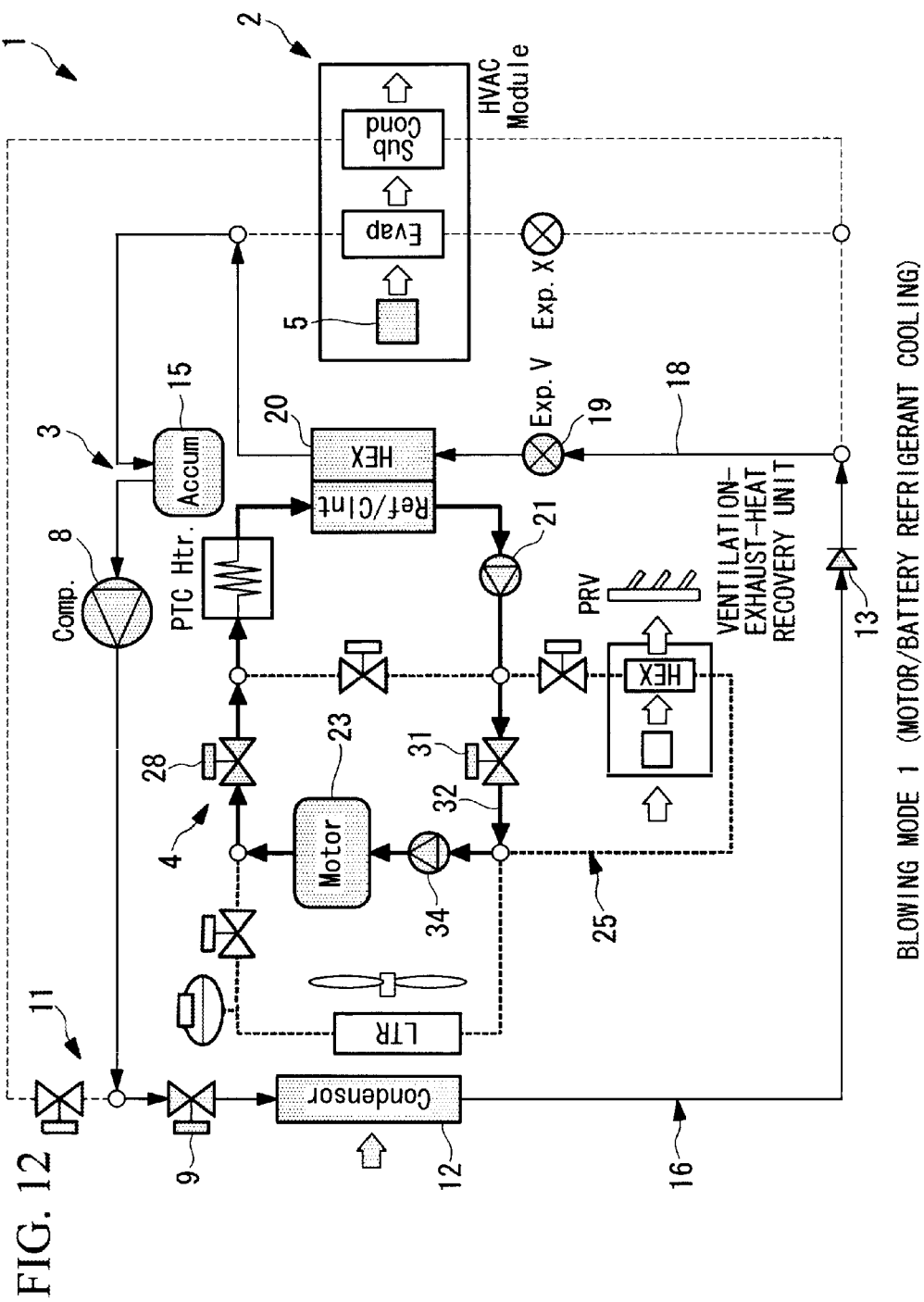
FIG. 12 is a cycle diagram for a blowing mode 1 (motor/battery refrigerant cooling) in the blowing-mode control operation shown in FIG. 4.

On the other hand, if it is determined in Step S31 that Tcmi is equal to or higher than Tcmi1 ("YES"), it is determined in Step S33 whether the motor/battery 23 should use refrigerant cooling. This is determined by determining whether the relationship between the coolant inlet temperature Tcmi, detected by the sensor 40, and the predetermined refrigerant-cooling switching temperature Tcmi2 satisfies Tcmi>Tcmi2. If it is determined that Tcmi is equal to or higher than Tcmi2 ("YES"), the flow advances to a blowing mode 1 in Step S34. As shown in FIG. 12, the blower 5 is operated to perform the blowing operation, and the heat pump cycle 3 is operated. Thus, the refrigerant discharged from the refrigerant compressor 8 is guided by the refrigerant circuit changeover section 11 to the first refrigerant condenser 12, where it is condensed, and is then circulated to the second expansion valve 19 and the refrigerant/coolant heat exchanger 20, in this order, thus performing the cooling operation of the coolant. Thus, the refrigerant cooling of the motor/battery 23 can be performed through this coolant via the coolant cycle 4.

Figure 13:
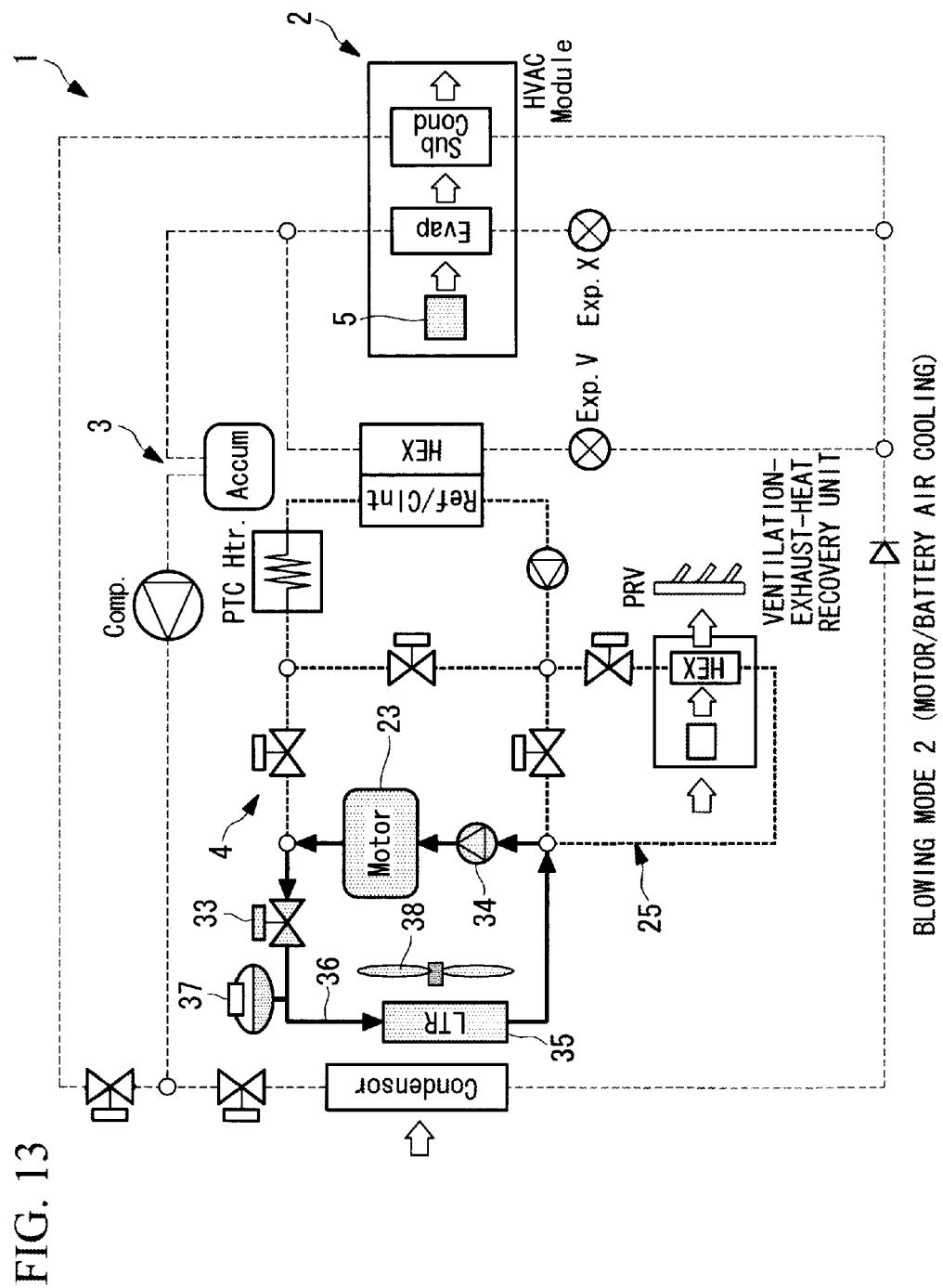
FIG. 13 is a cycle diagram for a blowing mode 2 (motor/battery air cooling) in the blowing-mode control operation shown in FIG. 4.

Furthermore, if it is determined in Step S33 that the coolant inlet temperature Tcmi is lower than Tcmi2 ("NO"), the flow advances to a blowing mode 2 in Step S35. As shown in FIG. 13, the blower 5 is operated to perform the blowing operation, and the heat pump cycle 3 is stopped. In this case, the coolant is circulated to the radiator 35 via the motor/battery cooling circuit 36 to perform air cooling of the motor/battery 23.

As described above, during the blowing-mode control, it is determined whether the coolant inlet temperature Tcmi of the motor/battery 23 is equal to or higher than the predetermined air-cooling switching temperature Tcmi1. If Tcmi is lower than Tcmi1, cooling of the motor/battery 23 is regarded as being unnecessary, and only the blower 5 of the HVAC unit 2 is operated to perform the blowing operation. Thus, the blowing operation can be performed while determining the need for cooling the motor/battery 23 according to the coolant inlet temperature of the motor/battery 23.

Furthermore, if the coolant inlet temperature Tcmi is equal to or higher than the air-cooling switching temperature Tcmi1, it is determined whether the coolant inlet temperature Tcmi is equal to or higher than the predetermined refrigerant-cooling switching temperature Tcmi2. If Tcmi is equal to or higher than Tcmi2, the heat pump cycle 3 makes the refrigerant condensed in the first refrigerant condenser 12 flow into the second expansion valve 19 and the refrigerant/coolant heat exchanger 20 to perform the blowing operation and the refrigerant cooling of the motor/battery 23 via the coolant cycle 4. Furthermore, if the coolant inlet temperature Tcmi is lower than Tcmi2, the heat pump cycle 3 is stopped, and air cooling of the motor/battery 23 is performed. Thus, while performing the blowing operation, the motor/battery 23 can be appropriately cooled according to the coolant inlet temperature of the motor/battery 23.

Motor/Battery Cooling Control

Figure 5:
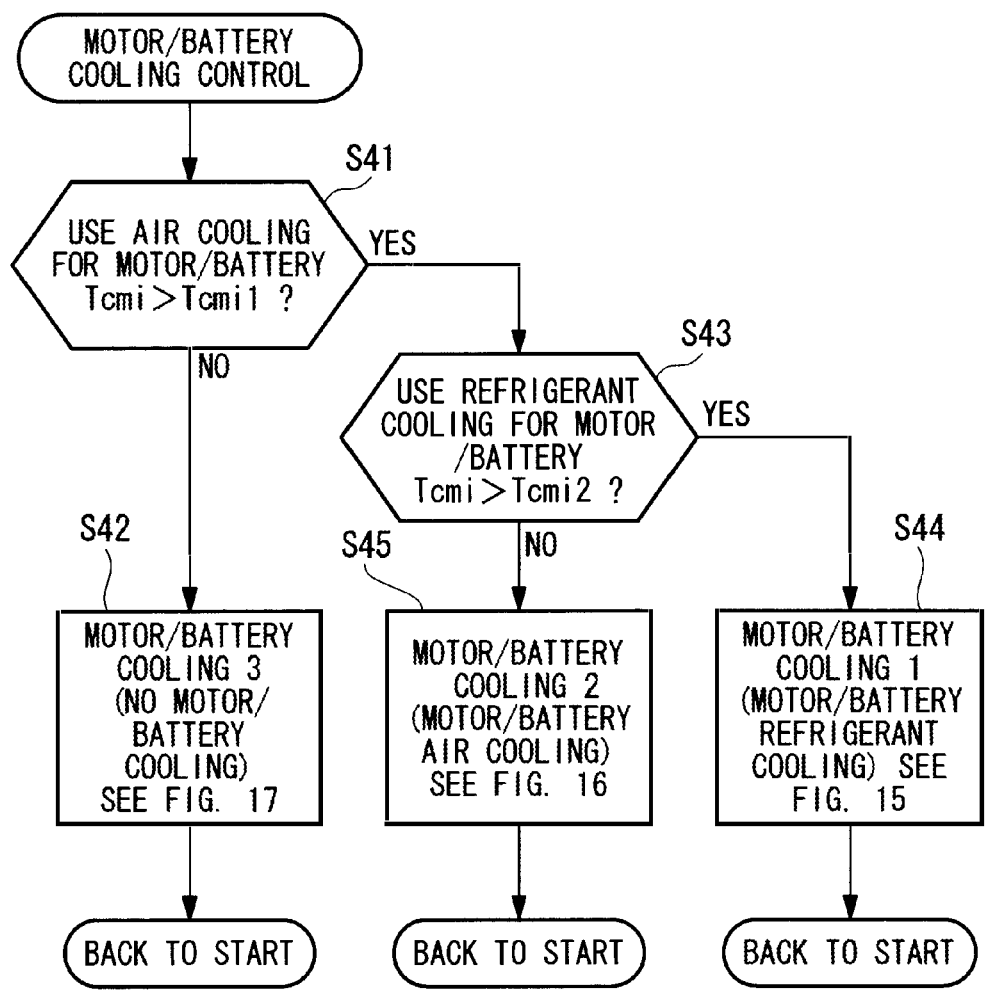
FIG. 5 is a diagram of a control flow for a motor/battery cooling control operation in the control flow shown in FIG. 2.
Figure 17:
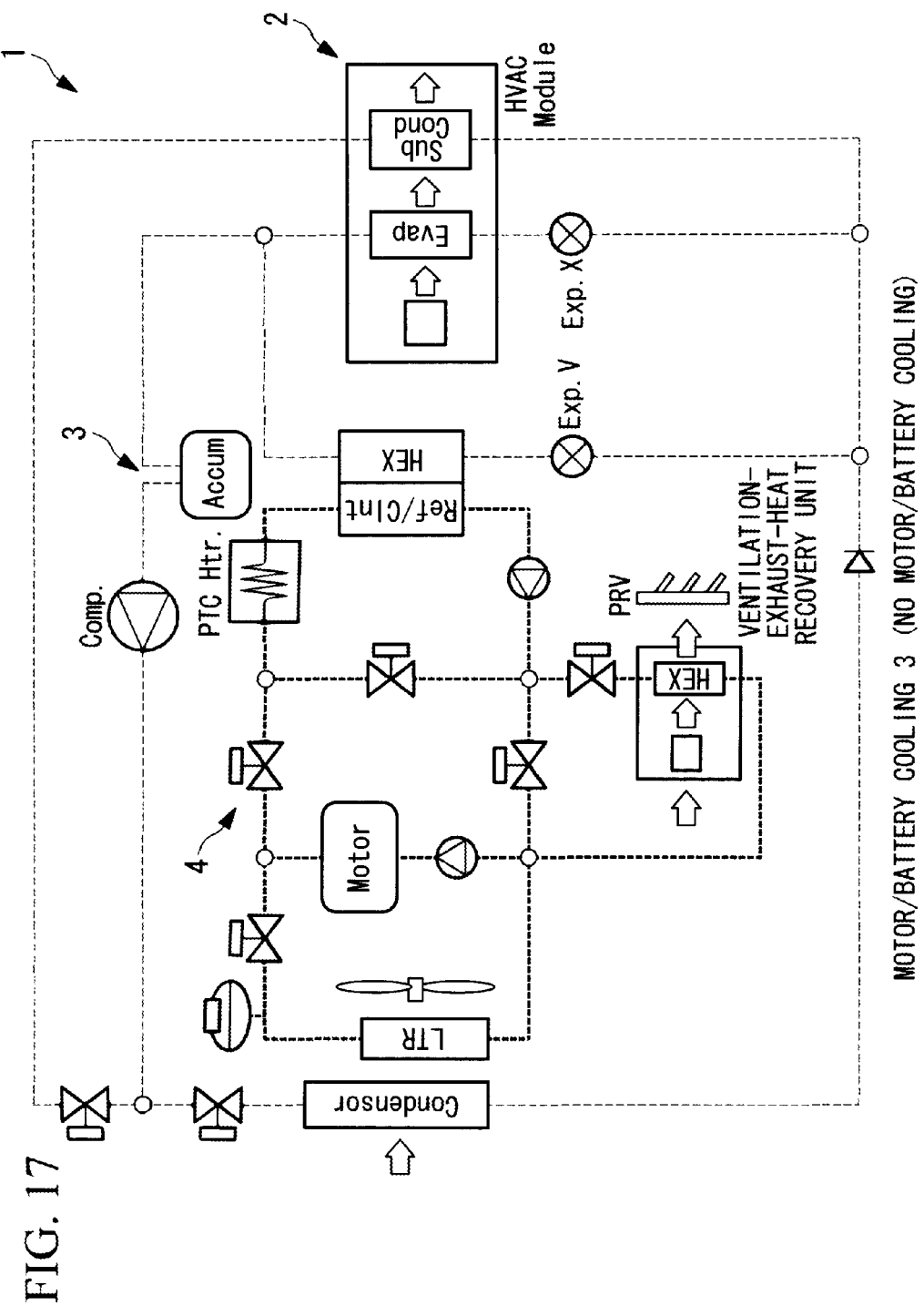
FIG. 17 is a cycle diagram for motor/battery cooling 3 (no motor/battery cooling) in the motor/battery cooling control operation shown in FIG. 5.

During the motor/battery cooling control, as shown in FIG. 5, in Step S41, it is determined whether the motor/battery 23 should use air cooling. This is determined by determining whether the relationship between the coolant inlet temperature Tcmi of the motor/battery 23, detected by the sensor 40, and the predetermined air-cooling switching temperature Tcmi1 satisfies Tcmi>Tcmi1. As a result, if it is determined that Tcmi is lower than Tcmi1 ("NO"), the flow advances to motor/battery cooling 3 in Step S42. As shown in FIG. 17, cooling of the motor/battery 23 is regarded as being unnecessary, and the cooling operation of the motor/battery 23 is not performed. Note that, in this case, the HVAC unit 2 is in a stopped state.

Figure 15:
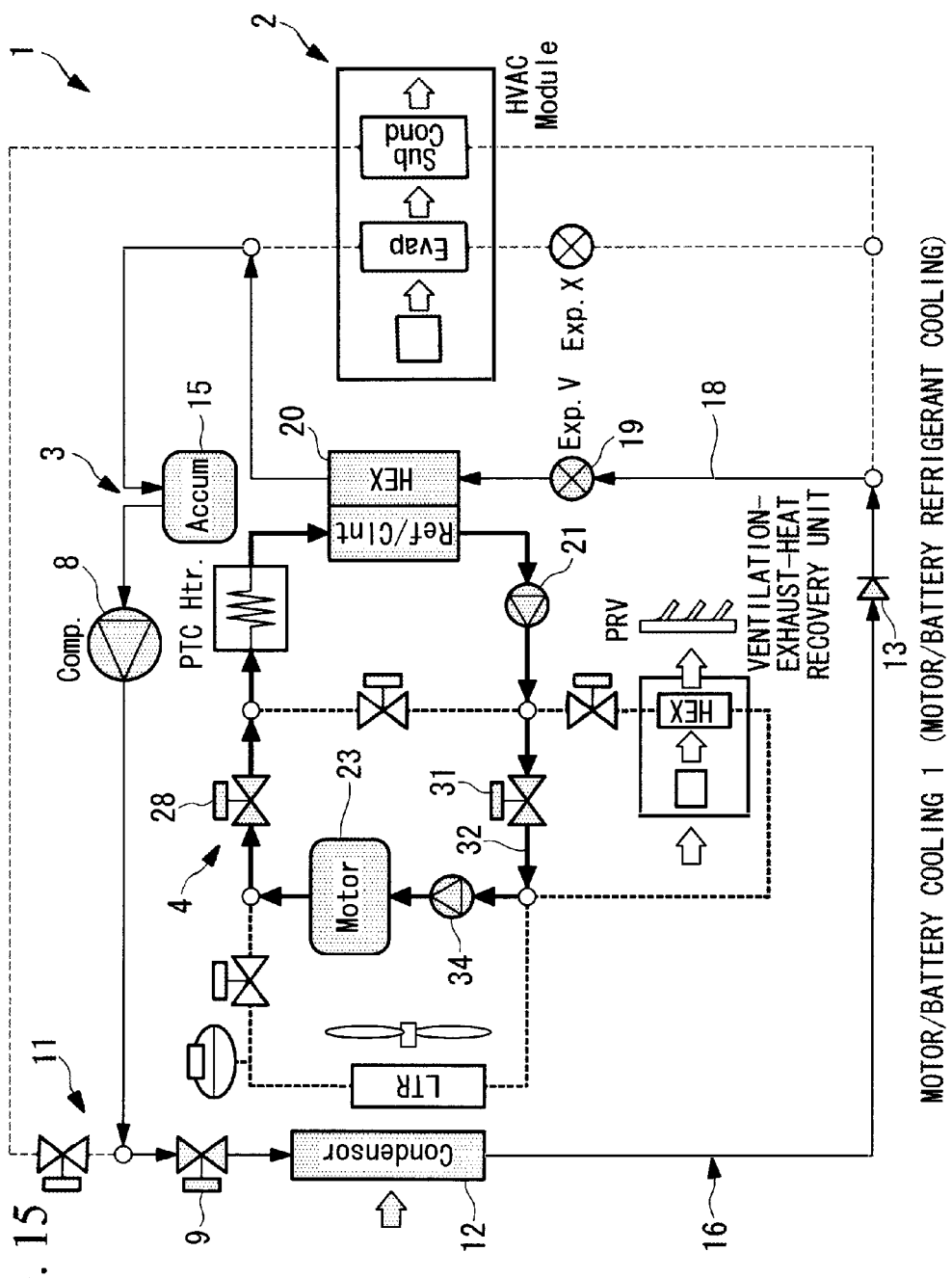
FIG. 15 is a cycle diagram for motor/battery cooling 1 (motor/battery refrigerant cooling) in the motor/battery cooling control operation shown in FIG. 5.

On the other hand, if it is determined in Step S41 that the coolant inlet temperature Tcmi is equal to or higher than the air-cooling switching temperature Tcmi1 ("YES"), it is determined in Step S43 whether the motor/battery 23 should use refrigerant cooling. This is determined by determining whether the relationship between the coolant inlet temperature Tcmi, detected by the sensor 40, and the predetermined refrigerant-cooling switching temperature Tcmi2 satisfies Tcmi>Tcmi2. If it is determined that Tcmi is equal to or higher than Tcmi2 ("YES"), the flow advances to motor/battery cooling 1 in Step S44. As shown in FIG. 15, in the heat pump cycle 3, the refrigerant discharged from the refrigerant compressor 8 is circulated by the refrigerant circuit changeover section 11 to the first refrigerant condenser 12, the second expansion valve 19, and the refrigerant/coolant heat exchanger 20, in this order, thus performing the cooling operation of the coolant. Thus, the refrigerant cooling of the motor/battery 23 can be performed via the coolant cycle 4. The HVAC unit 2 is kept in the stopped state.

Figure 16:
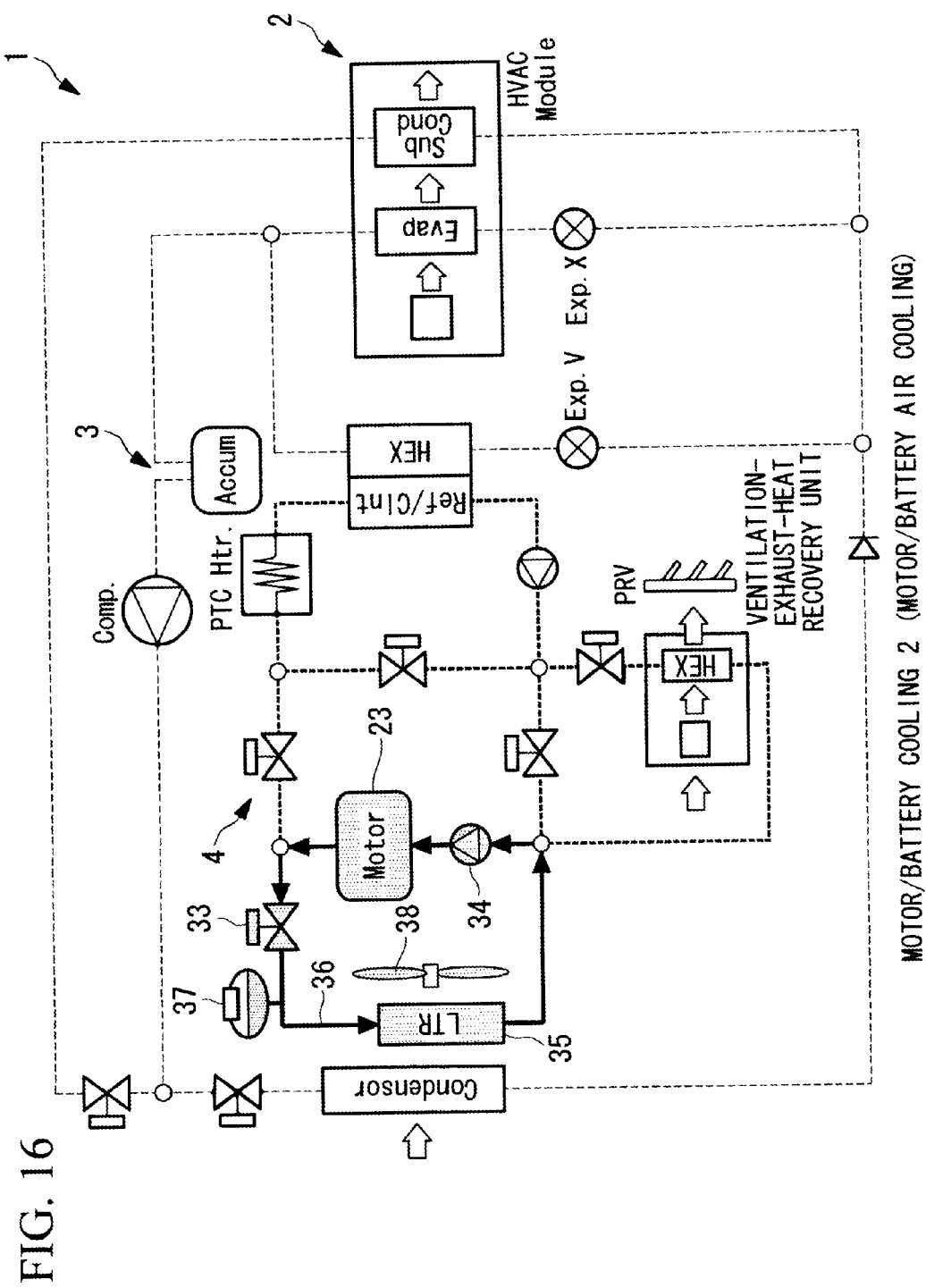
FIG. 16 is a cycle diagram for motor/battery cooling 2 (motor/battery air cooling) in the motor/battery cooling control operation shown in FIG. 5.

Furthermore, if it is determined in Step S43 that the coolant inlet temperature Tcmi is lower than Tcmi2 ("NO"), the flow advances to motor/battery cooling 2 in Step S45. As shown in FIG. 16, the heat pump cycle 3 is stopped. In this case, the coolant is circulated to the radiator 35 via the motor/battery cooling circuit 36, thus performing air cooling of the motor/battery 23.

As described above, during the motor/battery cooling control, it is determined whether the coolant inlet temperature Tcmi of the motor/battery 23 is equal to or higher than the predetermined air-cooling switching temperature Tcmi1. If Tcmi is lower than Tcmi1, cooling of the motor/battery 23 is regarded as being unnecessary, and the cooling operation of the motor/battery 23 is not performed. Thus, the cooling operation of the motor/battery 23 can be canceled while determining the need for cooling the motor/battery 23 according to the coolant inlet temperature of the motor/battery 23.

Furthermore, if the coolant inlet temperature Tcmi is equal to or higher than the air-cooling switching temperature Tcmi1, it is determined whether the coolant inlet temperature Tcmi is equal to or higher than the predetermined refrigerant-cooling switching temperature Tcmi2. If the Tcmi is equal to or higher than Tcmi2, the heat pump cycle 3 makes the refrigerant condensed in the first refrigerant condenser 12 flow into the second expansion valve 19 and the refrigerant/coolant heat exchanger 20, to perform the refrigerant cooling of the motor/battery 23 via the coolant cycle 4. Furthermore, if the coolant inlet temperature Tcmi is lower than Tcmi2, the heat pump cycle 3 is stopped, and air cooling of the motor/battery 23 is performed. Thus, the motor/battery 23 can be appropriately cooled according to the coolant inlet temperature of the motor/battery 23.

Heating Control

Figure 6:
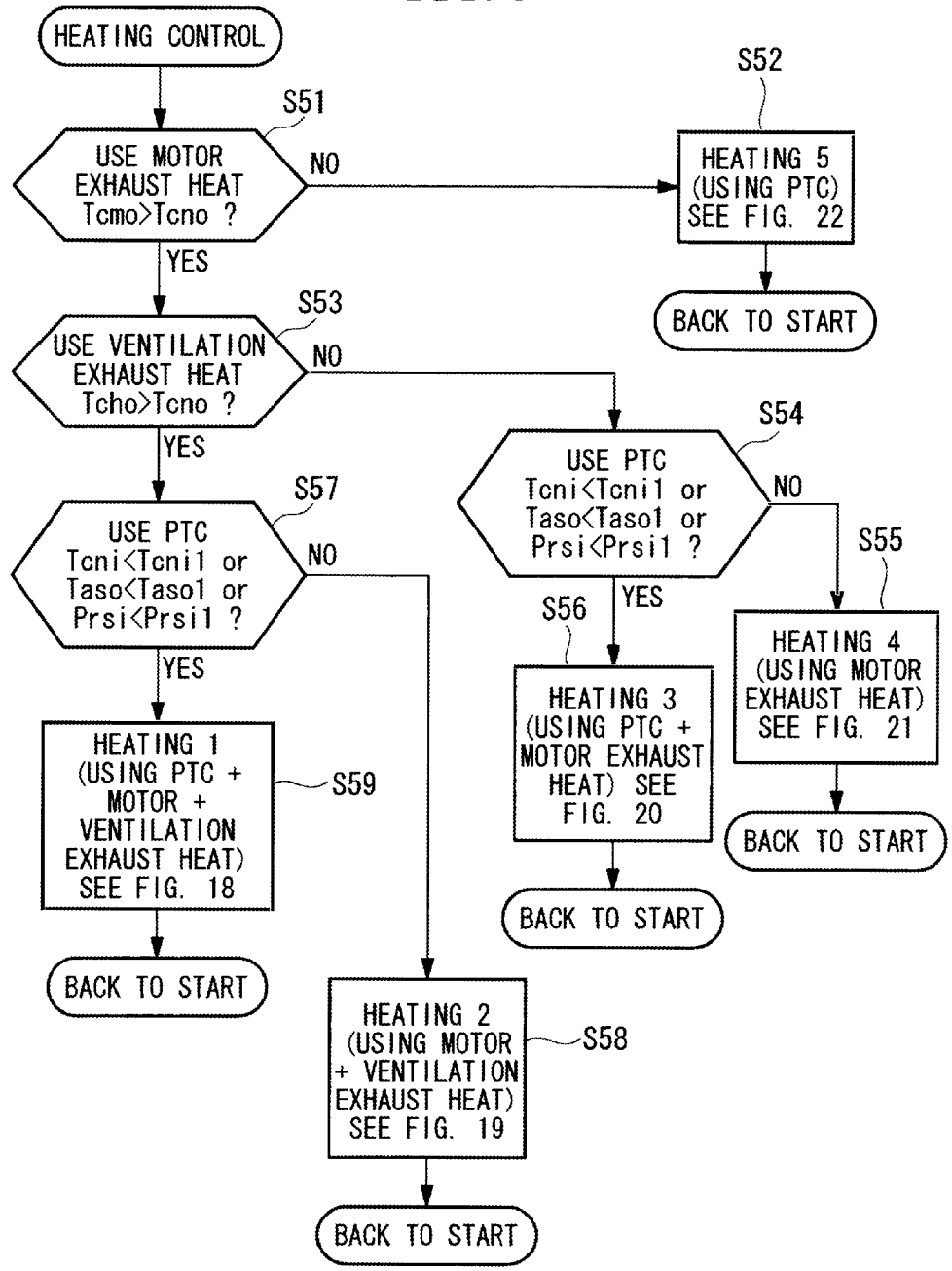
FIG. 6 is a diagram of a control flow for a heating control operation in the control flow shown in FIG. 2.

During the heating control, as shown in FIG. 6, in Step S51, it is determined whether the motor/battery 23 should use exhaust heat. This is determined by determining whether the relationship between the coolant outlet temperature Tcmo of the motor/battery 23, detected by the sensor 41, and the coolant outlet temperature Tcno of the refrigerant/coolant heat exchanger 20, detected by the sensor 43, satisfies Tcmo>Tcno.

Figure 22:
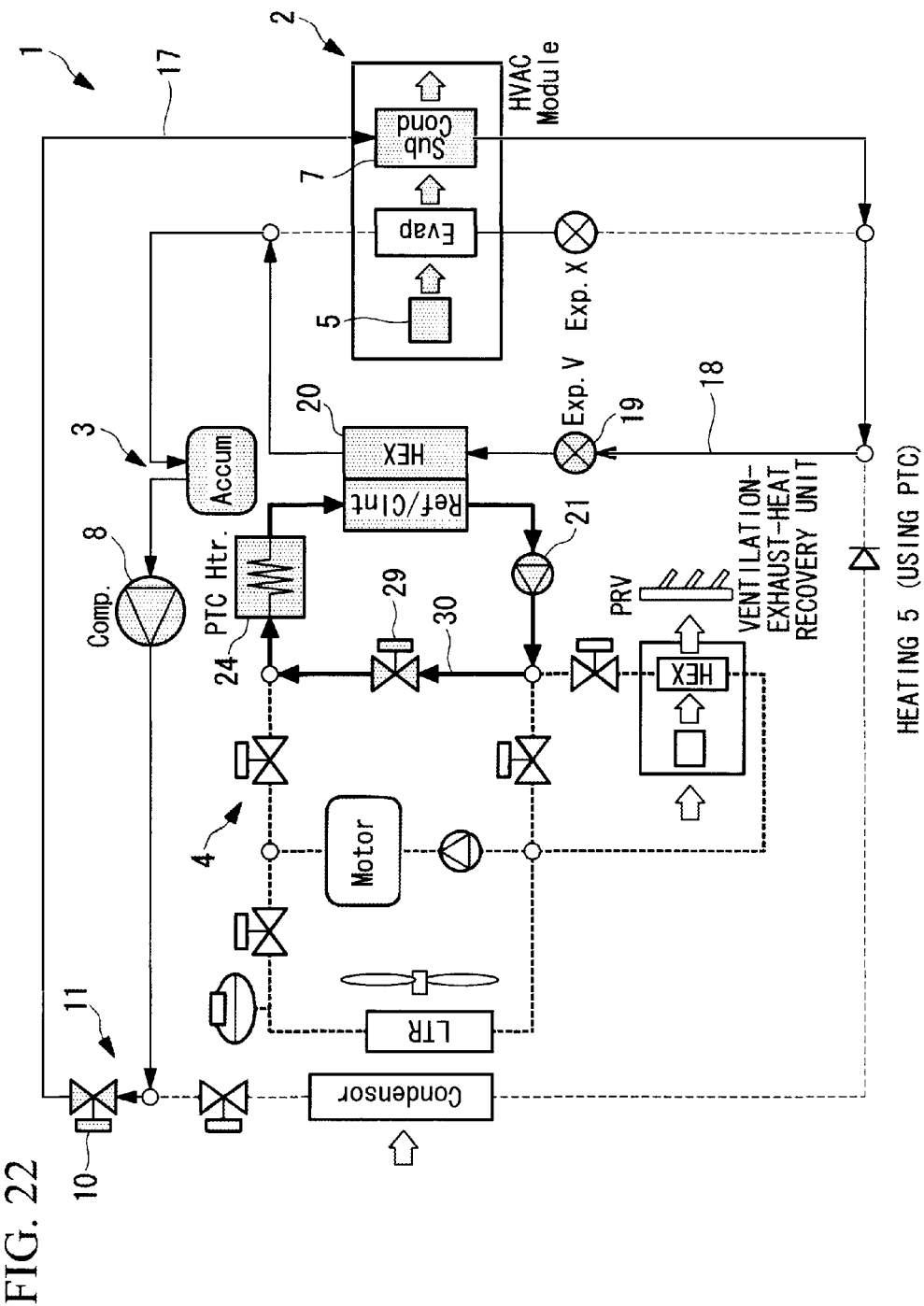
FIG. 22 is a cycle diagram for heating 5 (using the PTC) in the heating control operation shown in FIG. 6.

As a result, if it is determined that Tcmi is lower than Tcmi1 ("NO"), the flow advances to heating 5 in Step S52. As shown in FIG. 22, the electric heater 24 is energized, the fifth solenoid valve 29 is opened, and the third solenoid valve 27, the fourth solenoid valve 28, and the sixth solenoid valve 31 are closed. Thus, the coolant in the coolant cycle 4 is circulated to the first bypass circuit 30 and is heated by the electric heater 24. At the same time, in the heat pump cycle 3, the refrigerant discharged from the refrigerant compressor 8 is circulated by the refrigerant circuit changeover section 11 to the second refrigerant condenser 7, provided in the HVAC unit 2, the second expansion valve 19, and the refrigerant/coolant heat exchanger 20, in this order, thus making it possible to perform the heat-pump heating operation by using the coolant heated by the electric heater 24 as a heat source.

On the other hand, if it is determined in Step S51 that the coolant outlet temperature Tcmo of the motor/battery 23 is equal to or higher than the coolant outlet temperature Tcno of the refrigerant/coolant heat exchanger 20 ("YES"), the flow advances to Step S53. In Step S53, it is determined whether the ventilation-exhaust-heat recovery unit 22 should use exhaust heat. This is determined by determining whether the relationship between the coolant outlet temperature Tcho of the ventilation-exhaust-heat recovery unit, detected by the sensor 44, and the coolant outlet temperature Tcno of the refrigerant/coolant heat exchanger 20, detected by the sensor 43, satisfies Tcho>Tcno.

As a result, if it is determined that Tcho is lower than Tcno ("NO"), the flow advances to Step S54, where it is determined whether to use the electric heater (PTC) 24 by determining whether each of the following conditions is satisfied.

(a) Whether the relationship between the coolant inlet temperature Tcni of the refrigerant/coolant heat exchanger 20, detected by the sensor 42, and the predetermined coolant inlet required temperature Tcni1 of the refrigerant/coolant heat exchanger 20 satisfies Tcni<Tcni1.

(b) Whether the relationship between the air-side outlet temperature Taso of the second refrigerant condenser 7, detected by the sensor 46, and the predetermined air-side required outlet temperature Taso1 of the second refrigerant condenser 7 satisfies Taso<Taso1.

(c) Whether the relationship between the inlet refrigerant pressure Prsi of the second refrigerant condenser 7, detected by the sensor 47, and the predetermined inlet required refrigerant pressure Prsi1 of the second refrigerant condenser 7 satisfies Prsi<Prsi1.

Figure 21:
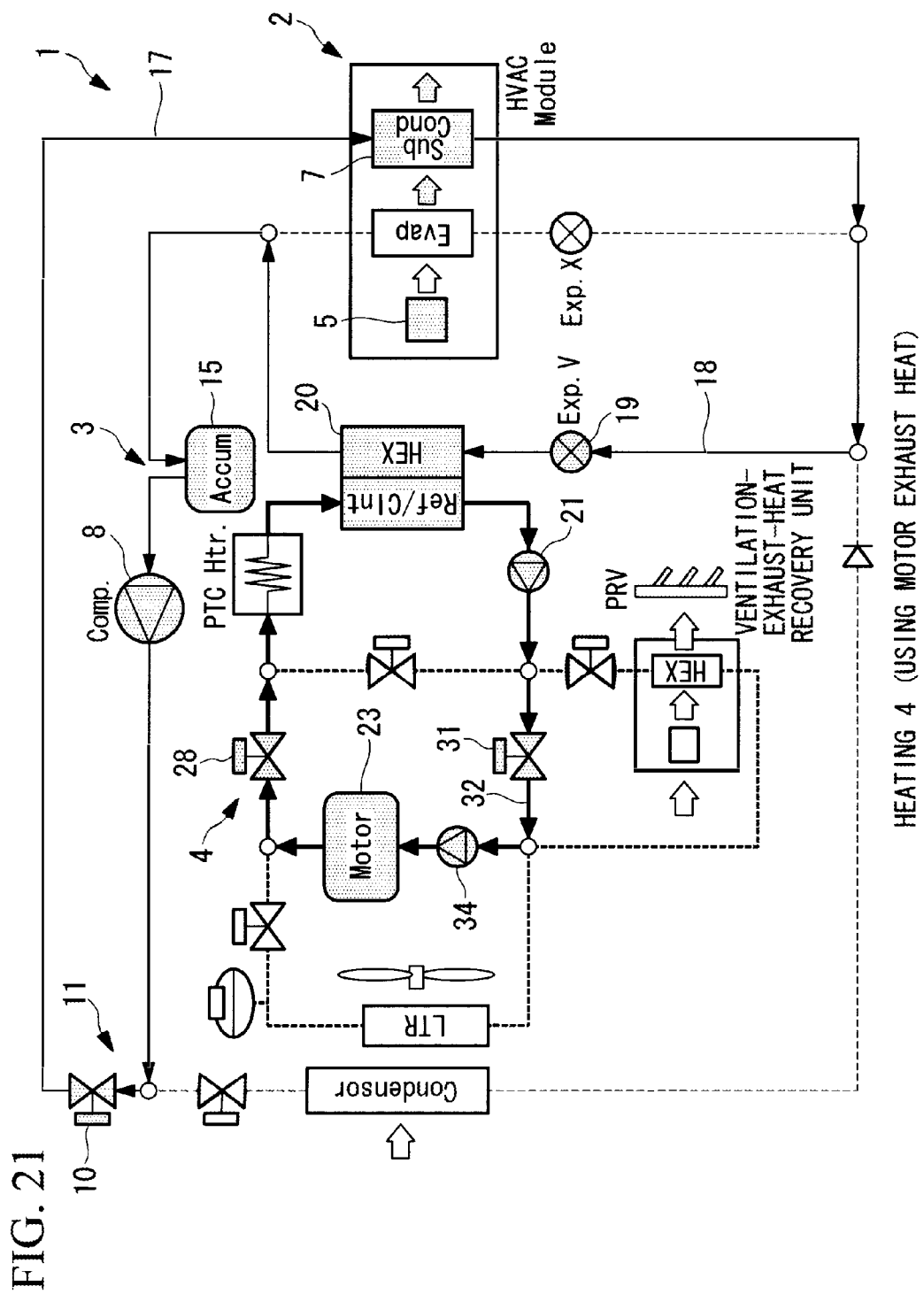
FIG. 21 is a cycle diagram for heating 4 (using the motor/battery exhaust heat) in the heating control operation shown in FIG. 6.

If it is determined that each of the above-described conditions (a) to (c) is not satisfied ("NO"), the flow advances to heating 4 in Step S55. As shown in FIG. 21, the electric heater 24 is turned off, the fourth solenoid valve 28 and the sixth solenoid valve 31 are opened, the third solenoid valve 27 and the fifth solenoid valve 29 are closed, and the coolant in the coolant cycle 4 is circulated only to the motor/battery 23 and is heated by the exhaust heat thereof. At the same time, in the heat pump cycle 3, the refrigerant discharged from the refrigerant compressor 8 is circulated, via the refrigerant circuit changeover section 11, to the second refrigerant condenser 7, provided in the HVAC unit 2, the second expansion valve 19, and the refrigerant/coolant heat exchanger 20, in this order, thus making it possible to perform the heat-pump heating operation by using the coolant heated by the exhaust heat of the motor/battery 23 as a heat source.

Figure 20:
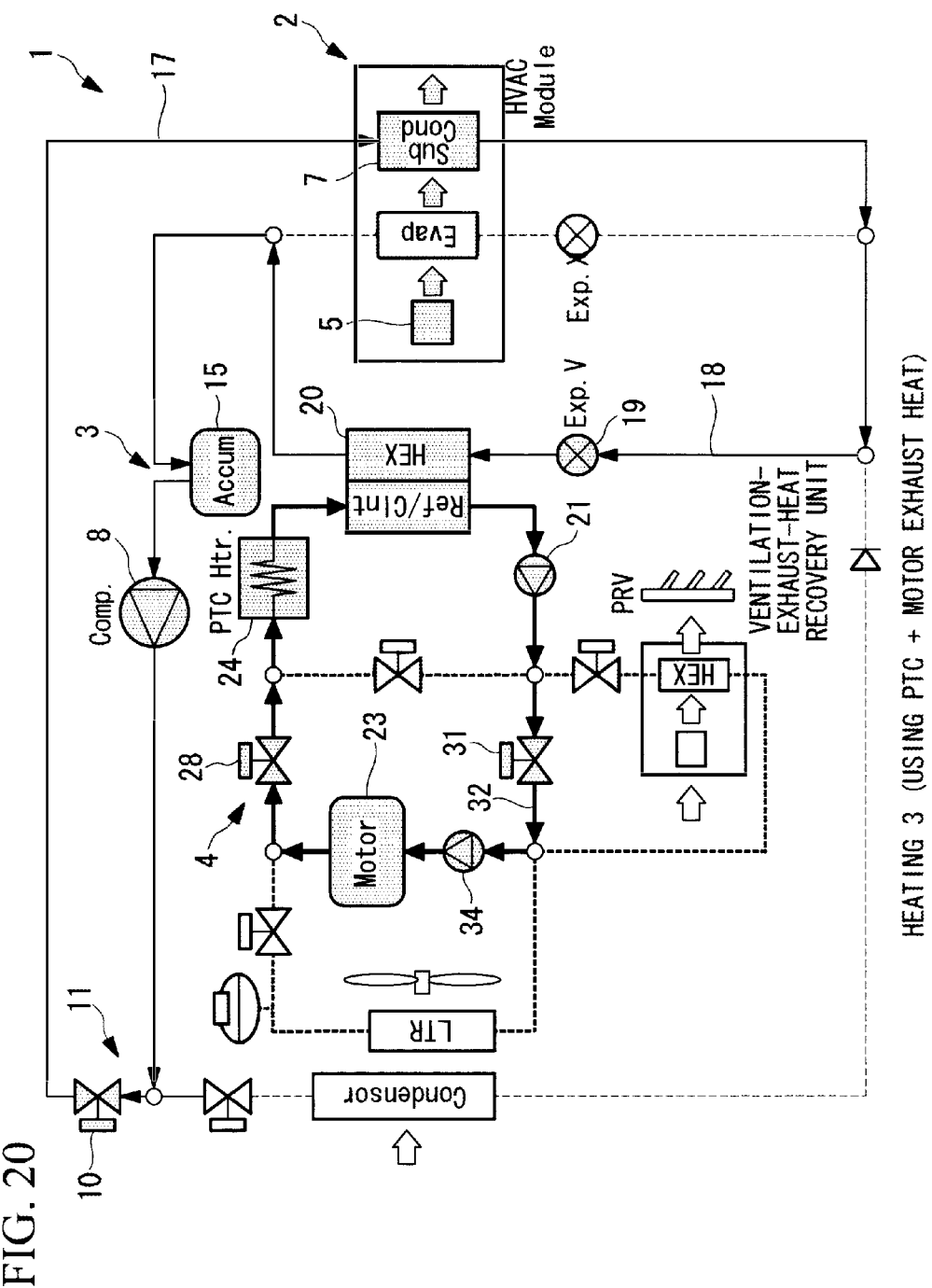
FIG. 20 is a cycle diagram for heating 3 (using the PTC and motor/battery exhaust heat) in the heating control operation shown in FIG. 6.

Furthermore, if it is determined in Step S54 that each of the above-described conditions (a) to (c) is satisfied ("YES"), the flow advances to heating 3 in Step S56. As shown in FIG. 20, the electric heater 24 is energized, in addition to the case of the heating 4. Thus, the coolant in the coolant cycle 4 is heated by both the electric heater 24 and the motor/battery 23. In the heat pump cycle 3, the heat-pump heating operation can be performed by using the coolant heated by the electric heater 24 and the motor/battery 23 as a heat source.

Figure 19:
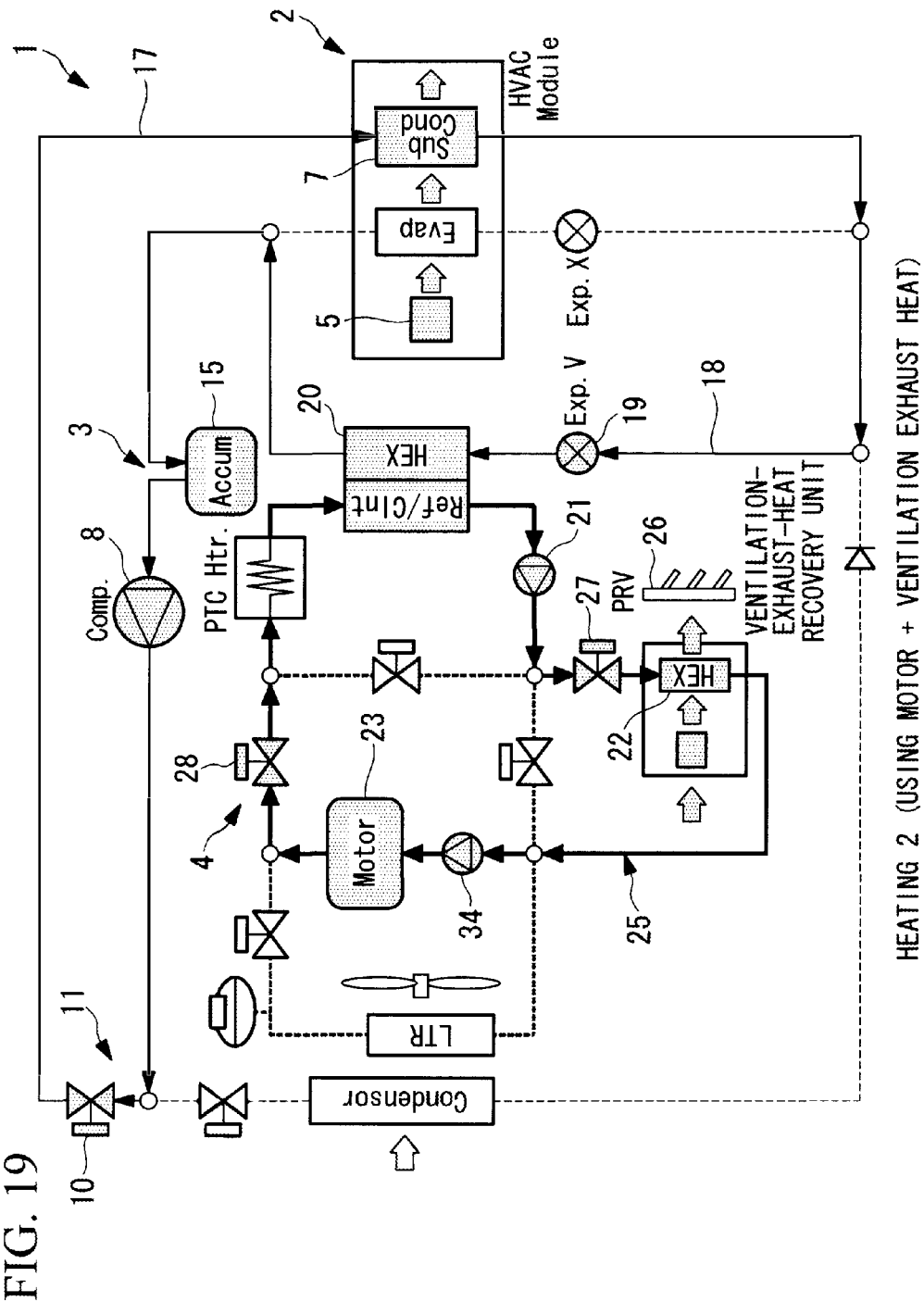
FIG. 19 is a cycle diagram for heating 2 (using the motor/battery and the ventilation exhaust heat) in the heating control operation shown in FIG. 6.

Furthermore, if it is determined in Step S53 that the coolant outlet temperature Tcho of the ventilation-exhaust-heat recovery unit 22 is equal to or higher than the coolant outlet temperature Tcno of the refrigerant/coolant heat exchanger 20 ("YES"), the flow advances to Step S57, where it is determined whether to use the electric heater (PTC) 24 by determining whether each of the conditions (a) to (c) is satisfied, as described above. As a result, if it is determined that each of the above-described conditions, that is, Tcni<Tcni1, Taso<Taso1, and Prsi<Prsi1, is not satisfied ("NO"), the flow advances to heating 2 in Step S58. In Step S58, as shown in FIG. 19, the electric heater 24 is turned off, the third solenoid valve 27 and the fourth solenoid valve 28 are opened, the fifth solenoid valve 29 and the sixth solenoid valve 31 are closed, and the coolant in the coolant cycle 4 is circulated to the ventilation-exhaust-heat recovery unit 22 and the motor/battery 23 and is heated by the exhaust heat thereof.

At the same time, in the heat pump cycle 3, the refrigerant from the refrigerant compressor 8 is circulated, via the refrigerant circuit changeover section 11, to the second refrigerant condenser 7, provided in the HVAC unit 2, the second expansion valve 19, and the refrigerant/coolant heat exchanger 20, in this order. In the heat pump cycle 3, the heat-pump heating operation can be similarly performed by using the coolant heated by the exhaust heat of the ventilation-exhaust-heat recovery unit 22 and the motor/battery 23 as a heat source.

Figure 18:
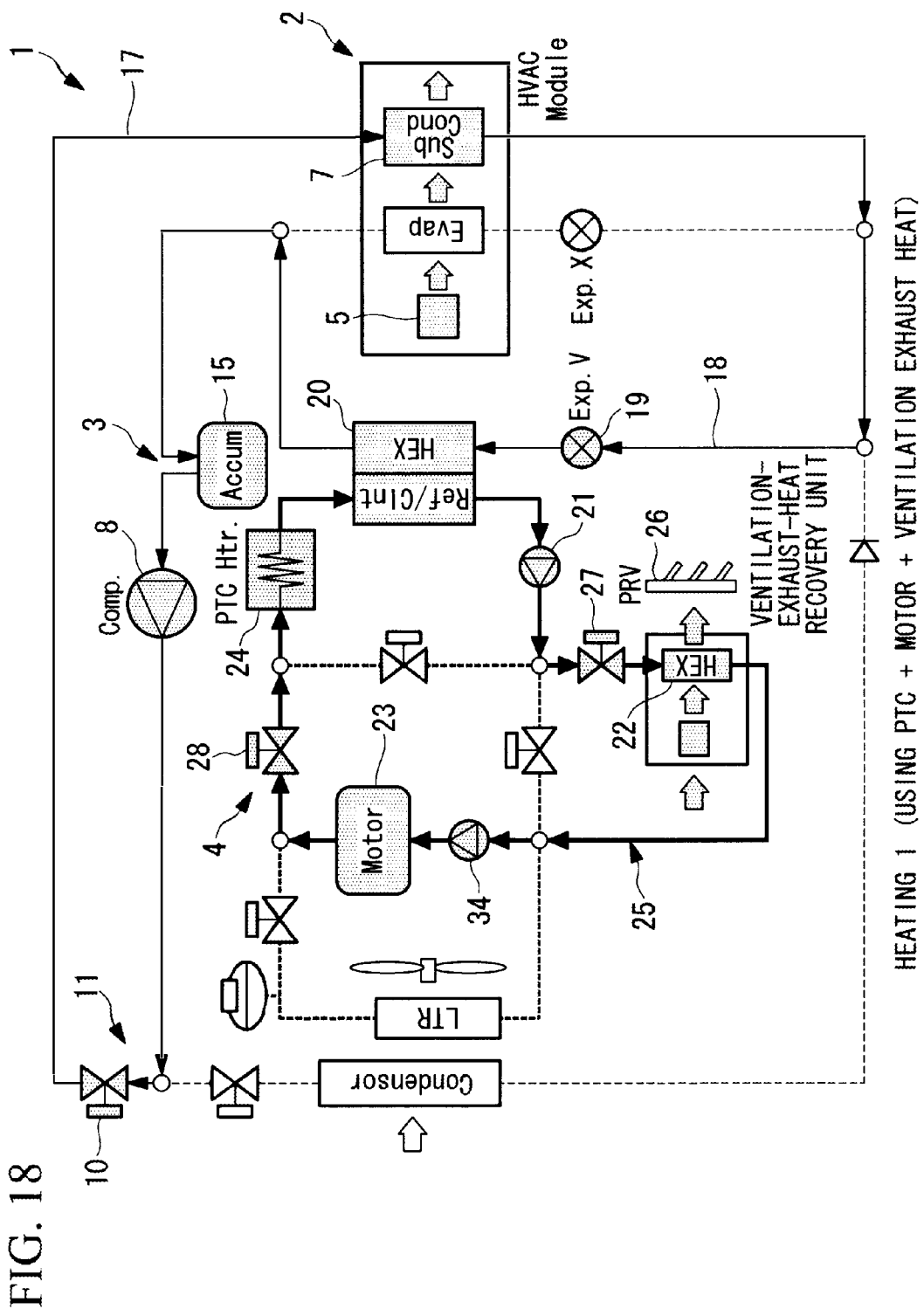
FIG. 18 is a cycle diagram for heating 1 (using a PTC, a motor/battery, and ventilation exhaust heat) in the heating control operation shown in FIG. 6.

If it is determined in Step S57 that each of the above-described conditions (a) to (c), that is, Tcni<Tcni1, Taso<Taso1, and Prsi<Prsi1, is satisfied ("YES"), the flow advances to heating 1 in Step S59. As shown in FIG. 18, the electric heater 24 is energized, in addition to the case of the heating 2. Thus, the coolant in the coolant cycle 4 is heated by the ventilation-exhaust-heat recovery unit 22, the motor/battery 23, and the electric heater 24. In the heat pump cycle 3, the heat-pump heating operation can be similarly performed by using the coolant heated by the ventilation-exhaust-heat recovery unit 22, the motor/battery 23, and the electric heater 24 as a heat source.

As described above, during the heating control, it is determined whether the coolant outlet temperature Tcmo of the motor/battery 23 is equal to or higher than the coolant outlet temperature Tcno of the refrigerant/coolant heat exchanger 20. If Tcmo is lower than Tcno, the electric heater 24 is energized to heat the coolant, and the heat pump cycle 3 makes the refrigerant condensed by the second refrigerant condenser 7, provided in the HVAC unit 2, flow into the second expansion valve 19 and the refrigerant/coolant heat exchanger 20, thus performing the heat-pump heating operation by using the coolant heated by the electric heater 24 as a heat source. Thus, even at heating start-up time or at a low outside-air temperature (for example, at −10 degrees Celsius), at which it is normally difficult to perform the heat-pump heating because the exhaust heat of the motor/battery 23 cannot be used, it is possible to ensure the required heating capacity by using the coolant heated by the electric heater 24 as a heat source to perform an efficient heating operation.

Furthermore, if the coolant outlet temperature Tcmo of the motor/battery 23 is equal to or higher than the coolant outlet temperature Tcno of the refrigerant/coolant heat exchanger 20, it is determined whether the coolant outlet temperature Tcho of the ventilation-exhaust-heat recovery unit 22 is equal to or higher than the coolant outlet temperature Tcno of the refrigerant/coolant heat exchanger 20. If Tcho is lower than Tcno, it is further determined whether the relationship between the coolant inlet temperature Tcni of the refrigerant/coolant heat exchanger 20 and the predetermined coolant inlet required temperature Tcni1 of the refrigerant/coolant heat exchanger 20, the relationship between the air-side outlet temperature Taso of the second refrigerant condenser 7 and the predetermined air-side required outlet temperature Taso1 of the second refrigerant condenser 7, and the relationship between the inlet refrigerant pressure Prsi of the second refrigerant condenser 7 and the predetermined inlet required refrigerant pressure Prsi1 of the second refrigerant condenser 7 satisfy Tcni<Tcni1, Taso<Taso1, and Prsi<Prsi1, respectively. If each of the coolant inlet temperature Tcni, the air-side outlet temperature Taso, and the inlet refrigerant pressure Prsi does not satisfy the corresponding condition, the coolant is heated by the exhaust heat of the motor/battery 23.

At the same time, in the heat pump cycle 3, the refrigerant condensed by the second refrigerant condenser 7, provided in the HVAC unit 2, is made to flow into the second expansion valve 19 and the refrigerant/coolant heat exchanger 20 to perform the heat-pump heating operation by using the coolant heated by the exhaust heat of the motor/battery 23 as a heat source. Furthermore, if each of the coolant inlet temperature Tcni, the air-side outlet temperature Taso, and the inlet refrigerant pressure Prsi satisfies the corresponding condition, the electric heater 24 is energized, the coolant is heated by both the electric heater 24 and the motor/battery 23, and the heat pump cycle 3 performs the heat-pump heating operation by using this coolant as a heat source.

Furthermore, if the coolant outlet temperature Tcho of the ventilation-exhaust-heat recovery unit 22 is equal to or higher than the coolant outlet temperature Tcno of the refrigerant/coolant heat exchanger 20, it is determined whether the relationship between the coolant inlet temperature Tcni of the refrigerant/coolant heat exchanger 20 and the predetermined coolant inlet required temperature Tcni1 of the refrigerant/coolant heat exchanger 20, the relationship between the air-side outlet temperature Taso of the second refrigerant condenser 7 and the predetermined air-side required outlet temperature Taso1 of the second refrigerant condenser 7, and the relationship between the inlet refrigerant pressure Prsi of the second refrigerant condenser 7 and the predetermined inlet required refrigerant pressure Prsi1 of the second refrigerant condenser 7 satisfy Tcni<Tcni1, Taso<Taso1, and Prsi<Prsi1, respectively. If each of the coolant inlet temperature Tcni, the air-side outlet temperature Taso, and the inlet refrigerant pressure Prsi does not satisfy the corresponding condition, the coolant is heated by the exhaust heat of the ventilation-exhaust-heat recovery unit 22 and the motor/battery 23.

At the same time, in the heat pump cycle 3, the refrigerant condensed by the second refrigerant condenser 7, provided in the HVAC unit 2, is made to flow into the second expansion valve 19 and the refrigerant/coolant heat exchanger 20 to perform the heat-pump heating operation by using the coolant heated by the exhaust heat of the ventilation-exhaust-heat recovery unit 22 and the motor/battery 23 as a heat source. Furthermore, if each of the coolant inlet temperature Tcni, the air-side outlet temperature Taso, and the inlet refrigerant pressure Prsi satisfies the corresponding condition, the electric heater 24 is energized, the coolant is heated by the ventilation-exhaust-heat recovery unit 22, the exhaust heat of the motor/battery 23, and the electric heater 24, and the heat-pump heating operation is performed by using this coolant as a heat source.

In this way, during the heating control, if the exhaust heat of the motor/battery 23 can be used, it is determined whether the ventilation-exhaust-heat unit 22 can be used. If the ventilation-exhaust-heat unit 22 can be used, it is further determined whether the use of the electric heater 24 is necessary. Thus, the electric heater 24 is energized to heat the coolant only when the electric heater 24 is really necessary. Thus, in the respective states, it is possible to ensure the required heating capacity to perform an efficient heating operation, and at the same time, it is possible to reduce the use of the electric heater 24 as much as possible and to reduce the power consumption of the air-conditioning system 1, thus contributing to extended vehicle travel distance.

Dehumidifying and Heating Control

Figure 7:
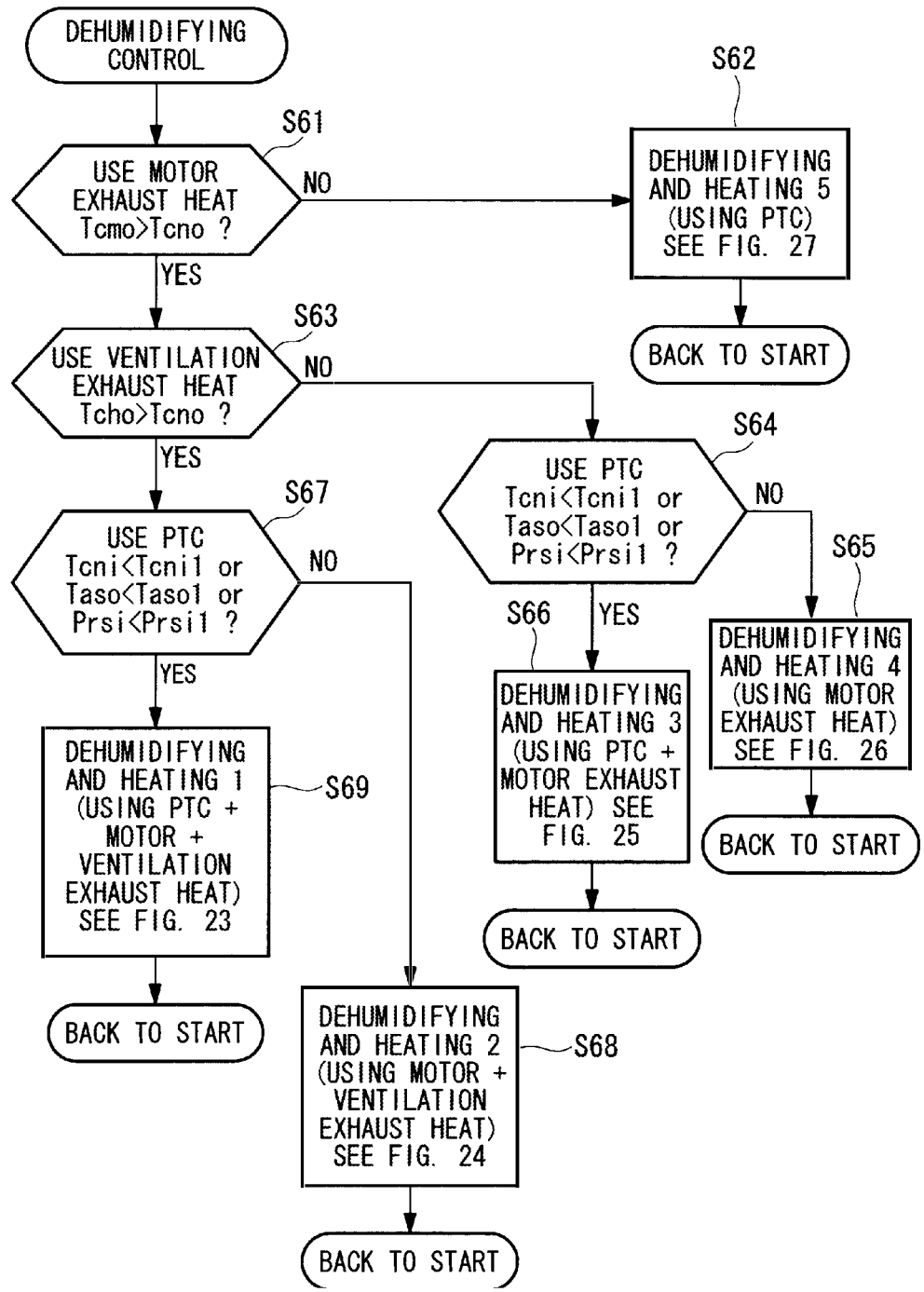
FIG. 7 is a diagram of a control flow for a dehumidifying and heating control operation in the control flow shown in FIG. 2.

The dehumidifying and heating control is almost the same as the heating control. As shown in FIG. 7, in Step S61, it is determined whether the motor/battery 23 should use exhaust heat. This is determined by determining whether the relationship between the coolant outlet temperature Tcmo of the motor/battery 23, detected by the sensor 41, and the coolant outlet temperature Tcno of the refrigerant/coolant heat exchanger 20, detected by the sensor 43, satisfies Tcmo>Tcno.

Figure 27:
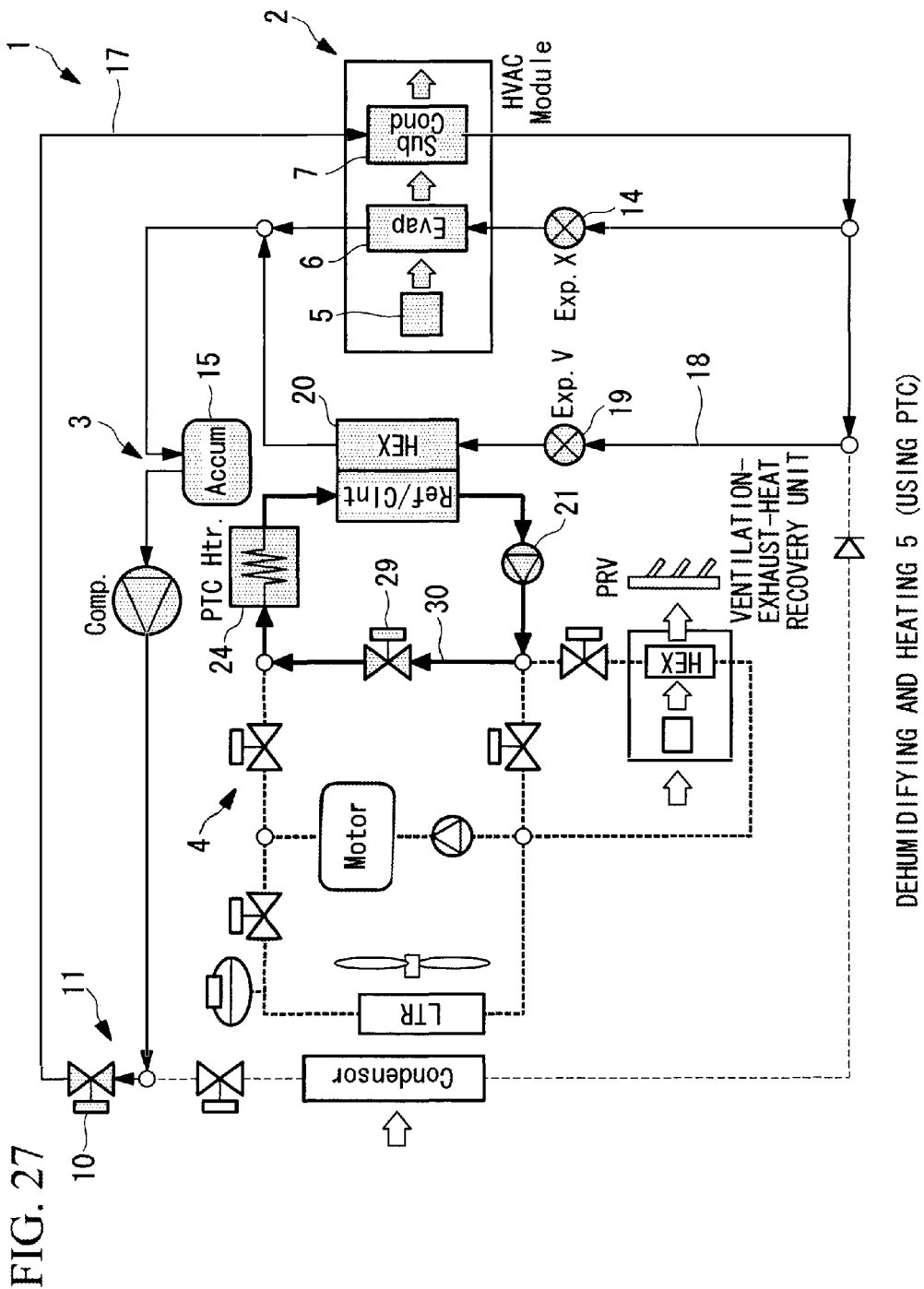
FIG. 27 is a cycle diagram for dehumidifying and heating 5 (using the PTC) in the dehumidifying and heating control operation shown in FIG. 7.

As a result, if it is determined that Tcmi is lower than Tcmi1 ("NO"), the flow advances to dehumidifying and heating 5 in Step S62. As shown in FIG. 27, the electric heater 24 is energized, the fifth solenoid valve 29 is opened, and the third solenoid valve 27, the fourth solenoid valve 28, and the sixth solenoid valve 31 are closed. Thus, the coolant in the coolant cycle 4 is circulated to the first bypass circuit 30 and is heated by the electric heater 24. At the same time, in the heat pump cycle 3, the refrigerant discharged from the refrigerant compressor 8 is guided by the refrigerant circuit changeover section 11 to the second refrigerant condenser 7, provided in the HVAC unit 2, is condensed therein, and is then circulated to the first expansion valve 14 and the refrigerant evaporator 6, provided in the HVAC unit 2, and to the second expansion valve 19 and the refrigerant/coolant heat exchanger 20, in parallel.

Thus, in the HVAC unit 2, air blown from the blower 5 can be subjected to cooling and dehumidifying at the refrigerant evaporator 6, then heated at the second refrigerant condenser 7, and blown out to the vehicle interior, thus performing dehumidifying and heating of the vehicle interior. During this time, in the heat pump cycle 3, a heat-pump dehumidifying and heating operation can be performed by using the coolant heated by the electric heater 24 as a heat source.

On the other hand, if it is determined in Step S61 that the coolant outlet temperature Tcmo of the motor/battery 23 is equal to or higher than the coolant outlet temperature Tcno of the refrigerant/coolant heat exchanger 20 ("YES"), the flow advances to Step S63. In Step S63, it is determined whether the ventilation-exhaust-heat recovery unit 22 should use exhaust heat. This is determined by determining whether the relationship between the coolant outlet temperature Tcho of the ventilation-exhaust-heat recovery unit, detected by the sensor 44, and the coolant outlet temperature Tcno of the refrigerant/coolant heat exchanger 20, detected by the sensor 43, satisfies Tcho>Tcno.

Figure 26:
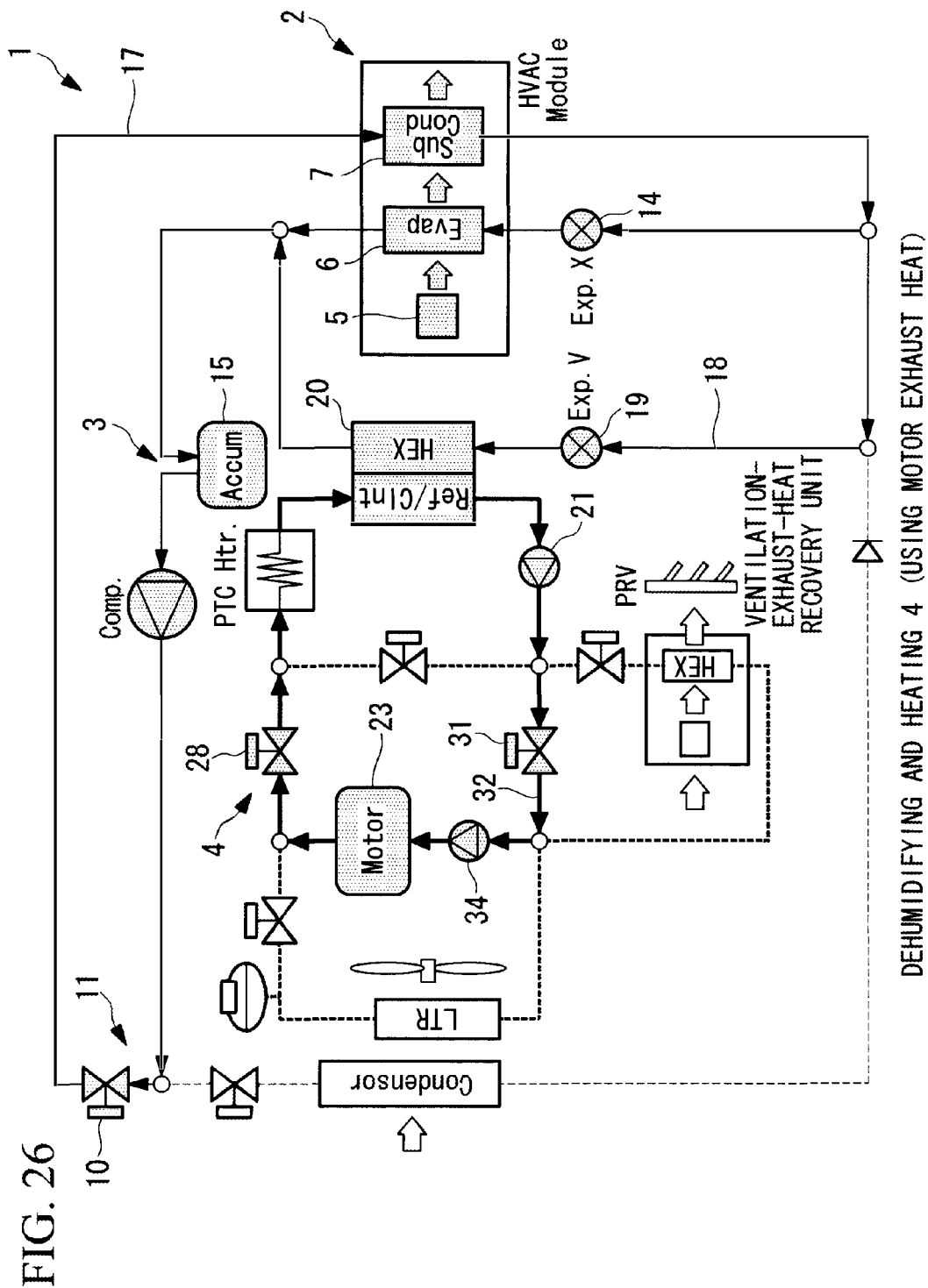
FIG. 26 is a cycle diagram for dehumidifying and heating 4 (using the motor/battery exhaust heat) in the dehumidifying and heating control operation shown in FIG. 7.

As a result, if it is determined that Tcho is lower than Tcno ("NO"), the flow advances to Step S64, where it is determined whether to use the electric heater (PTC) 24 by determining whether each of the above-described conditions (a) to (c) is satisfied. If it is determined that each of the above-described conditions, that is, Tcni<Tcni1, Taso<Taso1, and Prsi<Prsi1, is not satisfied ("NO"), the flow advances to dehumidifying and heating 4 in Step S65. As shown in FIG. 26, the electric heater 24 is turned off, the fourth solenoid valve 28 and the sixth solenoid valve 31 are opened, the third solenoid valve 27 and the fifth solenoid valve 29 are closed, and the coolant in the coolant cycle 4 is circulated only to the motor/battery 23 and is heated by the exhaust heat thereof.

At the same time, in the heat pump cycle 3, the refrigerant discharged from the refrigerant compressor 8 is guided, via the refrigerant circuit changeover section 11, to the second refrigerant condenser 7, provided in the HVAC unit 2, is condensed therein, and is then circulated to the first expansion valve 14 and the refrigerant evaporator 6, provided in the HVAC unit 2, and to the second expansion valve 19 and the refrigerant/coolant heat exchanger 20, in parallel. Thus, in the HVAC unit 2, air blown from the blower 5 is subjected to cooling and dehumidifying at the refrigerant evaporator 6, is heated at the refrigerant condenser 7, and is blown out to the vehicle interior. In the heat pump cycle 3, the heat-pump dehumidifying and heating operation can be performed by using the coolant heated by the exhaust heat of the motor/battery 23 as a heat source.

Figure 25:
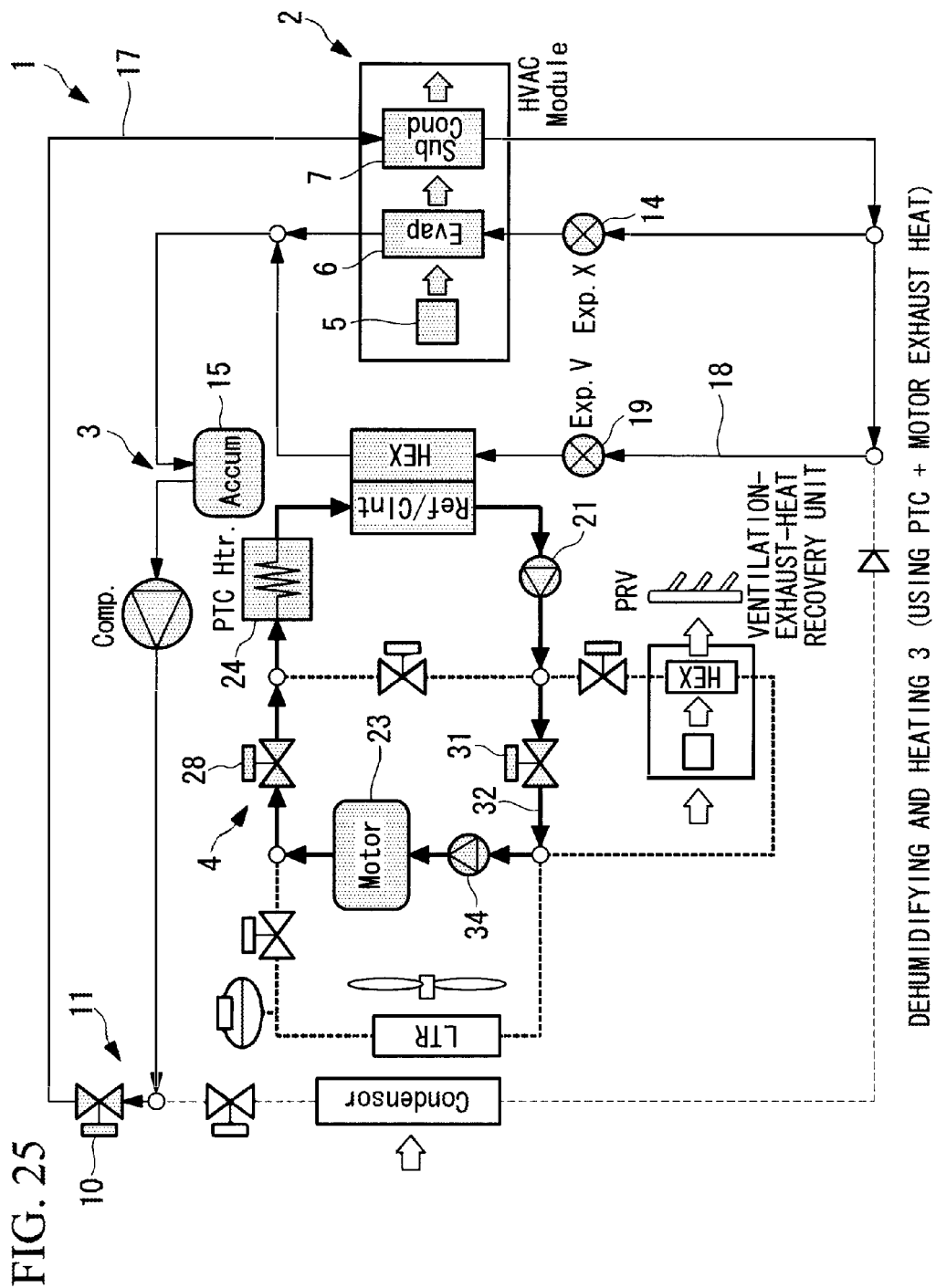
FIG. 25 is a cycle diagram for dehumidifying and heating 3 (using the PTC, the motor/battery exhaust heat) in the dehumidifying and heating control operation shown in FIG. 7.

If it is determined in Step S64 that each of the above-described conditions (a) to (c) is satisfied ("YES"), the flow advances to dehumidifying and heating 3 in Step S66. As shown in FIG. 25, the electric heater 24 is energized, in addition to the case of the dehumidifying and heating 4. Thus, the coolant in the coolant cycle 4 is circulated to the motor/ battery 23 and the electric heater 24 and is heated by both of them. In the heat pump cycle 3, the heat-pump heating operation can be similarly performed by using the coolant heated by the motor/battery 23 and the electric heater 24 as a heat source.

Figure 24:
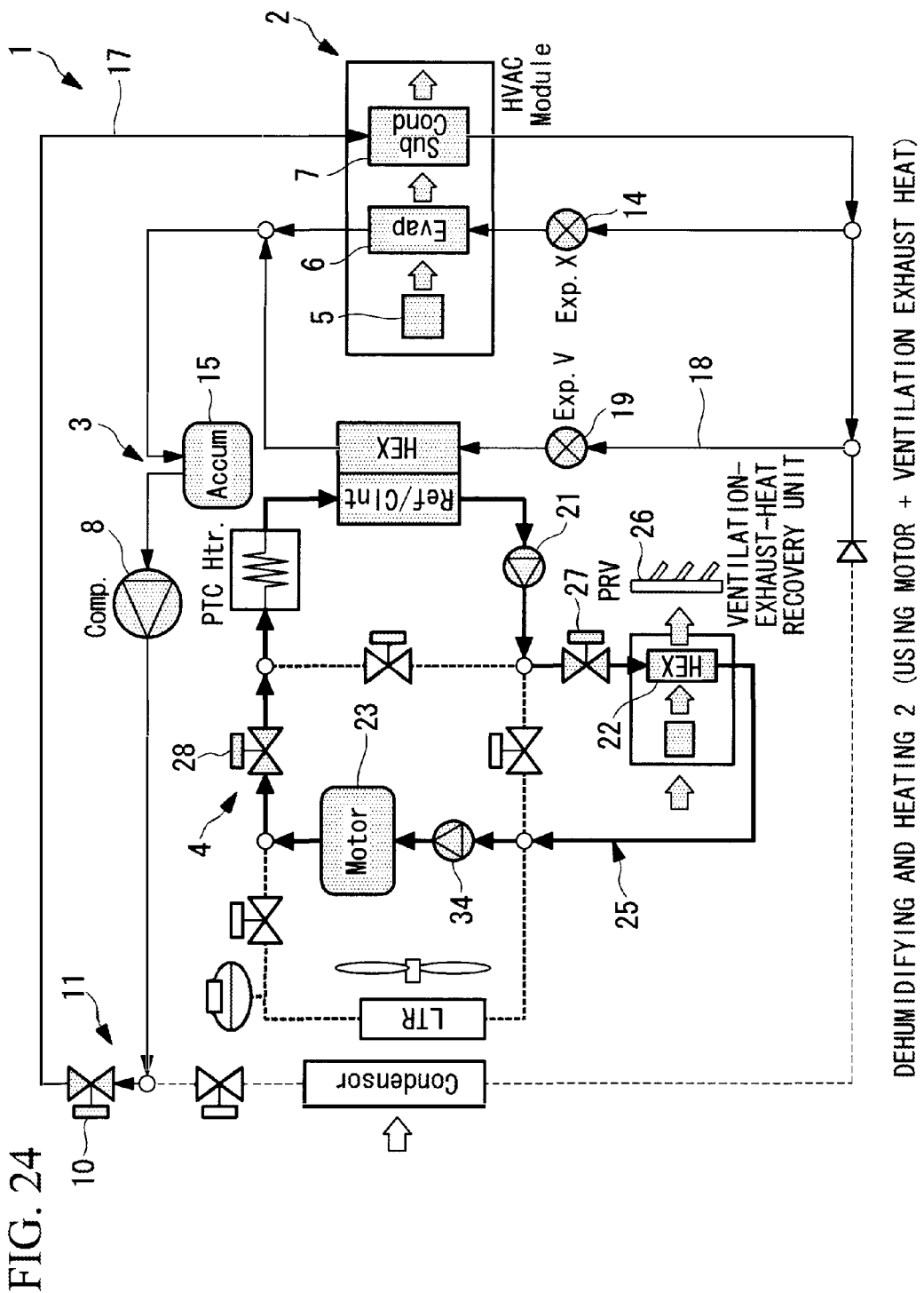
FIG. 24 is a cycle diagram for dehumidifying and heating 2 (using the motor/battery and the ventilation exhaust heat) in the dehumidifying and heating control operation shown in FIG. 7.

Furthermore, if it is determined in Step S63 that the coolant outlet temperature Tcho of the ventilation-exhaust-heat recovery unit 22 is equal to or higher than the coolant outlet temperature Tcno of the refrigerant/coolant heat exchanger 20 ("YES"), the flow advances to Step S67, where it is determined whether to use the electric heater (PTC) 24 by similarly determining whether each of the above-described conditions (a) to (c) is satisfied. As a result, if it is determined that each of the conditions, that is, Tcni<Tcni1, Taso<Taso1, and Prsi<Prsi1, is not satisfied ("NO"), the flow advances to dehumidifying and heating 2 in Step S68. In Step S68, as shown in FIG. 24, the electric heater 24 is turned off, the third solenoid valve 27 and the fourth solenoid valve 28 are opened, the fifth solenoid valve 29 and the sixth solenoid valve 31 are closed, and the coolant in the coolant cycle 4 is circulated to the ventilation-exhaust-heat recovery unit 22 and the motor/battery 23 and is heated by the exhaust heat thereof.

At the same time, in the heat pump cycle 3, the refrigerant from the refrigerant compressor is circulated, via the refrigerant circuit changeover section 11 and the refrigerant pipe 17, to the second refrigerant condenser 7, provided in the HVAC unit 2, is condensed therein, and is then circulated to the first expansion valve 14 and the refrigerant evaporator 6, provided in the HVAC unit 2, and to the second expansion valve 19 and the refrigerant/coolant heat exchanger 20, in parallel. In the heat pump cycle 3, the heat-pump dehumidifying and heating operation can be similarly performed by using the coolant heated by the exhaust heat of the ventilation-exhaust-heat recovery unit 22 and the motor/battery 23 as a heat source.

Figure 23:
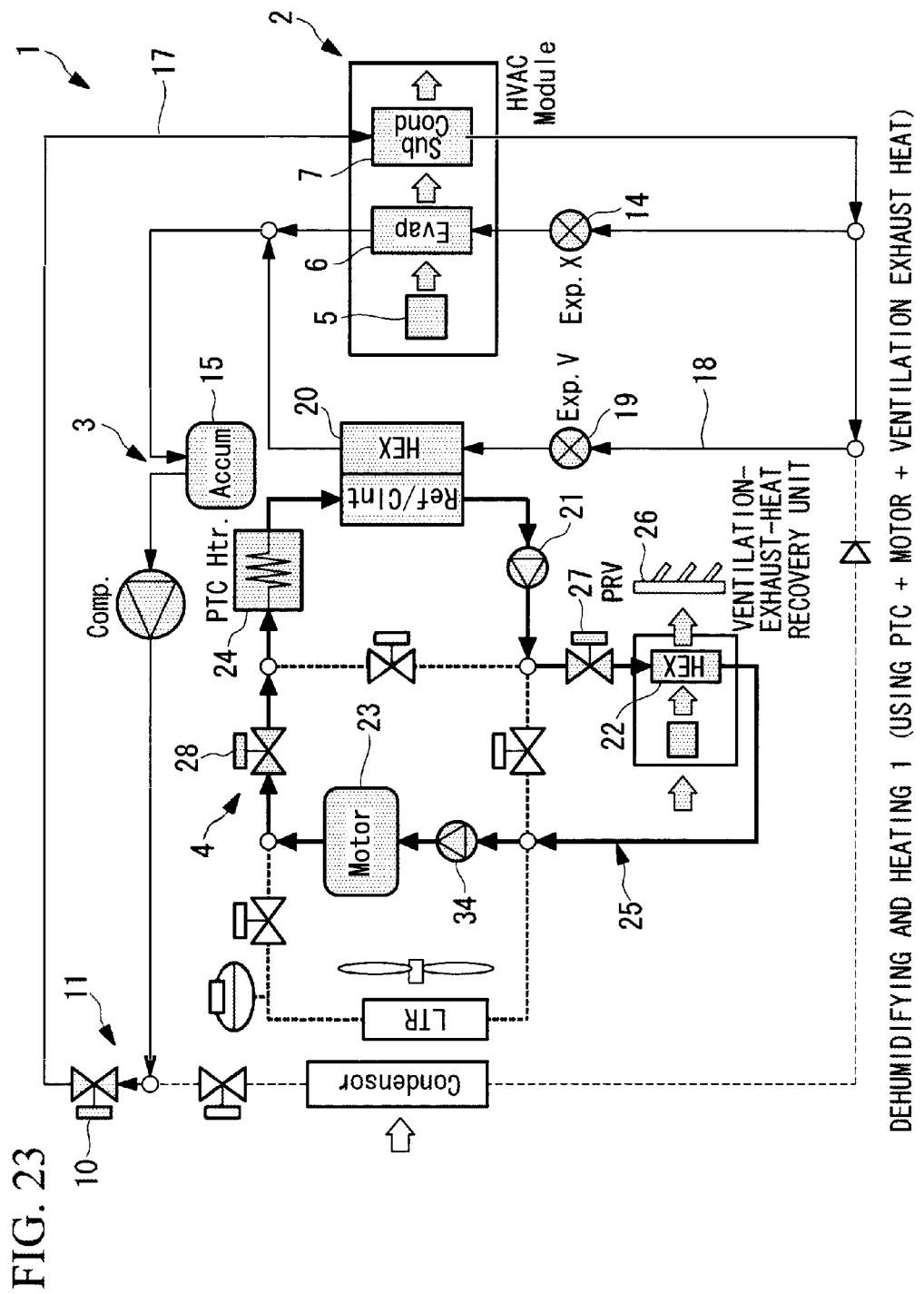
FIG. 23 is a cycle diagram for dehumidifying and heating 1 (using the PTC, the motor/battery, and the ventilation exhaust heat) in the dehumidifying and heating control operation shown in FIG. 7.

Furthermore, if it is determined in Step S67 that each of the above-described conditions (a) to (c), that is, Tcni<Tcni1, Taso<Taso1, and Prsi<Prsi1, is satisfied ("YES"), the flow advances to dehumidifying and heating 1 in Step S69. As shown in FIG. 23, the electric heater 24 is energized, in addition to the case of the dehumidifying and heating 2. Thus, the coolant in the coolant cycle 4 is heated by the ventilation-exhaust-heat recovery unit 22, the motor/battery 23, and the electric heater 24. In the heat pump cycle 3, the heat-pump dehumidifying and heating operation can be similarly performed by using the coolant heated by the ventilation-exhaust-heat recovery unit 22, the motor/battery 23, and the electric heater 24 as a heat source.

As described above, during the dehumidifying and heating control, it is determined whether the coolant outlet temperature Tcmo of the motor/battery 23 is equal to or higher than the coolant outlet temperature Tcno of the refrigerant/coolant heat exchanger 20. If it is determined that Tcmo is lower than Tcno, the electric heater 24 is energized to heat the coolant. The heat pump cycle 3 makes the refrigerant condensed by the second refrigerant condenser 7, provided in the HVAC unit 2, flow into the first expansion valve 14 and the refrigerant evaporator 6, provided in the HVAC unit 2, and into the second expansion valve 19 and the refrigerant/coolant heat exchanger 20, in parallel, thus performing the heat-pump dehumidifying and heating operation by using the coolant heated by the electric heater 24 as a heat source. Thus, even at heating start-up time or at a low outside-air temperature (for example, at −10 degrees Celsius), at which it is normally difficult to perform heat-pump dehumidifying and heating because the exhaust heat of the motor/battery 23 cannot be used, it is possible to ensure the required heating capacity by using the coolant heated by the electric heater 24 as a heat source to perform an efficient dehumidifying and heating operation.

Furthermore, if the coolant outlet temperature Tcmo of the motor/battery 23 is equal to or higher than the coolant outlet temperature Tcno of the refrigerant/coolant heat exchanger 20, it is determined whether the coolant outlet temperature Tcho of the ventilation-exhaust-heat recovery unit 22 is equal to or higher than the coolant outlet temperature Tcno of the refrigerant/coolant heat exchanger 20. If Tcho is lower than Tcno, it is further determined whether the relationship between the coolant inlet temperature Tcni of the refrigerant/coolant heat exchanger 20 and the predetermined coolant inlet required temperature Tcni1 of the refrigerant/coolant heat exchanger 20, the relationship between the air-side outlet temperature Taso of the second refrigerant condenser 7 and the predetermined air-side required outlet temperature Taso1 of the second refrigerant condenser 7, and the relationship between the inlet refrigerant pressure Prsi of the second refrigerant condenser 7 and the predetermined inlet required refrigerant pressure Prsi1 of the second refrigerant condenser 7 satisfy Tcni <Tcni1, Taso<Taso1, and Prsi<Prsi1, respectively. If each of the coolant inlet temperature Tcni, the air-side outlet temperature Taso, and the inlet refrigerant pressure Prsi does not satisfy the corresponding condition, the coolant is heated by the exhaust heat of the motor/battery 23.

At the same time, in the heat pump cycle 3, the refrigerant condensed by the second refrigerant condenser 7, provided in the HVAC unit 2, is made to flow into the first expansion valve 14 and the refrigerant evaporator 6, provided in the HVAC unit 2, and into the second expansion valve 19 and the refrigerant/coolant heat exchanger 20, in parallel, and the heat-pump dehumidifying and heating operation is performed by using the coolant heated by the exhaust heat of the motor/battery 23 as a heat source. Furthermore, if each of the coolant inlet temperature Tcni, the air-side outlet temperature Taso, and the inlet refrigerant pressure Prsi satisfies the corresponding condition, the electric heater 24 is energized, the coolant is heated by both the motor/battery 23 and the electric heater 24, and the heat pump cycle 3 performs the heat-pump dehumidifying and heating operation by using this coolant as a heat source.

Furthermore, if the coolant outlet temperature Tcho of the ventilation-exhaust-heat recovery unit 22 is equal to or higher than the coolant outlet temperature Tcno of the refrigerant/coolant heat exchanger 20, it is further determined whether the relationship between the coolant inlet temperature Tcni of the refrigerant/coolant heat exchanger 20 and the predetermined coolant inlet required temperature Tcni1 of the refrigerant/coolant heat exchanger 20, the relationship between the air-side outlet temperature Taso of the second refrigerant condenser 7 and the predetermined air-side required outlet temperature Taso1 of the second refrigerant condenser 7, and the relationship between the inlet refrigerant pressure Prsi of the second refrigerant condenser 7 and the predetermined inlet required refrigerant pressure Prsi1 of the second refrigerant condenser 7 satisfy Tcni<Tcni1, Taso<Taso1, and Prsi<Prsi1, respectively. If each of the coolant inlet temperature Tcni, the air-side outlet temperature Taso, and the inlet refrigerant pressure Prsi does not satisfy the corresponding condition, the coolant is heated by both the ventilation-exhaust-heat recovery unit 22 and the exhaust heat of the motor/battery 23.

At the same time, in the heat pump cycle 3, the refrigerant condensed by the second refrigerant condenser 7, provided in the HVAC unit 2, is made to flow into the first expansion valve 14 and the refrigerant evaporator 6, provided in the HVAC unit 2, and into the second expansion valve 19 and the refrigerant/coolant heat exchanger 20, in parallel, and the heat-pump dehumidifying and heating operation is performed by using the coolant heated by the ventilation-exhaust-heat recovery unit 22 and the exhaust heat of the motor/battery 23 as a heat source. Furthermore, if each of the coolant inlet temperature Tcni, the air-side outlet temperature Taso, and the inlet refrigerant pressure Prsi satisfies the corresponding condition, the electric heater 24 is energized, the coolant is heated by the ventilation-exhaust-heat recovery unit 22, the exhaust heat of the motor/battery 23, and the electric heater 24, and the heat-pump dehumidifying and heating operation is performed by using this coolant as a heat source.

In this way, during the dehumidifying and heating control, if the exhaust heat of the motor/battery 23 can be used, it is determined whether the ventilation-exhaust-heat recovery unit 22 can be used. If the ventilation-exhaust-heat recovery unit 22 can be used, it is further determined whether the use of the electric heater 24 is necessary. Thus, the electric heater 24 is energized to heat the coolant only when the electric heater 24 is really necessary. Thus, in the respective states, it is possible to ensure the required heating capacity to perform an efficient dehumidifying and heating operation, and, at the same time, it is possible to reduce the use of the electric heater 24 as much as possible and to reduce the power consumption of the air-conditioning system 1, thus contributing to extended vehicle travel distance.

Note that the present invention is not limited to the inventions according to the above-described embodiments, and appropriate modifications can be made without departing from the scope thereof. For example, the HVAC unit 2 may be provided with an air-mixing damper for adjusting temperature, at the downstream side of the refrigerant evaporator 6. Furthermore, in the heat pump cycle 3, the first solenoid valve 9 and the second solenoid valve 10, which constitute the refrigerant circuit changeover section 11, may be replaced with a three-way switch valve or a four-way switch valve. Furthermore, in the coolant cycle 4, the fourth solenoid valve 28 and the seventh solenoid valve 33 may be replaced with another three-way switch valve or four-way switch valve; and the third solenoid valve 27, the fifth solenoid valve 29, and the sixth solenoid valve 31 may be replaced with another three-way switch valve or four-way switch valve.

REFERENCE SIGNS LIST 1 vehicle air-conditioning system
2 HVAC unit
3 heat pump cycle
4 coolant cycle
5 blower (blower)
6 refrigerant evaporator
7 second refrigerant condenser
8 refrigerant compressor
11 refrigerant circuit changeover section
12 first refrigerant condenser
14 first expansion valve (EEV; electronic expansion valve)
19 second expansion valve (EEV; electronic expansion valve)
20 refrigerant/coolant heat exchanger
21 coolant circulating pump
22 ventilation-exhaust-heat recovery unit
23 motor/battery
24 electric heater (PTC)
30 first bypass circuit
32 second bypass circuit
35 radiator
36 motor/battery cooling circuit
40, 41, 42, 43, 44, 45, 46, 47 sensor

The invention claimed is:

1. A vehicle air-conditioning system comprising:
an HVAC unit that blows, into a vehicle interior, air whose temperature has been adjusted by a refrigerant evaporator and a second refrigerant condenser that are provided in a blowing path of a blower;
a heat pump cycle in which a refrigerant compressor, a refrigerant circuit changeover section that changes a refrigerant circulating direction, a first refrigerant condenser that condenses refrigerant by performing heat exchange with outside air, a first expansion valve, and the refrigerant evaporator are connected in this order; a second expansion valve and a refrigerant/coolant heat exchanger are connected in parallel with the first expansion valve and the refrigerant evaporator; and the second refrigerant condenser is connected in parallel with the first refrigerant condenser via the refrigerant circuit changeover section; and
a coolant cycle in which a coolant circulating pump, a ventilation-exhaust-heat recovery unit that recovers heat from exhaust air from the vehicle interior, a motor/battery, an electric heater, and the refrigerant/coolant heat exchanger are sequentially connected; and the ventilation-exhaust-heat recovery unit, the motor/battery, and the electric heater can be selectively used as a heat source,
wherein the coolant cycle comprises a first bypass circuit for bypassing the ventilation-exhaust-heat recovery unit and the motor/battery and a second bypass circuit for bypassing the ventilation-exhaust-heat recovery unit,
wherein, at the refrigerant/coolant heat exchanger, the coolant cycle recovers heat selectively from the ventilation-exhaust-heat recovery unit, the motor/battery, and the electric heater, from the ventilation-exhaust-heat recovery unit and the motor/battery, from the motor/battery and the electric heater, from the motor/battery, or from the electric heater; and the heat pump cycle can be operated in any operation mode of heating control and dehumidifying and heating control, by using the heat recovered at the refrigerant/coolant heat exchanger as a heat source.

2. The vehicle air-conditioning system according to claim 1, wherein the coolant cycle comprises a motor/battery cooling circuit that circulates coolant to a radiator to perform air cooling of the motor/battery.

3. The vehicle air-conditioning system according to claim 1, wherein, through a cycle change in each of the heat pump cycle and the coolant cycle, it is selected any operation mode from cooling control, blowing-mode control that includes refrigerant cooling of the motor/battery, motor/battery cooling control that performs refrigerant cooling of the motor/battery, heating control, and dehumidifying and heating control.

4. The vehicle air-conditioning system according to claim 1, wherein the heat pump cycle is operated in a cooling control mode by circulating the refrigerant from the refrigerant compressor to the first refrigerant condenser, the first expansion valve, and the refrigerant evaporator, in this order, and, at the same time, is capable of cooling the motor/battery via the coolant cycle by concurrently circulating the refrigerant to the second expansion valve and the refrigerant/coolant heat exchanger, which are connected in parallel with the first expansion valve and the refrigerant evaporator.

5. The vehicle air-conditioning system according to claim 1, wherein only the blower is driven to operate the HVAC unit in the blowing-mode control, and, at the same time, the heat pump cycle performs the cooling operation by circulating the refrigerant from the refrigerant compressor to the first refrigerant condenser, the second expansion valve, and the refrigerant/coolant heat exchanger, in this order, thus cooling the motor/battery via the coolant cycle.

6. The vehicle air-conditioning system according to claim 1, wherein the heat pump cycle is operated in a motor/battery cooling control mode by circulating the refrigerant from the refrigerant compressor to the first refrigerant condenser, the second expansion valve, and the refrigerant/coolant heat exchanger, in this order, thus cooling the motor/battery via the coolant cycle.

7. A vehicle-air-conditioning-system operation control method for performing a cooling-control operation in the vehicle air-conditioning system according to claim 1, the method comprising the steps of:
   during cooling control, determining whether a relationship between a coolant inlet temperature $Tcmi$ of the motor/battery in the coolant cycle and a predetermined air-cooling switching temperature $Tcmi1$ satisfies $Tcmi > Tcmi1$; and
   if $Tcmi$ is lower than $Tcmi1$, circulating, in the heat pump cycle, the refrigerant from the refrigerant compressor to the first refrigerant condenser, the first expansion valve, and the refrigerant evaporator, in this order, thus performing a cooling operation without cooling the motor/battery.

8. The vehicle-air-conditioning-system operation control method according to claim 7, further comprising the steps of:
   if the coolant inlet temperature $Tcmi$ is equal to or higher than the air-cooling switching temperature $Tcmi1$, further determining whether the relationship between the coolant inlet temperature $Tcmi$ and a predetermined refrigerant-cooling switching temperature $Tcmi2$ satisfies $Tcmi > Tcmi2$;
   if $Tcmi$ is equal to or higher than $Tcmi2$, circulating, in the heat pump cycle, the refrigerant from the refrigerant compressor to the first refrigerant condenser, the first expansion valve, and the refrigerant evaporator, in this order, thus performing the cooling operation, and also concurrently circulating the refrigerant to the second expansion valve and the refrigerant/coolant heat exchanger to perform a cooling operation of the coolant, thus performing refrigerant cooling of the motor/battery via the coolant cycle; and
   if the coolant inlet temperature $Tcmi$ is lower than $Tcmi2$, performing air cooling of the motor/battery as well as the cooling operation.

9. A vehicle-air-conditioning-system operation control method for performing a blowing-mode control operation in a vehicle air-conditioning system according to claim 1, the method comprising the steps of:
   during blowing-mode control, determining whether a relationship between a coolant inlet temperature $Tcmi$ of the motor/battery in the coolant cycle and a predetermined air-cooling switching temperature $Tcmi1$ satisfies $Tcmi > Tcmi1$; and
   if $Tcmi$ is lower than $Tcmi1$, regarding cooling of the motor/battery as being unnecessary, and operating only the blower, thus performing a blowing operation.

10. The vehicle-air-conditioning-system operation control method according to claim 9, further comprising the steps of:
   if the coolant inlet temperature $Tcmi$ is equal to or higher than the air-cooling switching temperature $Tcmi1$, further determining whether the relationship between the coolant inlet temperature $Tcmi$ and a predetermined refrigerant-cooling switching temperature $Tcmi2$ satisfies $Tcmi > Tcmi2$;
   if $Tcmi$ is equal to or higher than $Tcmi2$, operating the blower, thus performing the blowing operation, and also circulating, in the heat pump cycle, the refrigerant from the refrigerant compressor to the first refrigerant condenser, the second expansion valve, and the refrigerant/coolant heat exchanger, in this order, to perform a cooling operation of the coolant, thus performing refrigerant cooling of the motor/battery via the coolant cycle; and
   if the coolant inlet temperature $Tcmi$ is lower than $Tcmi2$, performing air cooling of the motor/battery as well as the blowing operation.

11. A vehicle-air-conditioning-system operation control method for performing a motor/battery cooling control operation in the vehicle air-conditioning system according to claim 1, the method comprising the steps of:
   during motor/battery cooling control, determining whether a relationship between a coolant inlet temperature $Tcmi$ of the motor/battery in the coolant cycle and a predetermined air-cooling switching temperature $Tcmi1$ satisfies $Tcmi > Tcmi1$; and
   if $Tcmi$ is lower than $Tcmi1$, regarding cooling of the motor/battery as being unnecessary, and canceling a cooling operation of the motor/battery.

12. The vehicle-air-conditioning-system operation control method according to claim 11, further comprising the steps of:
   if the coolant inlet temperature $Tcmi$ is equal to or higher than the air-cooling switching temperature $Tcmi1$, further determining whether the relationship between the coolant inlet temperature $Tcmi$ and a predetermined refrigerant-cooling switching temperature $Tcmi2$ satisfies $Tcmi > Tcmi2$;
   if $Tcmi$ is equal to or higher than $Tcmi2$, circulating, in the heat pump cycle, the refrigerant from the refrigerant compressor to the first refrigerant condenser, the second expansion valve, and the refrigerant/coolant heat exchanger, in this order, to perform a cooling operation of the coolant, thus performing refrigerant cooling of the motor/battery via the coolant cycle; and
   if the coolant inlet temperature $Tcmi$ is lower than $Tcmi2$, performing air cooling of the motor/battery.

13. A vehicle-air-conditioning-system operation control method for performing a heating control operation in the vehicle air-conditioning system according to claim 1, the method comprising the steps of:
   during heating control, determining whether a relationship between a coolant outlet temperature $Tcmo$ of the motor/battery in the coolant cycle and a coolant outlet temperature $Tcno$ of the refrigerant/coolant heat exchanger satisfies $Tcmo > Tcno$; and
   if $Tcmo$ is lower than $Tcno$, energizing the electric heater, heating coolant in the coolant cycle with the electric heater, and circulating, in the heat pump cycle, the refrigerant from the refrigerant compressor to the second refrigerant condenser, the second expansion valve, and the refrigerant/coolant heat exchanger, in this order, thus performing a heat-pump heating operation by using the coolant as a heat source.

14. The vehicle-air-conditioning-system operation control method according to claim 13, further comprising the steps of:
   if the coolant outlet temperature $Tcmo$ of the motor/battery is equal to or higher than the coolant outlet temperature Tcno of the refrigerant/coolant heat exchanger, determining whether the relationship between a coolant outlet temperature Tcho of the ventilation-exhaust-heat recovery unit and the coolant outlet temperature Tcno of the refrigerant/coolant heat exchanger satisfies Tcho>Tcno;

if Tcho is equal to or higher than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Taso1 of the second refrigerant condenser satisfies Taso<Taso1; and whether the relationship between an inlet refrigerant pressure Prsi of the second refrigerant condenser and a predetermined inlet required refrigerant pressure Prsi1 of the second refrigerant condenser satisfies Prsi<Prsi1;

if each of the coolant inlet temperature Tcni, the air-side outlet temperature Taso, and the inlet refrigerant pressure Prsi does not satisfy the corresponding condition, heating the coolant in the coolant cycle with exhaust heat of the motor/battery and the ventilation-exhaust-heat recovery unit, and circulating, in the heat pump cycle, the refrigerant from the refrigerant compressor to the second refrigerant condenser, the second expansion valve, and the refrigerant/coolant heat exchanger, in this order, thus performing a heat-pump heating operation by using the coolant as a heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with the electric heater, exhaust heat of the motor/battery, and the ventilation-exhaust-heat recovery unit, and performing the heat-pump heating operation by using the coolant as the heat source.

15. A vehicle-air-conditioning-system operation control method for automatically operating a vehicle air-conditioning system, said vehicle air-conditioning system comprising:

an HVAC unit that blows, into a vehicle interior, air whose temperature has been adjusted by a refrigerant evaporator and a second refrigerant condenser that are provided in a blowing path of a blower;

a heat pump cycle in which a refrigerant compressor, a refrigerant circuit changeover section that changes a refrigerant circulating direction, a first refrigerant condenser that condenses refrigerant by performing heat exchange with outside air, a first expansion valve, and the refrigerant evaporator are connected in this order; a second expansion valve and a refrigerant/coolant heat exchanger are connected in parallel with the first expansion valve and the refrigerant evaporator; and the second refrigerant condenser is connected in parallel with the first refrigerant condenser via the refrigerant circuit changeover section; and a coolant cycle in which a coolant circulating pump, a ventilation-exhaust-heat recovery unit that recovers heat from exhaust air from the vehicle interior, a motor/battery, an electric heater, and the refrigerant/coolant heat exchanger are sequentially connected; and the ventilation-exhaust-heat recovery unit, the motor/battery, and the electric heater can be selectively used as a heat source, said method comprising the steps of:

at the start of operation, reading predetermined setting values of temperature and pressure, detected values obtained from sensors provided at predetermined positions for detecting temperature and pressure, and control panel settings;

if the blower has been turned off, performing motor/battery cooling control for performing refrigerant cooling of the motor/battery;

if the blower has been turned on, determining whether an air-conditioning switch has been turned on or off;

if the air-conditioning switch has been turned off, when a temperature adjusting dial is set at maximum cooling, performing blowing-mode control that includes refrigerant cooling of the motor/battery, and, when the temperature adjusting dial is not set at the maximum cooling, performing heating control;

if the air-conditioning switch has been turned on, when the temperature adjusting dial is set at the maximum cooling, performing cooling control, and, when the temperature adjusting dial is not set at the maximum cooling, further determining whether it is necessary to prevent the evaporator from frosting;

if it is necessary to prevent the evaporator from frosting, performing the heating control; and if it is not necessary to prevent the evaporator from frosting, performing dehumidifying and heating control.

16. A vehicle-air-conditioning-system operation control method for performing a heating control operation in a vehicle air-conditioning system, said vehicle air-conditioning system comprising:

an HVAC unit that blows, into a vehicle interior, air whose temperature has been adjusted by a refrigerant evaporator and a second refrigerant condenser that are provided in a blowing path of a blower;

a heat pump cycle in which a refrigerant compressor, a refrigerant circuit changeover section that changes a refrigerant circulating direction, a first refrigerant condenser that condenses refrigerant by performing heat exchange with outside air, a first expansion valve, and the refrigerant evaporator are connected in this order; a second expansion valve and a refrigerant/coolant heat exchanger are connected in parallel with the first expansion valve and the refrigerant evaporator; and the second refrigerant condenser is connected in parallel with the first refrigerant condenser via the refrigerant circuit changeover section; and a coolant cycle in which a coolant circulating pump, a ventilation-exhaust-heat recovery unit that recovers heat from exhaust air from the vehicle interior, a motor/battery, an electric heater, and the refrigerant/coolant heat exchanger are sequentially connected; and the ventilation-exhaust-heat recovery unit, the motor/battery, and the electric heater can be selectively used as a heat source, said method comprising the steps of:

during heating control, determining whether a relationship between a coolant outlet temperature Tcmo of the motor/battery in the coolant cycle and a coolant outlet temperature Tcno of the refrigerant/coolant heat exchanger satisfies Tcmo>Tcno;

if Tcmo is lower than Tcno, energizing the electric heater, heating coolant in the coolant cycle with the electric heater, and circulating, in the heat pump cycle, the refrigerant from the refrigerant compressor to the second refrigerant condenser, the second expansion valve, and the refrigerant/coolant heat exchanger, in this order, thus performing a heat-pump heating operation by using the coolant as a heat source;

if the coolant outlet temperature Tcmo of the motor/battery is equal to or higher than the coolant outlet temperature Tcno of the refrigerant/coolant heat exchanger, determining whether the relationship between the coolant outlet temperature Tcho of the ventilation-exhaust-heat recovery unit and the coolant outlet temperature Tcno of the refrigerant/coolant heat exchanger satisfies Tcho>Tcno;

if Tcho is lower than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Tasol of the second refrigerant condenser satisfies Taso<Tasol; and whether the relationship between an inlet refrigerant pressure Prsi of the second refrigerant condenser and a predetermined inlet required refrigerant pressure Prsi1 of the second refrigerant condenser satisfies Prsi<Prsi1;

if each of the coolant inlet temperature Tcni, the air-side outlet temperature Taso, and the inlet refrigerant pressure Prsi does not satisfy the corresponding condition, heating coolant in the coolant cycle with exhaust heat of the motor/battery, and circulating, in the heat pump cycle, the refrigerant from the refrigerant compressor to the second refrigerant condenser, the second expansion valve, and the refrigerant/coolant heat exchanger, in this order, thus performing a heat-pump heating operation by using the coolant as the heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with both the electric heater and the motor/battery, and performing the heat-pump heating operation by using the coolant as the heat source.

17. The vehicle-air-conditioning-system operation control method for performing a dehumidifying and heating control operation in a vehicle air-conditioning system, said vehicle air-conditioning system comprising:

an HVAC unit that blows, into a vehicle interior, air whose temperature has been adjusted by a refrigerant evaporator and a second refrigerant condenser that are provided in a blowing path of a blower;

a heat pump cycle in which a refrigerant compressor, a refrigerant circuit changeover section that changes a refrigerant circulating direction, a first refrigerant condenser that condenses refrigerant by performing heat exchange with outside air, a first expansion valve, and the refrigerant evaporator are connected in this order; a second expansion valve and a refrigerant/coolant heat exchanger are connected in parallel with the first expansion valve and the refrigerant evaporator; and the second refrigerant condenser is connected in parallel with the first refrigerant condenser via the refrigerant circuit changeover section; and a coolant cycle in which a coolant circulating pump, a ventilation-exhaust-heat recovery unit that recovers heat from exhaust air from the vehicle interior, a motor/battery, an electric heater, and the refrigerant/coolant heat exchanger are sequentially connected; and the ventilation-exhaust-heat recovery unit, the motor/battery, and the electric heater can be selectively used as a heat source, said method comprising the steps of:

during dehumidifying and heating control, determining whether a relationship between a coolant outlet temperature Tcmo of the motor/battery in the coolant cycle and a coolant outlet temperature Tcno of the refrigerant/coolant heat exchanger satisfies Tcmo>Tcno; and if Tcmo is lower than Tcno, energizing the electric heater, heating coolant in the coolant cycle with the electric heater, condensing, in the heat pump cycle, the refrigerant from the refrigerant compressor at the second refrigerant condenser, and concurrently circulating the refrigerant to the first expansion valve and the refrigerant evaporator and to the second expansion valve and the refrigerant/coolant heat exchanger, thus performing a heat-pump dehumidifying and heating operation by using the coolant as a heat source.

18. The vehicle-air-conditioning-system operation control method according to claim 17, further comprising the steps of:

if the coolant outlet temperature Tcmo of the motor/battery is equal to or higher than the coolant outlet temperature Tcno of the refrigerant/coolant heat exchanger, determining whether the relationship between the coolant outlet temperature Tcho of the ventilation-exhaust-heat recovery unit and the coolant outlet temperature Tcno of the refrigerant/coolant heat exchanger satisfies Tcho>Tcno;

if Tcho is lower than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Tasol of the second refrigerant condenser satisfies Taso<Tasol; and whether the relationship between an inlet refrigerant pressure Prsi of the second refrigerant condenser and a predetermined inlet required refrigerant pressure Prsi1 of the second refrigerant condenser satisfies Prsi<Prsi1;

if each of the coolant inlet temperature Tcni, the air-side outlet temperature Taso, and the inlet refrigerant pressure Prsi does not satisfy the corresponding condition, heating coolant in the coolant cycle with exhaust heat of the motor/battery, and condensing, in the heat pump cycle, the refrigerant from the refrigerant compressor at the second refrigerant condenser, and concurrently circulating the refrigerant to the first expansion valve and the refrigerant evaporator and to the second expansion valve and the refrigerant/coolant heat exchanger, thus performing a heat-pump dehumidifying and heating operation by using the coolant as the heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with the electric heater and the motor/battery, and performing the heat-pump dehumidifying and heating operation by using the coolant as the heat source.

19. The vehicle-air-conditioning-system operation control method according to claim 17, further comprising the steps of:

if the coolant outlet temperature Tcmo of the motor/battery is equal to or higher than the coolant outlet temperature Tcno of the refrigerant/coolant heat exchanger, determining whether the relationship between a coolant outlet temperature Tcho of the ventilation-exhaust-heat recovery unit and the coolant outlet temperature Tcno of the refrigerant/coolant heat exchanger satisfies Tcho>Tcno;

if Tcho is equal to or higher than Tcno, further determining whether the relationship between a coolant inlet temperature Tcni of the refrigerant/coolant heat exchanger and a predetermined coolant inlet required temperature Tcni1 of the refrigerant/coolant heat exchanger satisfies Tcni<Tcni1; whether the relationship between an air-side outlet temperature Taso of the second refrigerant condenser and a predetermined air-side required outlet temperature Taso1 of the second refrigerant condenser satisfies Taso<Taso1; and whether the relationship between an inlet refrigerant pressure Prsi of the second refrigerant condenser and a predetermined inlet required refrigerant pressure Prsi1 of the second refrigerant condenser satisfies Prsi<Prsi1;

if each of the coolant inlet temperature Tcni, the air-side outlet temperature Taso, and the inlet refrigerant pressure Prsi does not satisfy the corresponding condition, heating the coolant in the coolant cycle with exhaust heat of the motor/battery and the ventilation-exhaust-heat recovery unit, and condensing, in the heat pump cycle, the refrigerant from the refrigerant compressor at the second refrigerant condenser, and concurrently circulating the refrigerant to the first expansion valve and the refrigerant evaporator and to the second expansion valve and the refrigerant/coolant heat exchanger, thus performing a heat-pump dehumidifying and heating operation by using the coolant as the heat source; and if each of the coolant inlet temperature Tcni, the air-side outlet temperature Taso, and the inlet refrigerant pressure Prsi satisfies the corresponding condition, energizing the electric heater, heating the coolant in the coolant cycle with the electric heater, exhaust heat of the motor/battery, and the ventilation-exhaust-heat recovery unit, and performing the heat-pump dehumidifying and heating operation by using the coolant as the heat source.

* * * * *